(12) United States Patent
Zeiler et al.

(10) Patent No.: US 10,531,304 B2
(45) Date of Patent: *Jan. 7, 2020

(54) WIRELESS TRACKING OF POWER TOOLS AND RELATED DEVICES

(71) Applicant: Milwaukee Electric Tool Corporation, Brookfield, WI (US)

(72) Inventors: Jeffrey M. Zeiler, Pewaukee, WI (US); Leslie J. Reading, Lakeside, CA (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/257,978

(22) Filed: Jan. 25, 2019

(65) Prior Publication Data

US 2019/0159034 A1    May 23, 2019

Related U.S. Application Data

(63) Continuation of application No. 14/959,934, filed on Dec. 4, 2015, now Pat. No. 10,237,742, which is a
(Continued)

(51) Int. Cl.
*H04W 12/12*    (2009.01)
*H04W 4/029*    (2018.01)
*H04W 4/021*    (2018.01)

(52) U.S. Cl.
CPC .......... *H04W 12/12* (2013.01); *H04W 4/021* (2013.01); *H04W 4/029* (2018.02); *H04W 12/1206* (2019.01)

(58) Field of Classification Search
CPC ............. G04G 13/028; H04W 12/12; H04W 12/1206; H04W 4/021; H04W 4/029
(Continued)

(56) References Cited

U.S. PATENT DOCUMENTS 2,995,670 A    8/1961    Weiss
3,786,312 A    1/1974    Rosard
(Continued)

FOREIGN PATENT DOCUMENTS

CA    2240862    7/1997
DE    3803357    8/1989
(Continued)

OTHER PUBLICATIONS

United States Patent Office Action for U.S. Appl. No. 16/184,675, dated Jun. 6, 2019, 8 pages.
(Continued)

*Primary Examiner* — Timothy X Pham
(74) *Attorney, Agent, or Firm* — Michael Best & Friedrich LLP

(57) ABSTRACT

A method and system for wirelessly tracking power tools and related devices to aid with inventory management and to help minimize, prevent, and recover misplaced or stolen tools throughout the job site. The tools and/or batteries include wireless transmitting capabilities (e.g., an ISM unit) to transmit data to a fob, puck repeater, and/or gateway over an ISM network. The gateway is operable to translate and output the ISM communications over a cellular network to a remote monitoring unit, such as a personal computer or smart phone. Additionally, the gateway is further operable to translate and output cellular communications from the remote monitoring unit to ISM communications over the ISM network. A wireless tethering system and method is also disclosed whereby an ISM battery places a power tool in a lock-out or limp mode after the ISM battery remains outside of ISM communications for a prolonged period of time.

20 Claims, 29 Drawing Sheets

Related U.S. Application Data continuation of application No. 13/662,093, filed on Oct. 26, 2012, now Pat. No. 9,467,862.

(60) Provisional application No. 61/551,793, filed on Oct. 26, 2011, provisional application No. 61/638,102, filed on Apr. 25, 2012, provisional application No. 61/676,115, filed on Jul. 26, 2012.

(58) Field of Classification Search
USPC .................................................... 455/426.1
See application file for complete search history.

(56) References Cited

U.S. PATENT DOCUMENTS

| | | | |
|---|---|---|---|
| 3,946,282 A | 3/1976 | Weiss et al. |
| 4,167,733 A | 9/1979 | Krause et al. |
| 4,318,156 A | 3/1982 | Gallagher |
| 4,639,726 A | 1/1987 | Ichikawa et al. |
| 4,757,267 A | 7/1988 | Riskin |
| 5,168,114 A | 12/1992 | Enget |
| 5,188,188 A | 2/1993 | Mars |
| 5,204,670 A | 4/1993 | Stinton |
| 5,223,844 A | 6/1993 | Mansell et al. |
| 5,406,269 A | 4/1995 | Baran |
| 5,428,546 A | 6/1995 | Shah et al. |
| 5,497,149 A | 3/1996 | Fast |
| 5,531,344 A | 7/1996 | Winner |
| 5,587,701 A | 12/1996 | Hess |
| 5,594,650 A | 1/1997 | Shah et al. |
| 5,612,668 A | 3/1997 | Scott |
| 5,627,517 A | 5/1997 | Theimer et al. |
| 5,664,113 A | 9/1997 | Worger |
| 5,666,010 A | 9/1997 | Stratiotis |
| 5,742,237 A | 4/1998 | Bledsoe |
| 5,745,036 A | 4/1998 | Clare |
| 5,758,313 A | 5/1998 | Shah et al. |
| 5,777,551 A | 7/1998 | Hess |
| 5,819,869 A | 10/1998 | Horton |
| 5,850,180 A | 12/1998 | Hess |
| 5,864,297 A | 1/1999 | Sollestre et al. |
| 5,884,216 A | 3/1999 | Shah et al. |
| 5,886,634 A | 3/1999 | Muhme |
| 5,894,392 A | 4/1999 | McDonald |
| 5,903,462 A | 5/1999 | Wagner et al. |
| 5,919,239 A | 7/1999 | Fraker et al. |
| 5,922,040 A | 7/1999 | Prabhakaran |
| 5,928,291 A | 7/1999 | Jenkins et al. |
| 5,942,975 A | 8/1999 | Sorenson |
| 5,949,335 A | 9/1999 | Maynard |
| 6,005,489 A | 12/1999 | Siegle et al. |
| 6,025,780 A | 2/2000 | Bowers et al. |
| 6,049,273 A | 4/2000 | Hess |
| 6,067,570 A | 5/2000 | Kreynin et al. |
| 6,088,648 A | 7/2000 | Shah et al. |
| 6,123,241 A | 9/2000 | Walter et al. |
| 6,137,414 A | 10/2000 | Federman |
| 6,154,995 A | 12/2000 | Lenoir et al. |
| 6,166,688 A | 12/2000 | Cromer et al. |
| 6,211,581 B1 | 4/2001 | Farrant |
| 6,225,890 B1 | 5/2001 | Murphy |
| 6,225,906 B1 | 5/2001 | Shore |
| 6,232,877 B1 | 5/2001 | Ashwin |
| 6,232,884 B1 | 5/2001 | Gabbard |
| 6,244,758 B1 | 6/2001 | Solymar et al. |
| 6,285,868 B1 | 9/2001 | LaDue |
| 6,300,863 B1 | 10/2001 | Cotichini et al. |
| 6,422,061 B1 | 7/2002 | Sunshine et al. |
| 6,469,615 B1 | 10/2002 | Kady et al. |
| 6,480,108 B2 | 11/2002 | McDonald |
| 6,505,106 B1 | 1/2003 | Lawrence et al. |
| 6,507,914 B1 | 1/2003 | Cain et al. |
| 6,520,270 B2 | 2/2003 | Wissmach et al. |
| 6,530,498 B1 | 3/2003 | Ovadia |
| 6,536,536 B1 | 3/2003 | Gass et al. |
| 6,577,104 B2 | 6/2003 | Sakakibara |
| 6,577,238 B1 | 6/2003 | Whitesmith et al. |
| 6,600,418 B2 | 7/2003 | Francis et al. |
| 6,607,041 B2 | 8/2003 | Suzuki et al. |
| 6,614,349 B1 | 9/2003 | Proctor et al. |
| 6,615,130 B2 | 9/2003 | Myr |
| 6,628,323 B1 | 9/2003 | Wedmann |
| 6,674,368 B2 | 1/2004 | Hawkins |
| 6,677,895 B1 | 1/2004 | Holt |
| 6,698,415 B2 | 3/2004 | Garcia et al. |
| 6,714,859 B2 | 3/2004 | Jones |
| 6,731,908 B2 | 5/2004 | Berliner et al. |
| 6,738,628 B1 | 5/2004 | McCall et al. |
| 6,801,853 B2 | 10/2004 | Workman |
| 6,831,557 B1 | 12/2004 | Hess |
| 6,845,279 B1 | 1/2005 | Gilmore et al. |
| 6,853,303 B2 | 2/2005 | Chen et al. |
| 6,853,907 B2 | 2/2005 | Peterson et al. |
| 6,853,916 B2 | 2/2005 | Fuchs et al. |
| 6,859,761 B2 | 2/2005 | Bensky et al. |
| 6,872,121 B2 | 3/2005 | Wiesner et al. |
| 6,889,139 B2 | 5/2005 | Prabhakaran |
| 6,898,415 B2 | 5/2005 | Berliner et al. |
| 6,933,849 B2 | 5/2005 | Berliner et al. |
| 6,961,541 B2 | 11/2005 | Overy et al. |
| 6,963,289 B2 | 11/2005 | Aljadeff et al. |
| 6,967,563 B2 | 11/2005 | Bormaster |
| 6,968,194 B2 | 11/2005 | Aljadeff et al. |
| 6,972,682 B2 | 12/2005 | Lareau et al. |
| 6,989,749 B2 | 1/2006 | Mohr |
| 6,993,351 B2 | 1/2006 | Fraser et al. |
| 7,030,731 B2 | 4/2006 | Lastinger et al. |
| 7,034,659 B2 | 4/2006 | Ungs |
| 7,034,683 B2 | 4/2006 | Ghazarian |
| 7,036,703 B2 | 5/2006 | Grazioli et al. |
| 7,038,573 B2 | 5/2006 | Bann |
| 7,042,360 B2 | 5/2006 | Light et al. |
| 7,050,907 B1 | 5/2006 | Janky et al. |
| 7,064,502 B2 | 6/2006 | Garcia et al. |
| 7,084,740 B2 | 8/2006 | Bridgelall |
| 7,098,792 B1 | 8/2006 | Ahlf et al. |
| 7,099,669 B2 | 8/2006 | Sheffield |
| 7,103,511 B2 | 9/2006 | Petite |
| 7,119,612 B1 | 10/2006 | Bertness et al. |
| 7,119,686 B2 | 10/2006 | Bertness et al. |
| 7,123,149 B2 | 10/2006 | Nowak et al. |
| 7,139,581 B2 | 11/2006 | Berliner et al. |
| 7,171,187 B2 | 1/2007 | Haave et al. |
| 7,173,529 B2 | 2/2007 | Przygoda, Jr. |
| 7,182,148 B1 | 2/2007 | Szieff |
| 7,209,041 B2 | 4/2007 | Hines et al. |
| 7,211,972 B2 | 5/2007 | Garcia et al. |
| 7,218,227 B2 | 5/2007 | Davis et al. |
| 7,228,917 B2 | 6/2007 | Davis et al. |
| 7,245,219 B2 | 7/2007 | Tan et al. |
| 7,274,293 B2 | 9/2007 | Brad et al. |
| 7,277,009 B2 | 10/2007 | Hall et al. |
| 7,295,115 B2 | 11/2007 | Aljadeff et al. |
| 7,295,119 B2 | 11/2007 | Rappaport et al. |
| 7,298,240 B2 | 11/2007 | Lamar |
| 7,311,025 B1 | 12/2007 | Wilson, Jr. |
| 7,319,395 B2 | 1/2008 | Puzio et al. |
| 7,327,220 B2 | 2/2008 | Hess |
| 7,336,181 B2 | 2/2008 | Nowak et al. |
| 7,337,963 B2 | 3/2008 | Harper et al. |
| 7,339,477 B2 | 3/2008 | Puzio et al. |
| 7,346,358 B2 | 3/2008 | Wood et al. |
| 7,346,406 B2 | 3/2008 | Brotto et al. |
| 7,346,422 B2 | 3/2008 | Tsuchiya et al. |
| 7,382,272 B2 | 6/2008 | Feight |
| 7,391,299 B2 | 6/2008 | Bender et al. |
| 7,391,326 B2 | 6/2008 | Puzio et al. |
| 7,394,347 B2 | 7/2008 | Kady |
| 7,453,355 B2 | 11/2008 | Bergstrom et al. |
| 7,493,211 B2 | 2/2009 | Breen |
| 7,498,985 B1 | 3/2009 | Woo et al. |
| 7,522,049 B2 | 4/2009 | Aljadeff et al. |
| 7,540,334 B2 | 6/2009 | Gass et al. |
| 7,551,089 B2 | 6/2009 | Sawyer |

(56) References Cited

U.S. PATENT DOCUMENTS

| | | |
|---|---|---|
| 7,574,172 B2 | 8/2009 | Clark et al. |
| 7,576,635 B2 | 8/2009 | Bender et al. |
| 7,612,654 B2 | 11/2009 | Bender et al. |
| 7,613,590 B2 | 11/2009 | Brown |
| 7,638,958 B2 | 12/2009 | Philipp et al. |
| 7,639,119 B2 | 12/2009 | Carrender et al. |
| 7,640,105 B2 | 12/2009 | Nielsen et al. |
| 7,649,464 B2 | 1/2010 | Puzio et al. |
| 7,652,576 B1 | 1/2010 | Crossno et al. |
| D609,182 S | 2/2010 | Ladewig et al. |
| 7,669,765 B2 | 3/2010 | Harper et al. |
| 7,675,410 B2 | 3/2010 | Aritsuka et al. |
| 7,681,311 B2 | 3/2010 | Kaminski |
| 7,688,028 B2 | 3/2010 | Phillips et al. |
| 7,693,610 B2 | 4/2010 | Ying |
| 7,729,707 B2 | 6/2010 | Aljadeff et al. |
| 7,734,476 B2 | 6/2010 | Wildman et al. |
| 7,753,272 B2 | 6/2010 | Harper et al. |
| 7,750,811 B2 | 7/2010 | Puzio et al. |
| 7,755,482 B2 | 7/2010 | Hubbard |
| 7,777,612 B2 | 8/2010 | Sampson et al. |
| 7,782,626 B2 | 8/2010 | Buck et al. |
| 7,784,104 B2 | 8/2010 | Innami et al. |
| 7,786,861 B2 | 8/2010 | Howarth et al. |
| 7,787,981 B2 | 8/2010 | Atin et al. |
| 7,801,506 B2 | 9/2010 | Haave et al. |
| 7,802,198 B2 | 9/2010 | Obradovich |
| 7,817,405 B2 | 10/2010 | Neumann et al. |
| 7,834,765 B2 | 11/2010 | Sawyer |
| 7,834,766 B2 | 11/2010 | Sawyer |
| 7,848,085 B2 | 12/2010 | Gerber |
| 7,848,765 B2 | 12/2010 | Phillips et al. |
| 7,852,222 B2 | 12/2010 | Johnson et al. |
| 7,859,417 B2 | 12/2010 | Harper et al. |
| 7,876,205 B2 | 1/2011 | Catten et al. |
| 7,907,053 B2 | 3/2011 | Wildman et al. |
| 7,911,344 B2 | 3/2011 | Augt et al. |
| 7,928,845 B1 | 4/2011 | LaRosa |
| 7,973,678 B2 | 7/2011 | Petricoin, Jr. et al. |
| 7,973,707 B2 | 7/2011 | Verechtchiagine |
| 7,982,624 B2 | 7/2011 | Richter et al. |
| 7,999,670 B2 | 8/2011 | McClellan et al. |
| 8,002,180 B2 | 8/2011 | Harper et al. |
| 8,004,664 B2 | 8/2011 | Etter et al. |
| 8,005,647 B2 | 8/2011 | Armstrong et al. |
| 8,018,329 B2 | 9/2011 | Morgan et al. |
| 8,026,814 B1 | 9/2011 | Heinze et al. |
| 8,044,796 B1 | 10/2011 | Carr, Sr. |
| 8,049,636 B2 | 11/2011 | Buckingham et al. |
| 8,059,005 B2 | 11/2011 | Henricks et al. |
| 8,084,686 B2 | 12/2011 | Ladewig et al. |
| 8,095,070 B2 | 1/2012 | Twitchell, Jr. |
| D656,099 S | 3/2012 | Gerber |
| 8,159,345 B2 | 4/2012 | Stevens |
| 8,169,298 B2 | 5/2012 | Wiesner et al. |
| 8,208,939 B2 | 6/2012 | Aljadeff et al. |
| 8,265,816 B1 | 9/2012 | LaFrance |
| 8,292,657 B2 | 10/2012 | Singh |
| 8,542,090 B2 | 9/2013 | Calvet et al. |
| 8,674,823 B1 | 3/2014 | Contario et al. |
| 9,055,033 B2 | 6/2015 | Mergener |
| 9,466,198 B2 | 10/2016 | Burch et al. |
| 9,949,075 B2 | 4/2018 | Burch et al. |
| 10,158,213 B2 | 12/2018 | Burch |
| 10,285,003 B2 | 5/2019 | Burch et al. |
| 2002/0033267 A1 | 3/2002 | Schwiezer et al. |
| 2002/0089434 A1 | 7/2002 | Ghazarian |
| 2002/0128769 A1 | 9/2002 | Der Ghazarian et al. |
| 2002/0153418 A1 | 10/2002 | Maloney |
| 2003/0043016 A1 | 3/2003 | Kady et al. |
| 2003/0069648 A1 | 4/2003 | Douglas et al. |
| 2003/0069694 A1 | 4/2003 | Fuchs et al. |
| 2003/0102970 A1 | 6/2003 | Creel et al. |
| 2003/0117316 A1 | 6/2003 | Tischer |
| 2003/0228846 A1 | 12/2003 | Berliner et al. |
| 2004/0107126 A1 | 6/2004 | Kataoka et al. |
| 2004/0108120 A1 | 6/2004 | Weisner et al. |
| 2004/0150508 A1 | 8/2004 | Mosgrove et al. |
| 2004/0203870 A1 | 10/2004 | Aljadeff et al. |
| 2004/0217864 A1 | 11/2004 | Nowak et al. |
| 2005/0035659 A1 | 2/2005 | Hahn et al. |
| 2005/0071124 A1 | 3/2005 | Komatsu |
| 2005/0078006 A1 | 4/2005 | Hutchins et al. |
| 2005/0110639 A1 | 5/2005 | Puzio et al. |
| 2005/0122650 A1 | 6/2005 | Beasley, III et al. |
| 2005/0128083 A1 | 6/2005 | Puzio et al. |
| 2005/0150952 A1 | 7/2005 | Chung |
| 2005/0156711 A1 | 7/2005 | Aljadeff et al. |
| 2005/0197115 A1 | 9/2005 | Clarke et al. |
| 2005/0207381 A1 | 9/2005 | Aljadeff et al. |
| 2005/0222933 A1 | 10/2005 | Wesby |
| 2005/0225427 A1 | 10/2005 | Bell et al. |
| 2005/0240495 A1 | 10/2005 | Harper et al. |
| 2006/0071753 A1 | 4/2006 | Lamar |
| 2006/0087283 A1 | 4/2006 | Phillips et al. |
| 2006/0155582 A1 | 7/2006 | Brown |
| 2006/0170395 A1 | 8/2006 | Yoshimizu et al. |
| 2006/0187023 A1 | 8/2006 | Iwamura |
| 2006/0256007 A1 | 11/2006 | Rosenberg |
| 2006/0264173 A1 | 11/2006 | Gilbert |
| 2006/0289213 A1 | 12/2006 | Cervantes |
| 2007/0021100 A1 | 1/2007 | Haave et al. |
| 2007/0108273 A1 | 5/2007 | Harper et al. |
| 2007/0115127 A1 | 5/2007 | Harper et al. |
| 2007/0160028 A1 | 7/2007 | Hein-Magnsen et al. |
| 2007/0194942 A1 | 8/2007 | Darr |
| 2007/0198748 A1 | 8/2007 | Ametsitsi et al. |
| 2007/0200664 A1 | 8/2007 | Proska et al. |
| 2007/0252675 A1 | 11/2007 | Lamar |
| 2007/0252696 A1 | 11/2007 | Belisle et al. |
| 2008/0020781 A1 | 1/2008 | Cho |
| 2008/0037512 A1 | 2/2008 | Aljadeff et al. |
| 2008/0086266 A1 | 4/2008 | Howard et al. |
| 2008/0100416 A1 | 5/2008 | Harper et al. |
| 2008/0164311 A1 | 7/2008 | Harper et al. |
| 2008/0165013 A1 | 7/2008 | Harper et al. |
| 2008/0180241 A1 | 7/2008 | Hess |
| 2008/0207267 A1 | 8/2008 | Gose |
| 2008/0208522 A1 | 8/2008 | Lucke |
| 2008/0236220 A1 | 10/2008 | Calvet et al. |
| 2008/0238609 A1 | 10/2008 | Wiesner et al. |
| 2008/0252431 A1 | 10/2008 | Nigam |
| 2008/0252446 A1 | 10/2008 | Dammertz |
| 2008/0269978 A1 | 10/2008 | Shirole et al. |
| 2008/0319665 A1 | 12/2008 | Berkobin et al. |
| 2009/0015372 A1 | 1/2009 | Kady |
| 2009/0058185 A1 | 3/2009 | Schoettle |
| 2009/0115609 A1 | 5/2009 | Weaver |
| 2009/0121846 A1 | 5/2009 | Rye et al. |
| 2009/0143065 A1 | 6/2009 | Mattila |
| 2009/0170525 A1 | 7/2009 | Baghdasaryan |
| 2009/0177337 A1 | 7/2009 | Yuet et al. |
| 2009/0208924 A1 | 8/2009 | Hermiston et al. |
| 2009/0250364 A1 | 10/2009 | Gerold et al. |
| 2009/0251330 A1 | 10/2009 | Gerold et al. |
| 2009/0251880 A1 | 10/2009 | Anderson |
| 2009/0254203 A1 | 10/2009 | Gerold et al. |
| 2009/0268380 A1 | 10/2009 | Brown et al. |
| 2009/0273436 A1 | 11/2009 | Gluck et al. |
| 2009/0273465 A1 | 11/2009 | Shamir et al. |
| 2009/0291722 A1 | 11/2009 | Li et al. |
| 2010/0069087 A1 | 3/2010 | Chow et al. |
| 2010/0096151 A1 | 4/2010 | Ostling |
| 2010/0137021 A1 | 6/2010 | Sharret et al. |
| 2010/0216415 A1 | 8/2010 | Arimura et al. |
| 2010/0226391 A1 | 9/2010 | Miyazaki et al. |
| 2010/0251391 A1 | 9/2010 | Adrangi |
| 2010/0282482 A1 | 11/2010 | Atin et al. |
| 2010/0289333 A1 | 11/2010 | Gilpatrick |
| 2011/0050501 A1 | 3/2011 | Aljadeff |
| 2011/0087612 A1 | 4/2011 | Yuasa et al. |
| 2011/0195701 A1 | 8/2011 | Cook et al. |
| 2011/0202307 A1 | 8/2011 | Petereir et al. |
| 2011/0215977 A1 | 9/2011 | Van Driel |

(56) References Cited

U.S. PATENT DOCUMENTS

| | | |
|---|---|---|
| 2011/0273296 A1 | 11/2011 | Laase et al. |
| 2011/0309931 A1 | 12/2011 | Rose |
| 2012/0058759 A1 | 3/2012 | Lundborg |
| 2012/0092811 A1 | 4/2012 | Chapel et al. |
| 2012/0094683 A1 | 4/2012 | Yoeli |
| 2012/0110329 A1 | 5/2012 | Brown et al. |
| 2012/0111589 A1 | 5/2012 | Schmidt et al. |
| 2012/0115623 A1 | 5/2012 | Van Driel |
| 2012/0173033 A1 | 7/2012 | Tischer |
| 2013/0109375 A1 | 5/2013 | Zeiler et al. |
| 2013/0255980 A1 | 10/2013 | Linehan et al. |
| 2019/0222957 A1 | 7/2019 | Burch et al. |

FOREIGN PATENT DOCUMENTS

| | | |
|---|---|---|
| DE | 4429206 | 3/1996 |
| DE | 10029132 | 1/2002 |
| DE | 10029138 | 1/2002 |
| DE | 10037226 | 2/2002 |
| DE | 10238710 | 3/2004 |
| DE | 10303006 | 8/2004 |
| DE | 10309703 | 9/2004 |
| DE | 102004046415 | 4/2005 |
| DE | 202006014606 | 1/2007 |
| DE | 102005044649 | 4/2007 |
| EP | 268902 | 6/1988 |
| EP | 451482 | 10/1991 |
| EP | 674973 | 10/1995 |
| EP | 1411478 | 4/2004 |
| EP | 1902817 | 3/2008 |
| GB | 2387744 | 10/2003 |
| GB | 2405559 | 4/2006 |
| JP | 2002260611 | 9/2002 |
| JP | 2005208808 | 8/2005 |
| WO | WO9723986 | 7/1997 |
| WO | WO200245029 | 6/2002 |
| WO | WO2003044743 | 5/2003 |
| WO | WO2004010387 | 1/2004 |
| WO | WO2006036481 | 4/2006 |
| WO | WO2007042924 | 4/2007 |
| WO | WO2009013045 | 1/2009 |
| WO | WO2010068438 | 6/2010 |
| WO | WO2011008082 | 1/2011 |

OTHER PUBLICATIONS

Bar-Gera, "Evaluation of a Cellular Phone-Based System for Measurements of Traffic Speeds and Travel Times: A Case Study form Israel," Transportation Research Part C 15 (2007) pp. 380-391.
Coleman Cable Inc., "Temporary Lighting Contractor Jobsite Power", LT200-07-01, 2010, 48 pages.
Coleman Cable Inc., "Xtreme Box Temporary Power Distribution Centers" <https://www.ccixpress.com/webapp/wcs/stores/servlet/CategoryDisplay?catalogId=10101&storeId=10051&langId=-1&top=Y&bu=%24%24&categoryId=10645&channel=%24&customer=> webpage accessed Jan. 25, 2013.
Construction Electrical Products, "Temporary Power Boxes", 2013, 2 pages.
Cooper Industries, "RhinoBox Power Centers—RB300, RB301, RB302, RB303, RB3001, RB3021" <http://www.cooperindustries.com/content/public/en/wiring_devices/products/temporary_power/rhinobox_power_centers/rhinobox_power_centers_rb300_rb301_rb302_rb303_rb3001_rb3021.html> webpage accessed Jan. 25, 2013.
Cooper Wiring Devices, "Temporary Power Solutions", publicly available at least as early as Jan. 25, 2013 (6 pages).
Dewalt DS500 Quick Setup & Installation Guide, Mobile Lock GPS Locator with Anti-Theft Alarm, 2006, 2 pages.
Dewalt Instruction Manual, Mobile Lock GPS Locator with Anti-Theft Alarm, Aug. 8, 2006, pp. 1-38.
Dewalt Mobile Lock GPS Locator with Anti-Theft Alarm DS500, pp. 1-11, 2007.
Hubbell Wiring, "Single Pole Devices and Temporary Power" publicly available at least as early as Jan. 25, 2013 (10 pages).
Hull et al., "CarTel: A Distributed Mobile Sensor Computing System," MIT Computer Sci & AI Laboratory, SenSys, 2006.
Leviton, "The Box Temporary Power Distribution Centers" <http://www.leviton.com/OA_HTML/SectionDisplay.jsp?section=40481&minisite=10251> webpage accessed Jan. 25, 2013.
Renton et al., "Internet-Based Manufacturing Process Optimization and Monitoring System," Proceedings of the 2002 IEEE International Conference on Robotics & Automation, Washington, DC, May 2002.
Song, "Automatic Vehicle Location in Cellular Communications Systems," IEEE, vol. 43, No. 4, pp. 902-908, Nov. 1994.
PCT/US2012/062277 International Search Report and Written Opinion dated Mar. 4, 2013 (7 pages).
United States Patent Office Action for U.S. Appl. No. 13/662,093 dated Jun. 2, 2014 (12 pages).
United States Patent Office Action for U.S. Appl. No. 13/662,093 dated Nov. 10, 2014 (13 pages).
United States Patent Office Action for U.S. Appl. No. 13/662,093 dated May 28, 2015 (14 pages).
United States Patent Office Final Rejection for U.S. Appl. No. 13/662,093 dated Nov. 13, 2015 (17 pages).
United States Patent Office Action for U.S. Appl. No. 14/185,594 dated Jan. 5, 2016 (8 pages).
United States Patent Office Action for Application No. 14/959,934 dated Mar. 4, 2016 (11 pages).
United States Patent Office Notice of Allowance for U.S. Appl. No. 14/185,594 dated Mar. 17, 2016 (7 pages).
United States Patent Office Notice of Allowance for U.S. Appl. No. 13/662,093 dated May 11, 2016 (7 pages).
United States Patent Office Action for U.S. Appl. No. 14/185,539 dated Jul. 1, 2016 (22 pages).
United States Patent Office Final Rejection for U.S. Appl. No. 14/959,934 dated Aug. 29, 2016 (13 pages).
United States Patent Office Final Rejection for U.S. Appl. No. 14/185,539 dated Mar. 23, 2017 (25 pages).
United States Patent Office Action for U.S. Appl. No. 15/266,433 dated May 23, 2017 (7 pages).
United States Patent Office Final Rejection for U.S. Appl. No. 14/959,934 dated Aug. 17, 2017 (16 pages).
United States Patent Office Action for U.S. Appl. No. 14/185,539 dated Nov. 2, 2017 (30 pages).
United States Patent Office Notice of Allowance for U.S. Appl. No. 15/266,443 dated Nov. 16, 2017 (7 pages).
United States Patent Office Action for U.S. Appl. No. 14/185,539 dated May 17, 2018, 20 pages.
United States Patent Office Final Rejection for U.S. Appl. No. 14/185,539 dated May 29, 2018, 31 pages.
United States Patent Office Action for U.S. Appl. No. 16/363,263, dated Jul. 12, 2019, 6 pages.
United States Patent Office Action for U.S. Appl. No. 16/184,675 dated Oct. 4, 2019 (22 pages).

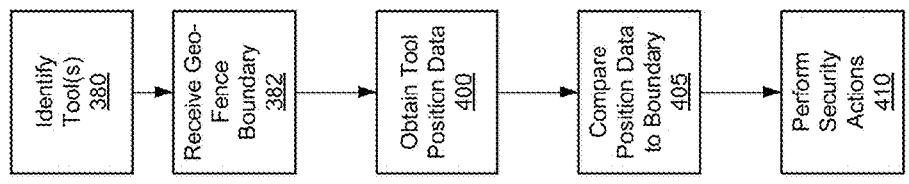
FIG. 6B  Geo-Fence Method
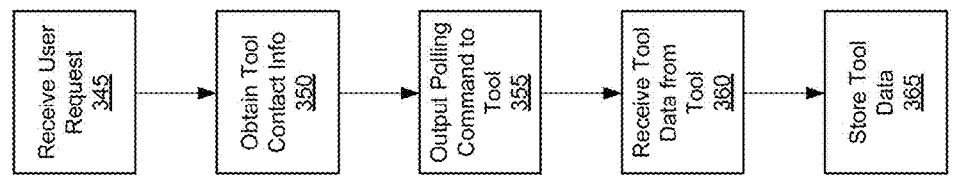
FIG. 6A  Tool Polling

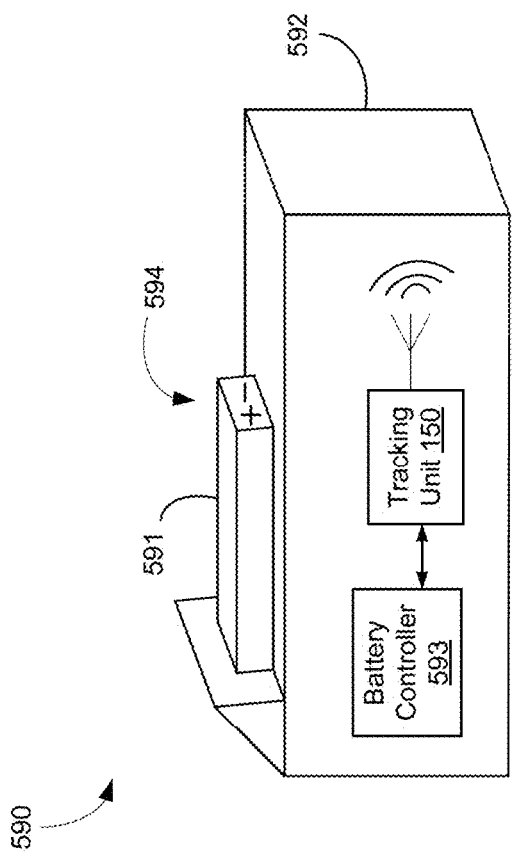
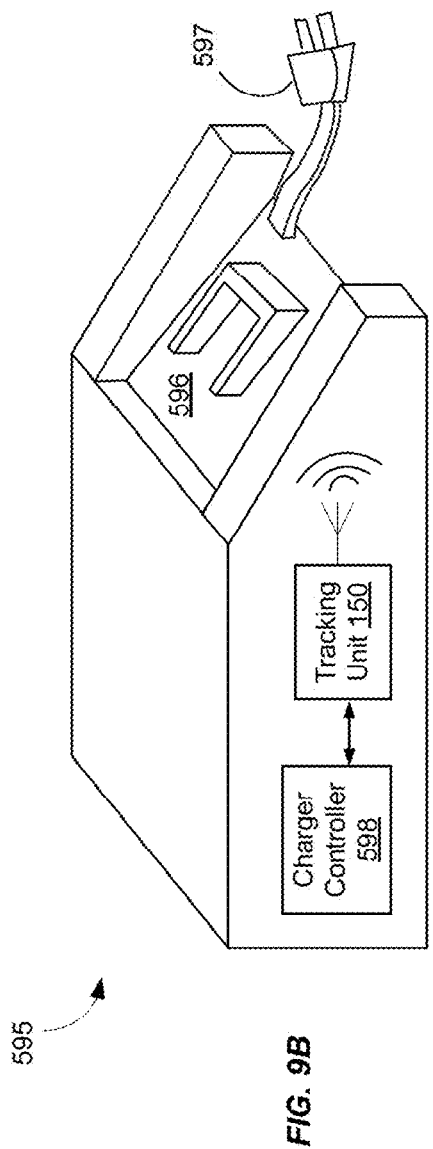
FIG. 9A
FIG. 9B

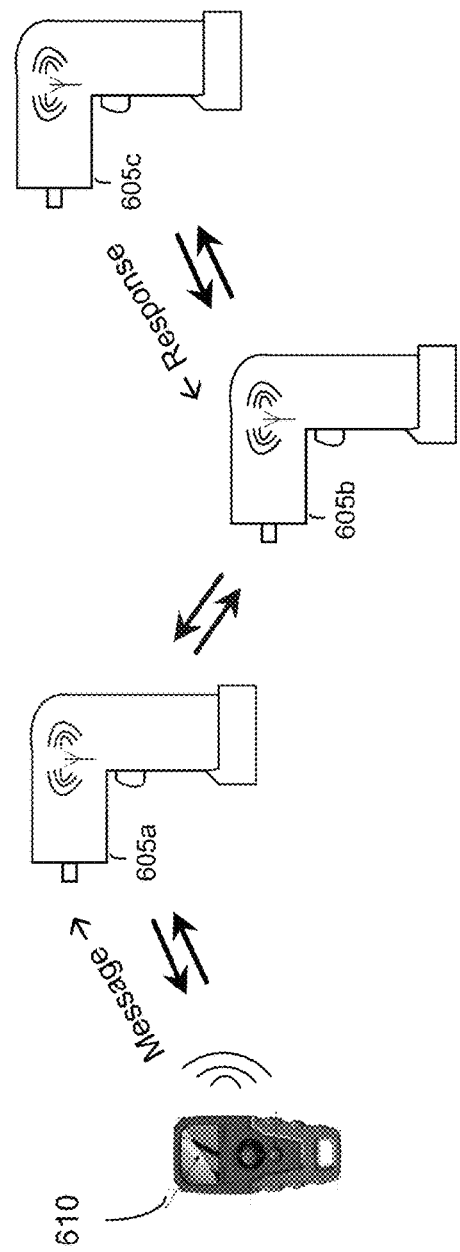
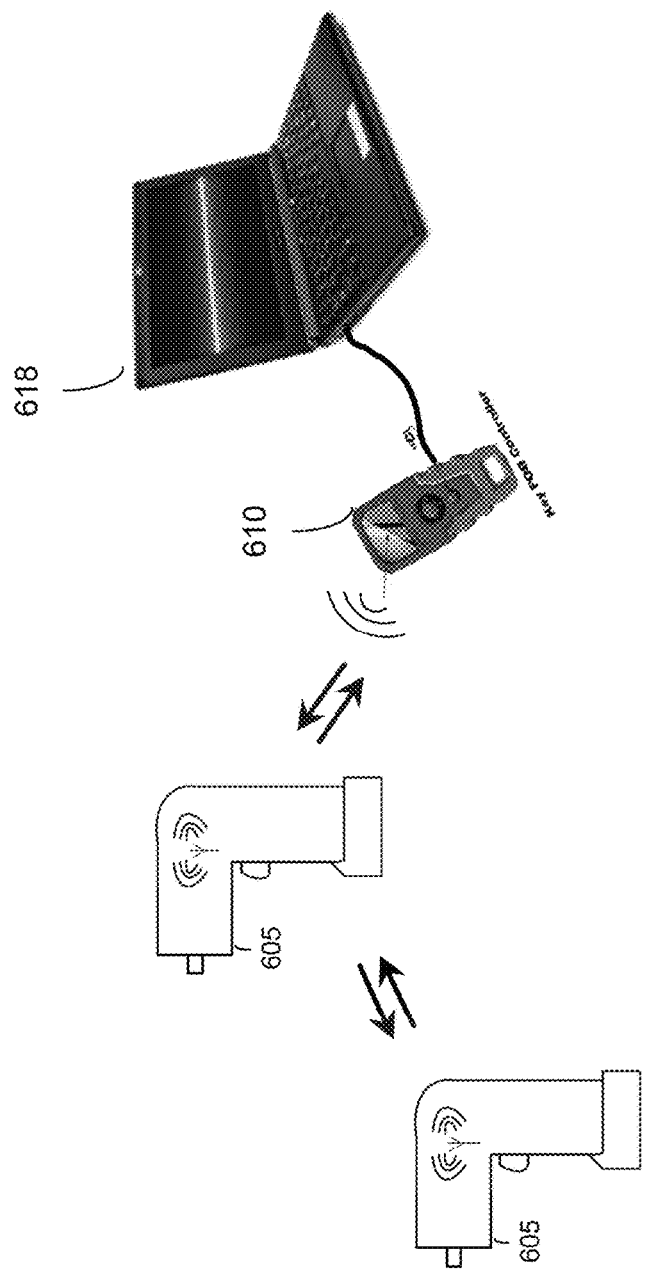
FIG. 11A
FIG. 11B

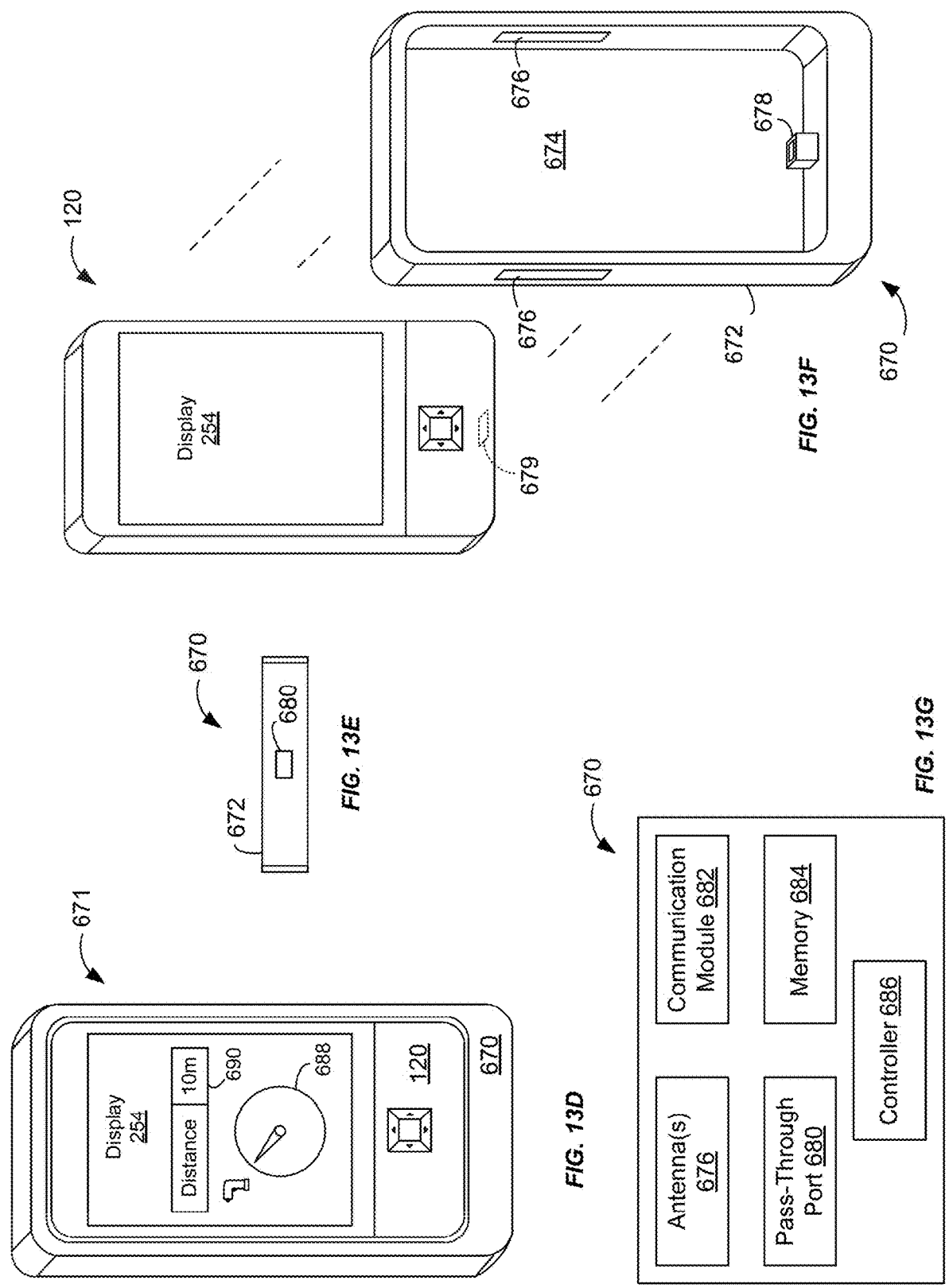

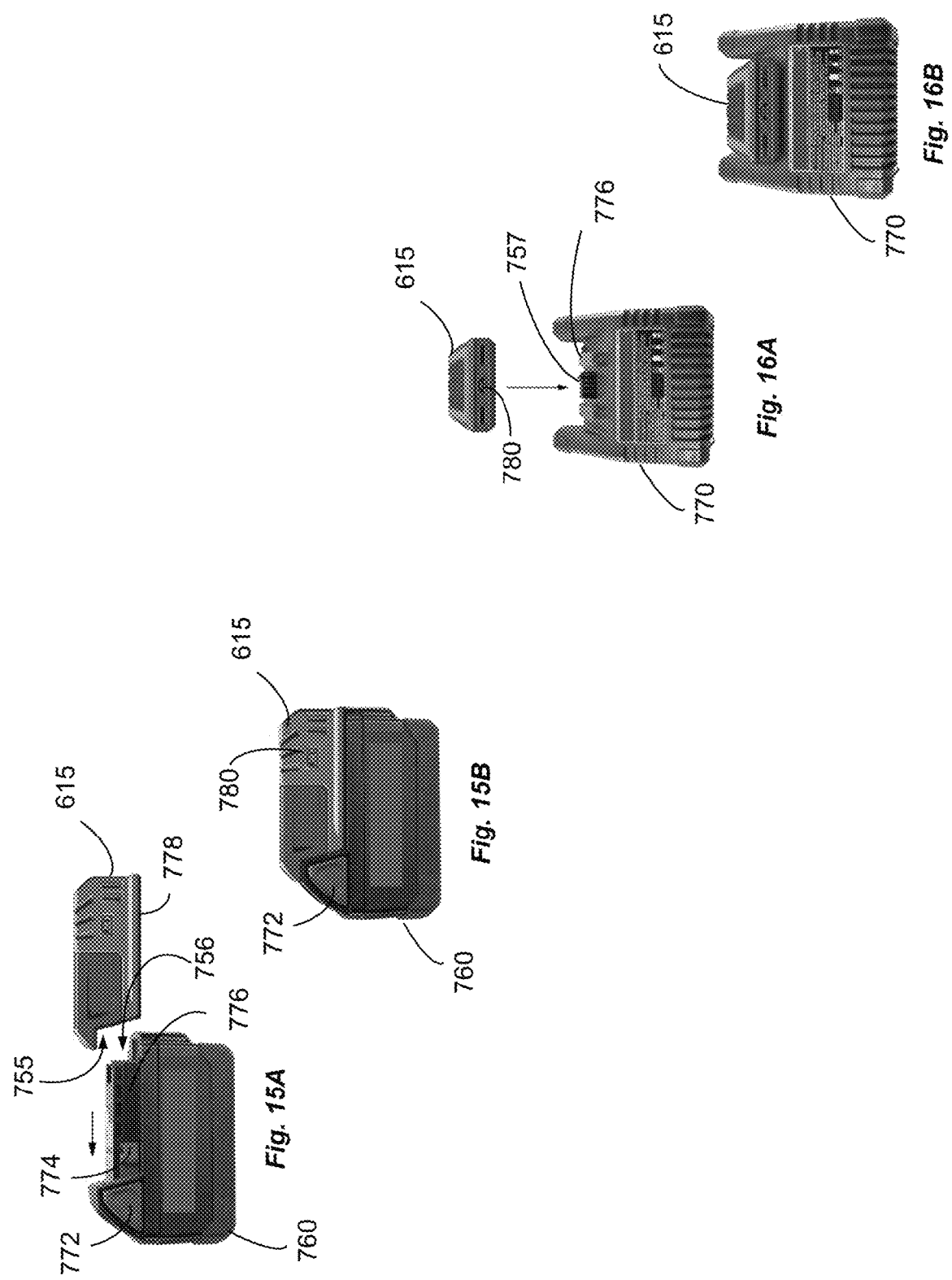

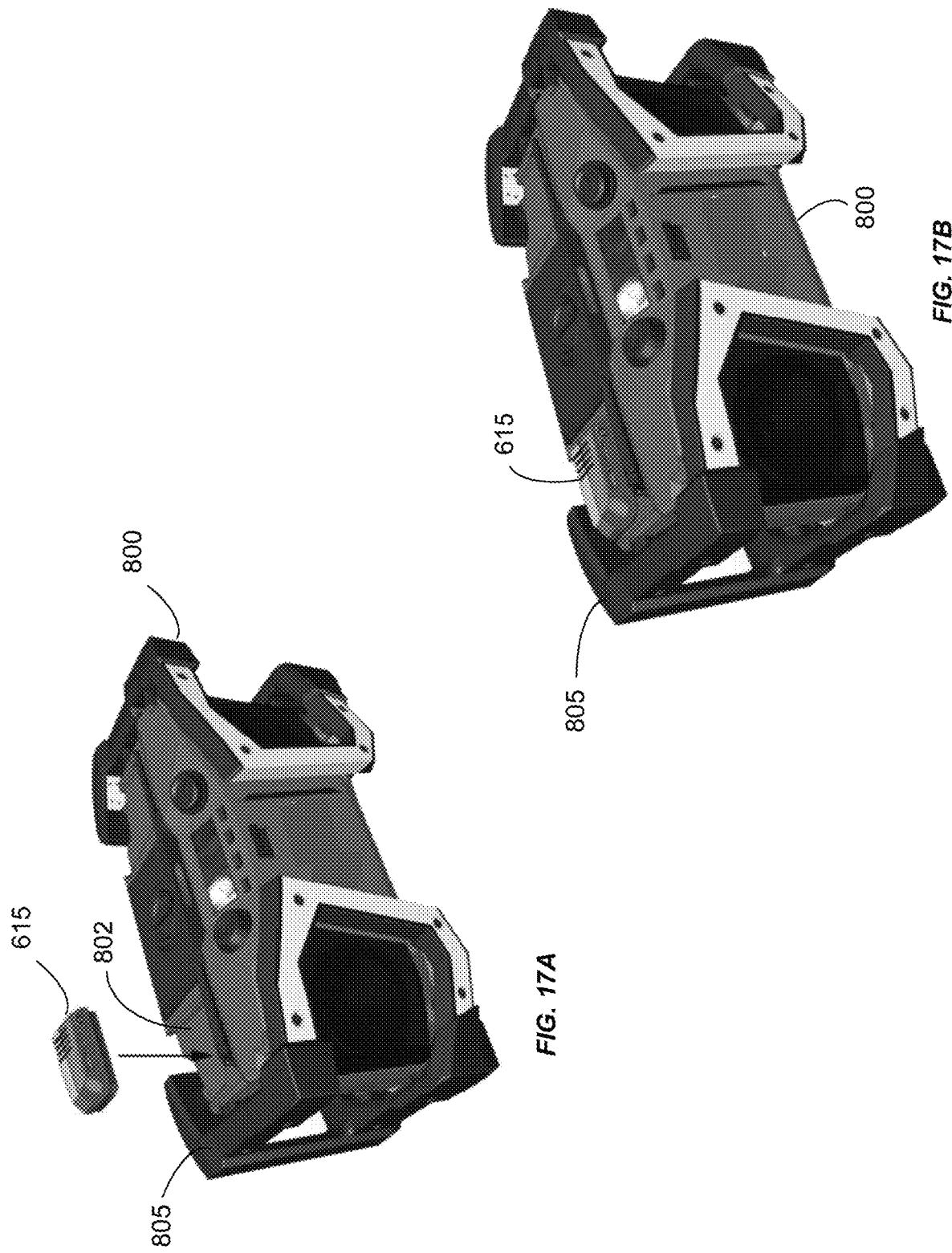

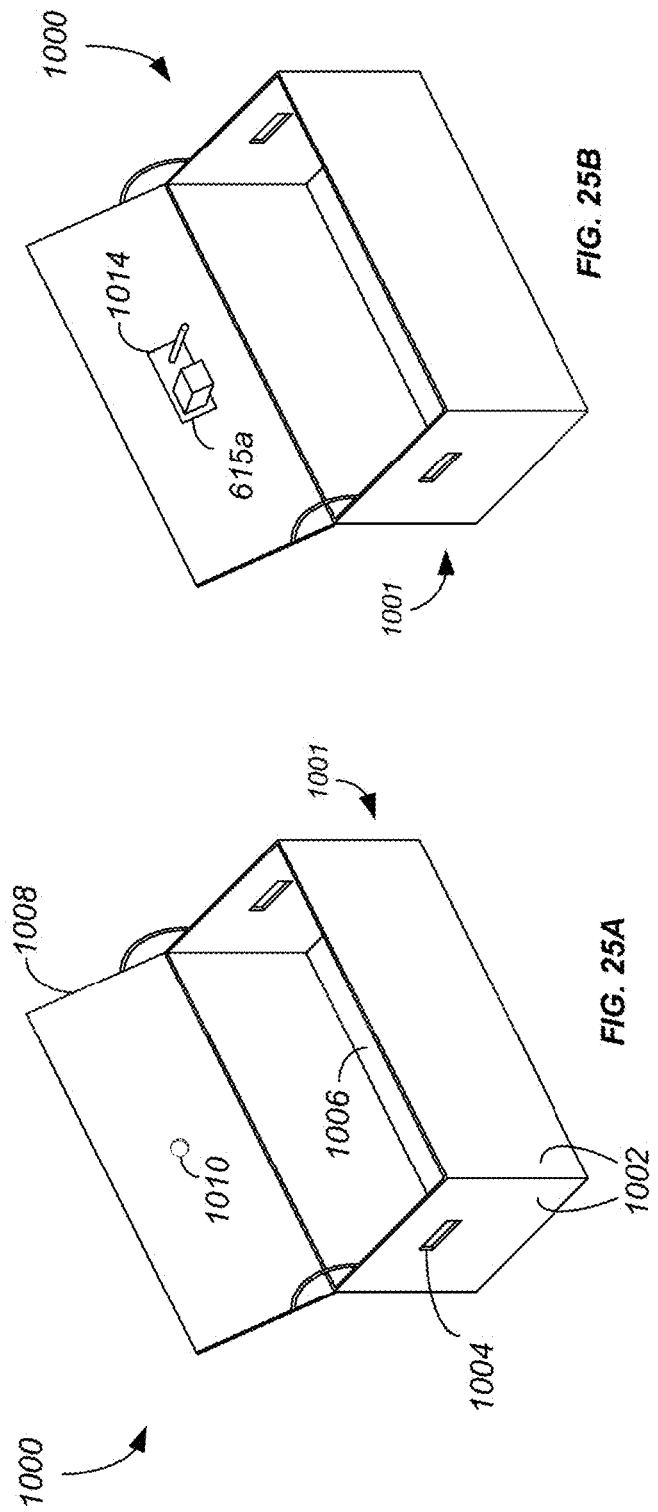

WIRELESS TRACKING OF POWER TOOLS AND RELATED DEVICES

RELATED APPLICATIONS

The present application is a continuation of U.S. patent application Ser. No. 14/959,934, filed Dec. 4, 2015, which claims priority to U.S. patent application Ser. No. 13/662,093, filed Oct. 26, 2012, now U.S. Pat. No. 9,467,862, which claims priority to U.S. Provisional Application 61/551,793, filed Oct. 26, 2011; U.S. Provisional Application 61/638,102, filed Apr. 25, 2012; and U.S. Provisional Application 61/676,115, filed Jul. 26, 2012, the entire contents of each of which are hereby incorporated by reference.

FIELD OF THE INVENTION

The invention relates to systems and methods for tracking power tools and related devices.

SUMMARY

Theft and misplacement of power tools at job sites and during transportation are significant problems for professional power tool users. Higher costing and higher quality power tools often are subject to a greater risk of thievery. In some instances, potential buyers choose lower costing and lower quality power tools to reduce the chances or impact of theft. Additionally, periodically checking inventory of such tools, for instance, to ensure all tools are returned at the end of a work day, can be a burdensome and cumbersome process. The burden is particularly significant for businesses responsible for maintaining a large corral of tools.

Finding a low cost method for tool owners to remotely monitor and locate their power tools provides owners with a powerful theft deterrent system, and also improves the efficiencies of day-to-day work by allowing a new way to track and monitor the use and location of their tools. For example, tool inventory can be done automatically before work starts in the morning, and once again at the end of the day to verify tools are returned to the proper location.

Embodiments of the invention provide a method and system for wirelessly tracking power tools and related devices to address the above-noted issues and to provide other benefits, as will become apparent from consideration of the detailed description and accompanying drawings.

In one embodiment, the invention provides a gateway device including a power interface, a wireless network module, a cellular module, and a translation module. The power interface is configured to selectively engage a power source interface of at least one of a power tool battery, a power tool battery charger, and a worksite audio device. The wireless network module is configured to wirelessly communicate with a wireless network having at least one power tool device. The cellular module is configured to wirelessly communicate via a cellular network. The translation module is coupled to the wireless network module and the cellular module. Additionally, the translation module is configured to provide translated communications received from the wireless network via the wireless network module to the cellular module for output to the cellular network, and translated communications received from the cellular network via the cellular module to the wireless network module for output to the wireless network.

In another embodiment, the invention provides a gateway device including a power interface, a wireless network module, and a cellular module. The power interface is configured to selectively engage a power source interface of a power tool battery, which is operable to engage and provide power to a power tool when not engaged to the power interface. The wireless network module is coupled to the power interface to receive power therefrom. Additionally, the wireless network module is configured to wirelessly communicate, at a first power level, with a wireless network having at least one power tool device. The cellular module is coupled to the power interface to receive power therefrom. Additionally, the cellular module is configured to wirelessly communicate via a cellular network at a second power level, the second power level being greater than the first power level.

In another embodiment, the invention provides worksite audio device-gateway including a housing, a power circuit, an audio circuit, and a gateway device. The power circuit receives power from one of a removable DC source and an AC source. The audio circuit is coupled to the power circuit for receipt of power and is positioned within the housing. Additionally, the audio circuit generates audio signals and provides the audio signals to a speaker. The gateway device is coupled to the power circuit for receipt of power. The gateway device includes a wireless network module configured to wirelessly communicate with a wireless network having at least one power tool device, and a cellular module configured to wirelessly communicate via a cellular network.

In another embodiment, the invention provides a gateway device including a power interface, a wireless network module, and a cellular module. The power interface is configured to selectively engage a power source interface of a power tool battery charger, which is operable to engage and charge a power tool battery via the power source interface when not engaged to the power interface. The wireless network module is coupled to the power interface to receive power therefrom. Additionally, the wireless network module is configured to wirelessly communicate, at a first power level, with a wireless network having at least one power tool device. The cellular module is coupled to the power interface to receive power therefrom and configured to wirelessly communicate via a cellular network at a second power level. The second power level is greater than the first power level.

In another embodiment, the invention provides a method of operating a gateway device comprising a power interface, a wireless network module, a cellular module, and a translation module. The method includes selectively engaging the power interface with a power source interface of at least one of a power tool battery, a power tool battery charger, and a worksite audio device. The method further includes wirelessly communicating, via the wireless network module, with a wireless network having at least one power tool device; and wirelessly communicating, via the cellular module, with a cellular network. The translation module is coupled to the wireless network module and the cellular module. Additionally, the translation module translates communications received from the wireless network via the wireless network module to the cellular module for output to the cellular network, and translates communications received from the cellular network via the cellular module to the wireless network module for output to the wireless network.

In another embodiment, the invention provides a two-piece gateway including an external portion and an internal portion on opposite sides of a divider, such as a wall or lid. The external portion includes at least one wireless network antenna and a cellular antenna. The internal portion includes a power interface, a wireless network module, a cellular module, and a translation module. The power interface is configured to selectively engage a power source interface of a battery, such as a power tool battery. The wireless network module is coupled to the wireless network antenna and is configured to wirelessly communicate via the wireless network antenna with a wireless network having at least one power tool device. The cellular module is coupled to the cellular antenna and configured to wirelessly communicate, via the cellular antenna, with the cellular network. The translation module is coupled to the wireless network module and the cellular module. Additionally, the translation module is configured to provide translated communications received from the wireless network via the wireless network module to the cellular module for output to the cellular network, and translated communications received from the cellular network via the cellular module to the wireless network module for output to the wireless network.

In some instances, the internal portion further includes an internal wireless network module. The internal wireless network module is coupled to the wireless network module and is used to communicate with wireless devices on the internal portion side of the divider. In some instances, the two-piece gateway is mounted to a job box, which is used to tools and/or materials, such as on a worksite. The two-piece gateway may be mounted to the lid of the job box such that the lid is the divider. The external portion is outside of the job box and the internal portion is within the job box, e.g., when the lid is closed. In some instances, the two-piece gateway is mounted to a vehicle, such as a truck or van with a space for storing tools and/or materials. The two-piece gateway may be mounted to a divider near the top of the space of the vehicle used to store tools and/or materials. In some instances, the external portion is covered by a rigid, protective covering, such as polyurethane dome.

In one embodiment, the invention provides a wireless tool tethering method. The method includes storing a first security code in a power tool powered by a battery; detecting, by a controller of the power tool, a trigger activation by a user; and initiating a handshake with the battery in response to the detected trigger activation. The controller receives a second security code from the battery and determines whether the second security code matches the first security code. When the second security code matches the first security code, the tool is enabled to operate in a normal mode. When the second security code does not match the first security code, the tool is placed in one of a lock-out mode and a limp mode.

In another embodiment, the invention provides another wireless tool tethering method. The method includes storing a first security code in a power tool battery; receiving, wirelessly by a battery controller of the power tool battery, a second security code from a fob; and determining, by the battery controller, whether the second security code matches the first security code. The battery controller further receives a handshake request from a power tool coupled to the power tool battery. In response to the handshake request, the battery controller provides to the power tool the first security code to the power tool, when the second security code is determined to match the first security code, and an indication of an invalid security code, when the second security code is determined to not match the first security code. In response to receiving the indication of the invalid security code, the power tool is placed in one of a lock-out mode and a limp mode.

In another embodiment, the invention provides another wireless tool tethering method. The method includes storing a first security code in a power tool battery; receiving, wirelessly by a battery controller of the power tool battery, a second security code from a fob; and determining, by the battery controller, whether the second security code matches the first security code. The battery controller receives a handshake request from a power tool coupled to the power tool battery. In response to the handshake request, the battery controller provides a simulated error code to the power tool, when the second security code is determined to not match the first security code, and a handshake response to the power tool indicating that the battery is operating normally, when the second security code is determined to match the first security code. In response to the simulated error code, the power tool is placed in one of a lock-out mode and a limp mode.

In one embodiment, the invention provides a tool tracking system having a monitored tool, a fob device, a gateway device, and a remote monitoring device. The monitored tool includes a tracking unit and one of a power tool battery and a connector for receiving power from an external AC power source. The tracking unit includes an energy storage device that powers the tracking unit, a tool communication unit that communicates over a mesh wireless network, and a user output device that, in response to receiving a chirp message via the tool communication unit, generates user output to alert a user. The fob device includes a fob communication unit, a tool database, a chirp module, a locate module, a geo-fence module, and a tool security module. The fob communication unit communicates with the monitored tool over the mesh wireless network, a tool database storing a tool identifier (ID) of the monitored tool. The chirp module sends the chirp message, in response to user input, to the monitored tool over the mesh wireless network. The locate module sends a locate message to the monitored tool, receives a response from the monitored tool, and determines a distance between the fob device and the monitored tool based on the response. The geo-fence module receives a tool boundary, determines a position of the monitored tool, compares the position to the tool boundary, and determines whether the monitored tool has exceeded the tool boundary. The tool security module sends a lock command to the monitored tool via the communication unit in response to the geo-fence module determining that the monitored tool has exceeded the tool boundary.

The gateway device of the tool tracking system includes a mesh network communications module, a cellular communications module, and a translation controller. The mesh network communications module communicates with the fob device and the monitored tool over the mesh wireless network. The cellular communications module communicates with a remote monitoring device over a cellular network. The translation controller (a) receives incoming mesh network messages from the mesh network communications module, translates the incoming mesh network messages to outgoing cellular messages, and outputs the outgoing cellular messages via the cellular communications module, and (b) receives incoming cellular messages from the cellular communications module, translates the incoming cellular messages to outgoing mesh network messages, and outputs the outgoing mesh network messages via the mesh network communications module.

The remote monitoring device of the tool tracking system includes a cellular communications radio that communicates with the gateway device via the cellular network, and a tool monitoring module. The tool monitoring module includes a remote tool polling module, a remote geo-fence module, a remote tool security module, and a remote tool database. The remote tool polling module sends, in response to a user request, a poll command to the monitored tool via the gateway, and receives, in response to the poll command, tool data from the monitored tool via the gateway. The remote geo-fence module receives a second tool boundary, receives position data for the monitored tool from the gateway, compares the position data to the second tool boundary, and determines whether the monitored tool has exceeded the second tool boundary. The remote tool security module sends a lock command to the monitored tool via the communication unit in response to the geo-fence module determining that the monitored tool has exceeded the second tool boundary. The remote tool database stores tool identification information and the position data received from the communication unit.

In another embodiment, the invention provides a tool tracking system including a monitored tool, a fob device, a gateway device, and a remote monitoring device. The monitored tool includes a tracking unit and one of a power tool battery and a connector for receiving power from an external AC power source. The tracking unit includes an energy storage device that powers the tracking unit, a tool communication unit that communicates over a mesh wireless network, and a user output device that, in response to receiving a chirp message via the tool communication unit, generates user output to alert a user. The fob device includes a fob communication unit that communicates with the monitored tool over the mesh wireless network and a tool database storing a tool identifier (ID) of the monitored tool.

The gateway device includes a mesh network communications module that communicates with the fob device and the monitored tool over the mesh wireless network, and a cellular communications module that communicates with a remote monitoring device over a cellular network. The gateway device further includes a translation controller that (a) receives incoming mesh network messages from the mesh network communications module, translates the incoming mesh network messages to outgoing cellular messages, and outputs the outgoing cellular messages via the cellular communications module, and (b) receives incoming cellular messages from the cellular communications module, translates the incoming cellular messages to outgoing mesh network messages, and outputs the outgoing mesh network messages via the mesh network communications module. The gateway device also includes at least one of battery terminals that receive a power tool battery for powering the gateway device, and battery charger terminals that receive a power tool battery charger for powering the gateway device. The remote monitoring device includes a cellular communications radio that communicates with the gateway device via the cellular network, and a tool monitoring module.

In another embodiment, the invention provides a worksite radio-gateway having a housing, an audio circuit within the housing for generating audio signals provided to an audio output device, and a gateway device. The gateway device includes a mesh network communications module that communicates with a monitored tool over the mesh wireless network and a cellular communications module that communicates with a remote monitoring device over a cellular network. The gateway device further includes a translation controller that (a) receives incoming mesh network messages from the mesh network communications module, translates the incoming mesh network messages to outgoing cellular messages, and outputs the outgoing cellular messages via the cellular communications module, and (b) receives incoming cellular messages from the cellular communications module, translates the incoming cellular messages to outgoing mesh network messages, and outputs the outgoing mesh network messages via the mesh network communications module.

In one embodiment, the invention provides a tool tracking system including a monitored tool and a tool monitoring module. The monitored tool includes a tracking unit and one of a power tool battery and a connector for receiving an external AC power source. The tracking unit includes an energy storage device that powers the tracking unit, a global positioning satellite (GPS) unit that determines the location of the monitored tool, and a cellular unit that communicates the location of the monitored tool via a cellular network as position data. The remote monitoring device includes a tool monitoring module and a communication unit that communicates with the monitored tool and receives the position data. The tool monitoring module includes a tool polling module, a geo-fence module, a tool security module and a tool database. In response to a user request, the tool polling module sends a poll command to the monitored tool via the communication unit, and receives, in response to the poll command, tool data from the monitored tool via the communication unit. The geo-fence module receives a tool boundary, receives the position data from the communication unit, compares the position data to the tool boundary, and determines whether the monitored tool has exceeded the tool boundary. The tool security module sends a lock command to the monitored tool via the communication unit in response to the geo-fence module determining that the monitored tool has exceeded the tool boundary. The tool database stores tool identification information and the position data received from the communication unit.

In another embodiment, the invention provides a tool tracking system including a monitored tool and a remote monitoring device. The monitored tool includes a tracking unit and one of a power tool battery and a connector for receiving an external AC power source. The tracking unit includes an energy storage device that powers the tracking unit, a global positioning satellite (GPS) unit that determines the location of the monitored tool, and a geo-fence module that receives a tool boundary, receives the location from the GPS unit, compares the location to the tool boundary, and determines whether the monitored tool has exceeded the tool boundary. The tracking unit further includes a controller that locks the monitored tool in response to the geo-fence module determining that the monitored tool has exceeded the tool boundary, and a cellular unit that communicates position data, including the location of the monitored tool and an indication that the monitored tool has exceeded the tool boundary, via a cellular network. The remote monitoring device includes a tool monitoring module and a communication unit that communicates with the monitored tool and receives the position data. The tool monitoring module includes a tool security module that receives the indication that the monitored tool has exceeded the tool boundary via the communication unit and that forwards the indication to one of an owner of the monitored tool and another entity (a contact entity). The tool monitoring module also includes a tool database that stores tool identification information and the position data received from the communication unit.

In some embodiments of the invention, the monitored tool further includes a cellular antenna integrated with one of a gear case and a housing of the monitored tool. In some embodiments, the remote monitoring device further includes a display screen with a graphical user interface enabling a user to specify the tool boundary and that displays a map with an indication of the location of the monitored tool based on the position data. In some embodiments, the graphical user interface (1) displays a map and receives a boundary line drawn by a user dragging a graphical drawing instrument on the map, (2) receives user input that specifies a shape of the tool boundary, a radius of the shape, and a center point of the shape, (3) indicates the location of the monitored tool and locations of other tools monitored by the remote monitoring device, and/or (4) graphical user interface further displays one or more of a status, location, and type of the monitored tool and other tools. In some instances where the center point is specified, the center point is one of a geographical location, a street address, and a dynamic location of a GPS-enabled device. In some embodiments, the graphical user interface further receives from the user a selection of one or more of the monitored tool and other tools listed, and one of a poll request, map request, lock request, and unlock request. In some embodiments, the cellular unit communicates a serial number of the monitored tool and/or tool status and usage data, via a cellular network, to the remote monitoring device.

In another embodiment, the invention provides a tool tracking method that includes displaying a graphical user interface (GUI) on a monitoring device and receiving, via the GUI, a request to poll a tool, wherein the request specifies the tool to be polled. The method further includes obtaining contact information for the tool, and sending a poll command to the tool using the contact information. The method also includes receiving tool data wirelessly output by the tool and displaying the tool data on the GUI. The tool data includes at least one of tool status data, tool usage data, and tool position data.

In another embodiment, the invention provides a tool tracking method that includes displaying a graphical user interface (GUI) on a monitoring device and receiving, via the GUI, a tool boundary for a tool. The method further includes receiving position data wirelessly output by the tool, wherein the position data indicates a location of the tool, and comparing the position data to the tool boundary to determine whether the tool has exceeded the tool boundary. In response to a determination that the tool has exceeded the tool boundary, the method includes performing a security action.

In another embodiment, the invention provides a tool tracking method that includes displaying a graphical user interface (GUI) on a monitoring device and receiving, via the GUI, a tool boundary for a plurality of tools. The method further includes receiving position data wirelessly output by the plurality of tools, wherein the position data indicates a location of each of the plurality of tools. Thereafter, the method includes comparing the position data to the tool boundary to determine a quantity of the plurality of tools that have exceeded the tool boundary. The quantity of the plurality of tools determined to have exceeded the boundary is then compared to a predetermined threshold that is greater than one. If the quantity exceeds the predetermined threshold, the method includes performing a security action. The security action may include at least one of sending a lock command to the tool, obtaining additional contact information for the tool and sending an alarm message to an entity indicated by the contact information, and sending a message to government authorities.

In another embodiment, the invention provides a tool tracking method that includes receiving, by a tool, a tool boundary for the tool from a remote monitoring device. The tool determines a position of the tool based on global positioning satellite signals and compares the position to the tool boundary to determine whether the tool has exceeded the tool boundary. In response to a determination that the tool has exceeded the tool boundary, the tool performs a security action. The security action may include at least one of locking the tool such that the tool ceases to function normally, generating one of an audible, visual, and vibratory alarm, and wirelessly outputting a message to the remote monitoring device indicating that the tool has exceeded the tool boundary.

Embodiments of the invention enable a tool tracking system to aid with inventory management and to help minimize, prevent, and recover misplaced or stolen tools throughout the job site. Other aspects of the invention will become apparent by consideration of the detailed description and accompanying drawings.

BRIEF DESCRIPTION OF THE DRAWINGS

FIGS. 6A and 6B illustrate a tool polling method and geo-fence method according to embodiments of the invention.

FIGS. 9A and 9B illustrate other devices related to tools that may be monitored in the tool monitoring system.

FIGS. 11A-B illustrate communications between elements of the tool monitoring system of FIG. 10.

FIGS. 13D-G illustrate an exemplary ISM phone of the tool monitoring system of FIG. 10.

FIGS. 15A-B and 16A-E illustrate embodiments of an exemplary gateway of the tool monitoring system of FIG. 10.

FIGS. 17A-B, 18, and 19 illustrate embodiments of a combined worksite radio-gateway for use in the tool monitoring system of FIG. 10.

FIGS. 25A-C illustrate a job box gateway according to embodiments of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
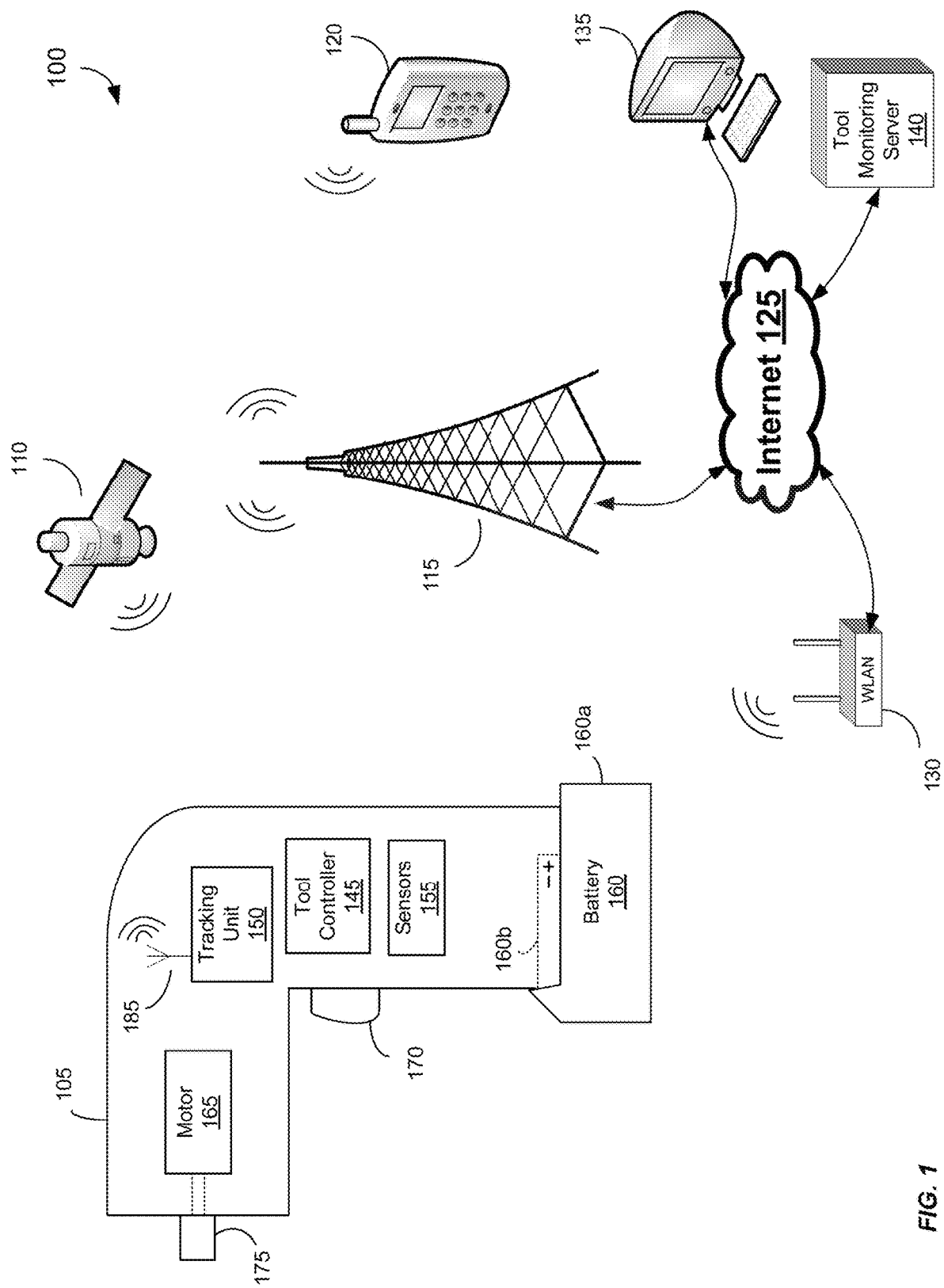
FIG. 1 illustrates a tool monitoring system according to embodiments of the invention.

FIG. 1 depicts a tool monitoring system 100 including a tool 105, a satellite 110 (representing a series of global positioning satellites), a cellular network antenna 115 (representing a cellular network), a smart phone 120, the Internet 125, a wireless router 130, a personal computer 135, and a tool monitoring server 140. The tool monitoring system 100 enables a user to monitor status, usage, and position information of the tool 105 remotely via, for example, the smart phone 120 or computer 135.

The tool 105 is a battery-operated power drill that includes a tool controller 145, tracking unit 150, sensors 155, battery 160, and a motor 165. The tool controller 145 selectively applies power from the battery 160 to the motor 165 to cause the motor 165 to rotate in response to depression of a trigger 170. Rotation of the motor 165 is conveyed to an end output unit 175 (e.g., a bit holder), which causes a bit held by the end output unit 175 to rotate to drill a hole in a work piece, drive in a screw, etc. The motor 165 may be a brushless motor, a brushed motor, a permanent-magnet motor, an AC motor, a DC motor, or another type of motor.

Although the tool 105 is depicted as a power drill, other types of tools and accessories may also be monitored by the tool monitoring system 100. For instance, the tool monitoring system 100 may monitor battery packs, battery chargers, other power tools, test and measurement equipment, vacuum cleaners, worksite radios, outdoor power equipment, and vehicles. Power tools can include drills, circular saws, jig saws, band saws, reciprocating saws, screw drivers, angle grinders, straight grinders, hammers, multi-tools, impact wrenches, rotary hammers, impact drivers, angle drills, pipe cutters, grease guns, and the like. Battery chargers can include wall chargers, multi-port chargers, travel chargers, and the like. Test and measurement equipment can include digital multimeters, clamp meters, fork meters, wall scanners, IR thermometers, laser distance meters, laser levels, remote displays, insulation testers, moisture meters, thermal imagers, inspection cameras, and the like. Vacuum cleaners can include stick vacuums, hand vacuums, upright vacuums, carpet cleaners, hard surface cleaners, canister vacuums, broom vacuums, and the like. Outdoor power equipment can include blowers, chain saws, edgers, hedge trimmers, lawn mowers, trimmers, and the like. The battery pack can also be attachable to and detachable from devices such as electronic key boxes, calculators, cellular phones, head phones, cameras, motion sensing alarms, flashlights, worklights, weather information display devices, a portable power source, a digital camera, a digital music player, a radio, and multi-purpose cutters. Additionally, the tool monitoring system 100 is operable to monitor multiple devices simultaneously.

The sensors 155 detect various status and usage information from the tool 105. For instance, the sensors 155 may include a motor sensor to track the number of motor rotations and to detect motor rotation speed and acceleration; a torque sensor to detect motor torque; a battery sensor to detect the battery charge level and the rate of increase or decrease of the battery charge level; a trigger sensor to detect whether the trigger is depressed; an acceleration sensor to detect movement of the tool, including abrupt decelerations (e.g., caused by dropping); and a temperature sensor to detect the temperature within the tool housing.

The tool controller 145 is in communication with the sensors 155 to receive the obtained sensor data from the sensors 155 and to control the operation of the sensors 155 (e.g., to enable or disable particular sensors). The tool controller 145 includes a memory 180 (see FIG. 2) to store the sensor data for later export from the tool 105, as will be described in greater detail below.

The battery 160 is a removable, rechargeable energy storage device that provides power to the components of the tool 105. The battery 160 may comprise electrochemical cells that convert stored chemical energy into electrical energy. For instance, the battery 160 may include lithium ion, nickel-metal hydride, and/or nickel-cadmium cells. Other battery cells may also be used. The battery 160 includes a base 160a and projection 160b including a positive and a negative electrical contact. The projection 160b slides into a receiving cavity in the bottom handle of the tool 105 and locks into engagement with the tool 105 such that the battery 160 remains engaged with the tool 105 unless a release tab (not shown) is actuated. In some embodiments, other battery connections and configurations are possible for the tool 105 including an internal, non-removable battery.

Figure 2:
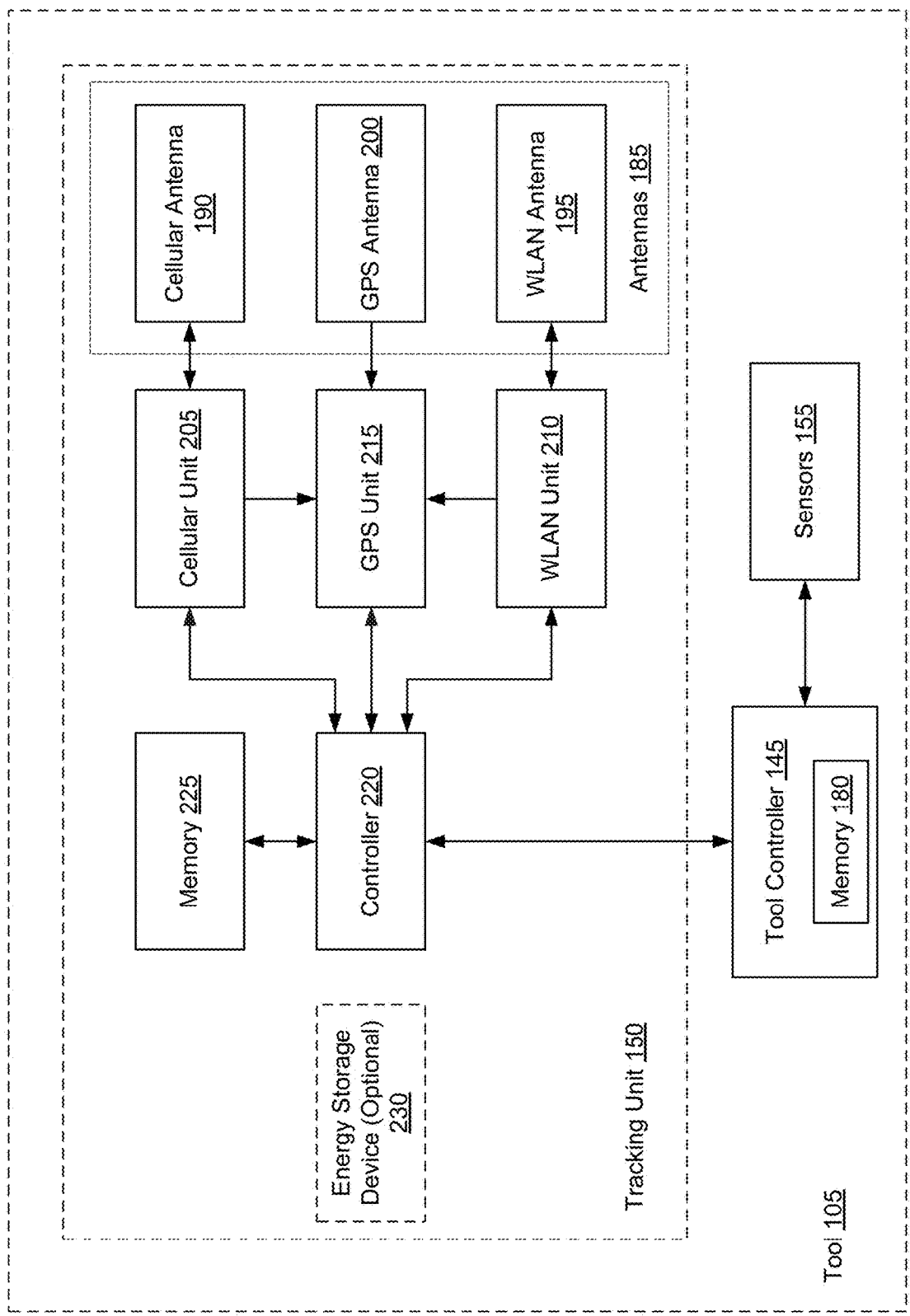
FIG. 2 illustrates an exemplary tool in the tool monitoring system.

The tracking unit 150 of tool 105 includes one or more antennas 185 for communication with the satellite 110, cellular network antenna 115, wireless router 130, and/or other wireless communication networks and devices. Turning to FIG. 2, the antennas 185 include a cellular antenna 190, a WLAN antenna 195, and a global positioning system (GPS) antenna 200, which are associated with a cellular unit 205, WLAN unit 210, and GPS unit 215, respectively. In some embodiments, the WLAN antenna 195 and WLAN unit 210 facilitate wireless communication according to IEEE 802.11 protocols, also referred to as Wi-Fi®. In some embodiments, other antennas may be included in addition to or in place of the antennas 185 to enable other types of wireless communication (e.g., Bluetooth™, radio frequency identification (RFID), satellite phone, etc.) and the tracking unit 150 may also include wired connection interfaces (e.g., Universal Serial Bus (USB), FireWire®, etc.) for communicating with other devices (e.g., smart phone 120, PC 135, and tool monitoring server 140). Accordingly, the WLAN and cellular communications described below that occur between the tool 105 and remote devices (e.g., smart phone 120, PC 135, and tool monitoring server 140) may also be carried out by way of the other types of wireless and wired communication interfaces.

Rotating of the motor 165 may cause interference that is detrimental to performance of one or more of the antennas 185. Accordingly, in some embodiments, if the motor 165 is rotating, transmissions from the tracking unit 150 are delayed until rotation has ceased. However, if the transmissions are high priority, for instance, to indicate a possible theft of the tool 105, the transmissions are not delayed until rotation of the motor 165 ceases. Additionally, if the motor 165 rotates for a prolonged, uninterrupted period, particularly if the battery 160 is low, the transmissions of the tracking unit 150 are not delayed until rotation of the motor 165 ceases. Moreover, the antennas 185 may be positioned in the tool 105 away from potential sources of interference, such as the motor 165. For instance, the antennas 185 may be positioned at the base of the handle of tool 105. Furthermore, one or more of the antennas 185 may be integrated with a housing or gear case within the tool 105 to improve transmission and reception performance.

The tracking unit 150 further includes a controller 220 in communication with the cellular unit 205, WLAN unit 210, GPS unit 215, and a memory 225. The memory 225 may store instructions that, when executed by the controller 220, enable the controller 220 to carry out the functions attributable to the controller 220 described herein. Although the tracking unit 150 is generally powered by the battery 160, in some instances, an additional energy storage device 230 is included. The additional energy storage device 230 enables the tracking unit 150 to operate even when the battery 160 is not inserted into the tool 105. That is, if the battery 160 is not present in the tool 105, or if the battery 160 is below a low power threshold, the tracking unit 150 may operate based on power from the additional energy storage device 230. For instance, the controller 220 may receive an indication from the tool controller 145 that the battery 160 is not present or below a low power threshold. In turn, controller 220 is operable to open or close a switch (not shown) to connect the energy storage device 230 to the other components of the tracking unit 620.

The additional energy storage device 230 may be non-rechargeable, primary battery that is generally not removable from the power tool 105, except during repairs or the like. In some instances, the primary battery is designed to have a life expectancy of between about five to seven years. For instance, the primary battery may be soldered or otherwise mounted to a printed circuit board that includes other components of the tracking unit 150. In some embodiments, the additional energy storage device 230 is a rechargeable battery (e.g., lithium ion) and/or an ultra capacitor. In some embodiments, in combination or in place of the other power sources, the tracking unit 150 may be powered by a solar cell mounted externally on the tool 105 and/or a fuel cell within the tool 105.

The controller 220 is also in communication with the tool controller 145, for instance, to retrieve tool status and usage data, such as that which is stored in the memory 180 or being obtained by the tool controller 145 (e.g., from the sensors 155) in real-time or near real-time.

In operation, the tracking unit 150 receives global positioning satellite (GPS) signals via the GPS antenna 200 from satellite 110. The GPS signals are transmitted from the GPS antenna 200 to the GPS unit 215. The GPS unit 215 interprets the GPS signals to determine a position of the tracking unit 150. The determined position is output by the GPS unit 215 to the controller 220 as position data. The controller 220 also obtains tool status and usage data (whether from memory 225 or tool controller 145) which, in combination with the position data, is collectively referred to as "tool data." The controller 220 then outputs the tool data to the cellular unit 205. The cellular unit 205, via the cellular antenna 190, is operable to convert the position data to an appropriate format and transmit the position data to a remote cellular device, such as smart phone 120, via the cellular network antenna 115. In some instances, the remote cellular device is a base station (not shown) that converts the cellular transmission to another communication protocol, such as an Internet-compatible protocol, WLAN, Bluetooth, etc., for transmission to a remote monitoring device (e.g., smart phone 120, PC 135, or server 140). The cellular unit 205 may transmit the position data to the cellular network antenna 115 in a format compatible with an analog cellular network, a digital cellular network (e.g., Global System for Mobile Communications (GSM), Code Division Multiple Access (CDMA), High-Speed Downlink Packet Access (HSDPA), Short Message Service (SMS)), as well as other cellular network protocols.

In addition to, or as an alternative to, the controller 220 outputting the tool data via the cellular unit 205, the controller 220 may also output the tool data via the WLAN unit 210. The WLAN unit 210 converts the tool data to a WLAN-compatible format and transmits the tool data to a remote device, such as a tool monitoring server 140, PC 135, or internet-enabled smart phone 120, via the wireless router 130. In some embodiments, the wireless router 130 facilitates wireless communication according to IEEE 802.11 protocols, also referred to as Wi-Fi®. In some instances, the wireless router 130 may be a type of wireless access point (WAP) device other than a router, such as a hub.

In some embodiments, the GPS unit 215 is an assisted GPS (aGPS) unit that communicates with the cellular unit 205 and/or WLAN unit 210 in addition to monitoring GPS radio signals to determine the position of the tool 105. For example, the aGPS unit may communicate with remote devices (not shown) via the cellular unit 205 and/or WLAN unit 210 to obtain information that assists in more quickly acquiring satellites. The information may include orbital data for GPS satellites (e.g., satellite 110), precise time data, position information based on triangulation between cellular towers (e.g., cellular network antenna 115) or WLAN routers (e.g., wireless router 130), etc. In some instances, the GPS unit 215 may transmit GPS signal data received via the GPS antenna 200 to a remote GPS server (not shown) via the cellular unit 205 or WLAN unit 210. The GPS server is then operable to generate the position data and provide the position data back to the GPS unit 215, controller 220, or a remote monitoring device. In some embodiments, the tracking unit 150 determines the position of the tool 105 using cellular triangulation, rather than using the GPS unit 215.

Figure 3A:
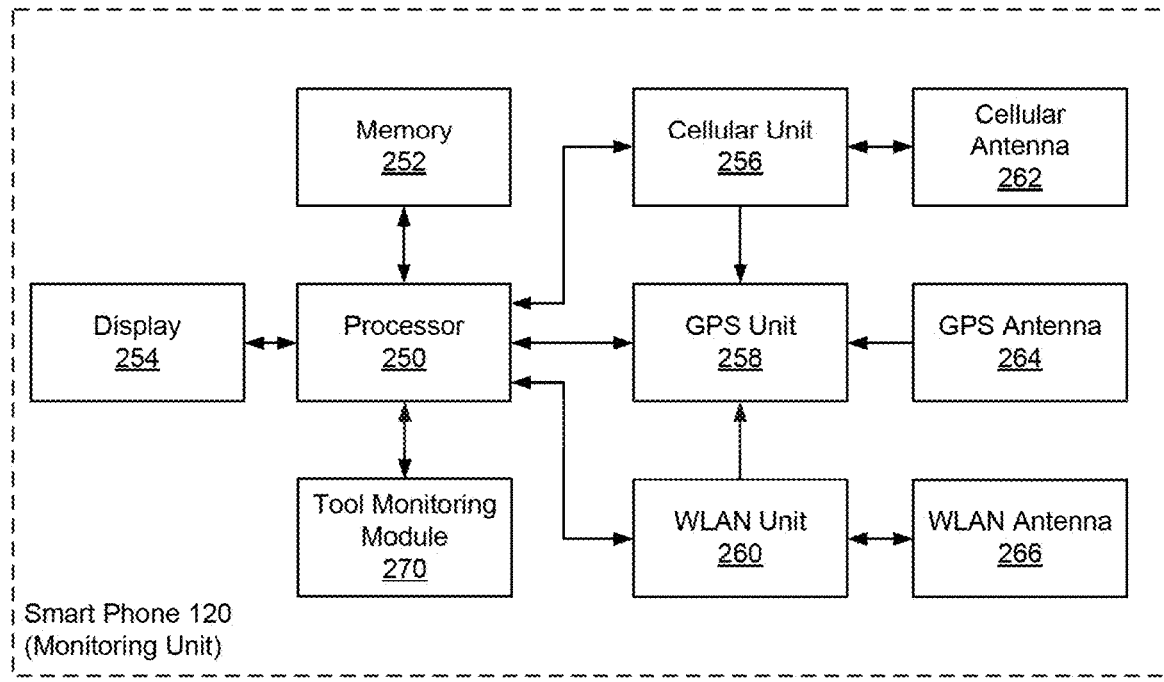
FIGS. 3A and 3B illustrate exemplary monitoring units of the tool monitoring system.

FIG. 3A illustrates the smart phone 120, an exemplary remote monitoring unit, in greater detail. The smart phone 120 includes a processor 250 for executing instructions (e.g., stored in memory 252) for carrying out the functionality of the smart phone 120 as described herein. The processor 250 is in communication with a display 254 for providing a graphical user interface (GUI) to a user of the smart phone 120. The processor 250 is further in communication with a cellular unit 256, GPS unit 258, and WLAN unit 260. The cellular unit 256 is coupled to a cellular antenna 262 and, in combination, they enable the smart phone 120 to communicate via a cellular network (e.g., via cellular network antenna 115). The GPS unit 258 is coupled to GPS antenna 264 to receive GPS signals and enable the smart phone 120 to determine its position. The WLAN unit 260 is coupled to a WLAN antenna 266 and, in combination, they enable the smart phone 120 to communicate via a WLAN network (e.g., via wireless router 130). In some embodiments, the WLAN antenna 266 and WLAN unit 260 facilitate wireless communication according to IEEE 802.11 protocols, also referred to as Wi-Fi®. In some embodiments, like the GPS unit 215, the GPS unit 258 is an assisted GPS (aGPS) unit that uses communications from the cellular unit 256 and WLAN unit 260 to improve the GPS position locating functionality.

The smart phone 120 further includes a tool monitoring module 270. The tool monitoring module 270 includes software and/or hardware for carrying out the functionality of the tool monitoring module 270 described herein. Additionally, although shown in FIG. 3A separately, in some embodiments, the tool monitoring module 270 is combined with the processor 250, memory 252, and other components of the smart phone 120. For instance, the tool monitoring module 270 may be an application, or "app," downloaded or otherwise installed on the memory 252 and executed by the processor 250 of the smart phone 120 or PC 135. The tool monitoring module 270 will be described in more detail with respect to FIG. 4 below.

Figure 3B:
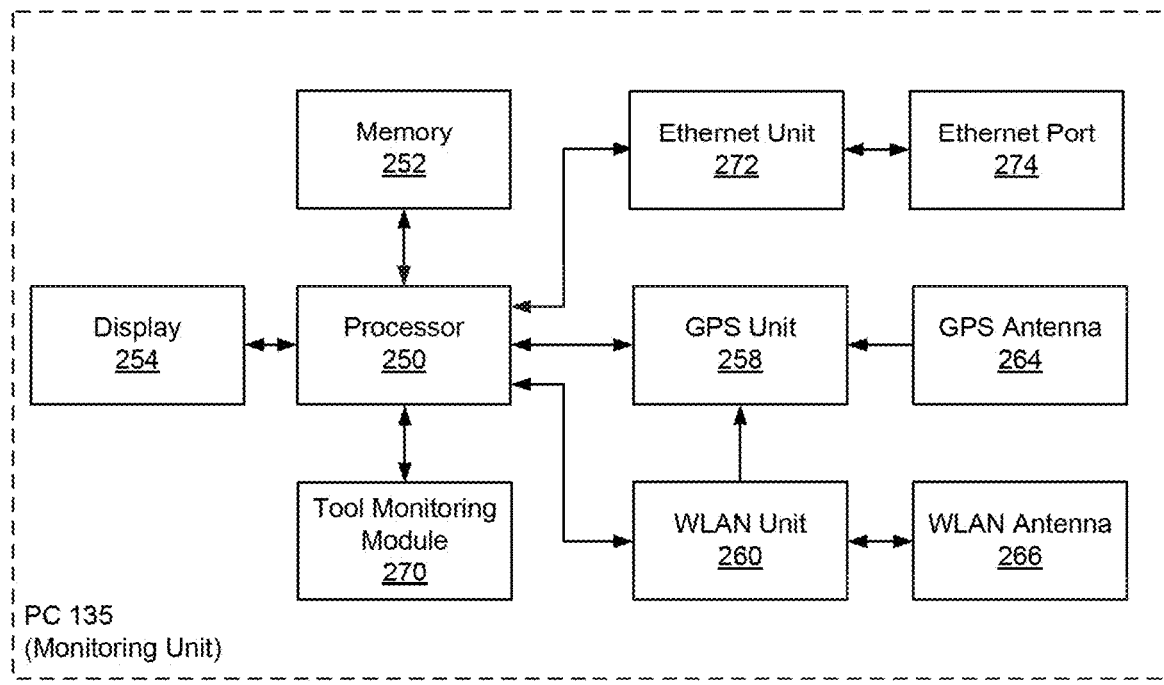

Turning to FIG. 3B, the PC 135 is illustrated in greater detail. The PC 135 includes several components similar to the smart phone 120, and, accordingly, these components are numbered alike. The PC 135 may be a desktop computer, laptop computer, tablet computer, or other computing device that generally does not include a cellular antenna. The PC 135 includes an Ethernet unit 272 and Ethernet port 274 for receiving an Ethernet cable to enable the PC 135 to communicate via a wired connection to the Internet 125. Although not shown in FIG. 3A or 3B, additional input and output devices may be coupled to the smart phone 120 and PC 135, such as speakers, an auxiliary display, a keyboard, a mouse, disk drives, etc.

Figure 4:
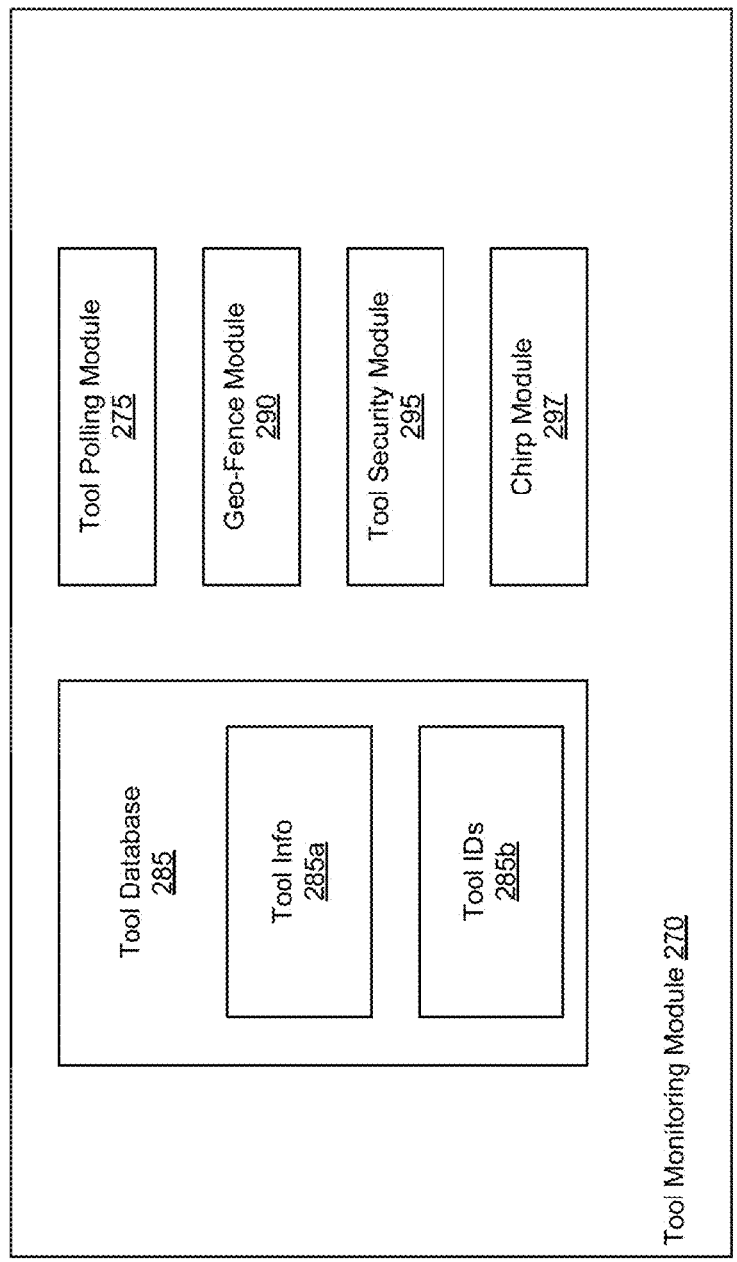
FIG. 4 illustrates a tool monitoring module according to embodiments of the invention.

FIG. 4 illustrates the tool monitoring module 270 in greater detail. The tool monitoring module 270 enables a monitoring unit (e.g., smart phone 120, PC 135, and server 140) to remotely monitor, communicate with, and control the tool 105. The tool monitoring module 270 includes a tool polling module 275, a tool status module 285, a geo-fence module 290, a tool security module 295, and a chirp module 297.

The tool database 285 stores information about the tools to be monitored, such as tool 105. The tool database 285 includes a tool IDs database 285a and tool information database 285b. The tool IDs database 285a includes identifying information for each tool being monitored. For instance, for tool 105, the tool IDs database 285a may store one or more of a tool serial number, contact addresses/numbers for communicating with the tool 105 (e.g., a phone number for the cellular unit 205 or an IP address), owner information (e.g., the name of a business that is registered as owner of the tool and contact information, such as a phone number or email address), the type of tool (e.g., hammer drill), the model number of the tool 105, and user information (e.g., name, contact information, job title, licensing, and skill level). The tool information database 285b stores information obtained from the tools through monitoring, including the tool data (i.e., tool status, usage, and position data). The tool information database 285b may store a history of tool data obtained over time for analysis by an owner, tool manufacturer, or tool maintenance personnel.

Figure 5B:
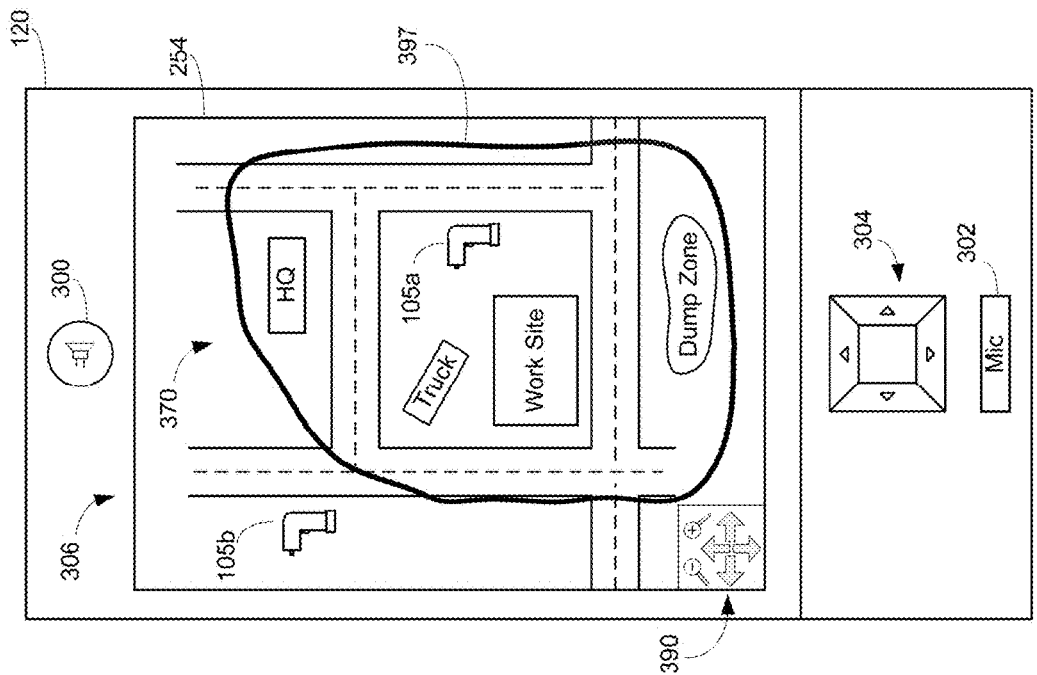
FIGS. 5A-5D illustrate various graphical user interfaces for use in the tool monitoring system.
Figure 5A:
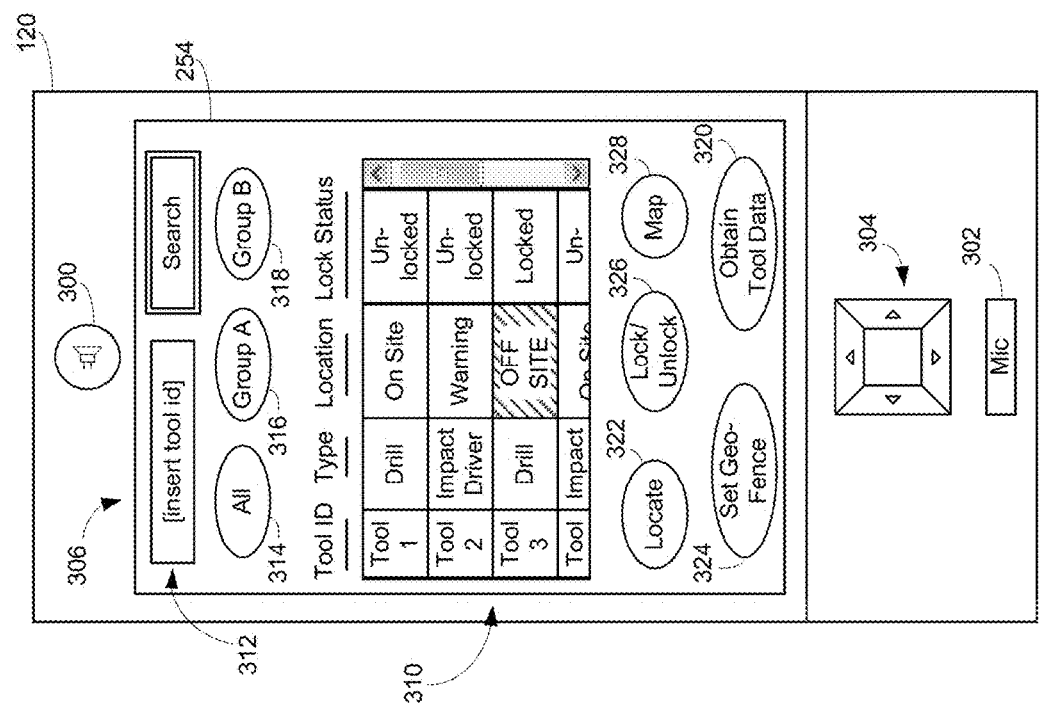

FIG. 5A depicts the smart phone 120 including the display 254, a speaker 300, a microphone 302, and a keypad 304. The display 254 is a touch screen display depicting a GUI 306 produced by the tool monitoring module 270 in conjunction with the other components of the smart phone 120. Although the GUI 306 is described above with respect to the smart phone 120, the GUI 306 may also be implemented on the PC 135 or another remote monitoring device.

The GUI 306 includes a tool list 310 that lists the tools of tool database 285. The user may enter a tool ID or other tool characteristics (e.g., the tool properties stored in tool database 285) in the search tool bar 312 to locate a particular tool in the tool database 285. In some instances, the user can apply filters to (e.g., tool type, tool location, owner, etc.) and sort the tools in the tool list 310. The user may touch one or more tools displayed in the tool list 310 to select particular tools, or may touch the "all" button 314, group A button 316, or group B button 318. The user may assign a particular set of tools (e.g., all drills, or all tools at a particular worksite) to the group A button 316 and group B button 318. For instance, one technique for assigning tools includes a user highlighting multiple tools within the tool list 310, then touching the group A button 316 for predetermined amount of time (e.g., 5 seconds). After an assignment, the user may quickly select a particular set of tools by touching the group A button 316 and group B button 318. The GUI 306 also includes an obtain tool data button 320, a locate button 322, a set geo-fence button 324, a lock/unlock button 326, and a map button 328, which are described below in further detail. In general, however, the actions taken as a result of touching one of the buttons 320-328 are applied to the one or more tools of tools list 310 that have been selected by a user. Further, a separate chirp button (not shown) may be included on the GUI 306 to activate the chirp module 297. Alternatively, the locate button 322 may be used to activate the chirp module 297, which is described below.

After selecting one or more tools, the user may poll the selected tool(s) by touching the obtain tool data button 320, which initiates a method 340 for polling monitored tools (see FIG. 6A). In step 345, the tool polling module 275 receives the user request via a GUI 306, which specifies the tools to be polled. In step 350, the tool polling module 275 accesses the tool IDs database 285a to obtain contact information for each tool to be polled. In step 355, the tool polling module 275 outputs a polling command to the requested tools. The polling command is sent according to the obtained contact information. For instance, the polling command may be transmitted via cellular network antenna 115 to the cellular unit 205 of the tool 105 and/or via the Internet 125 and wireless router 130 to the WLAN unit 210 of the tool 105. In some instances, the tool database 285 is stored remotely (e.g., on tool monitoring server 140). In these instances, identifiers for the selected tools are sent to the tool monitoring server 140, which locates the tool contact information and returns the tool contact information to the tool polling module 275 or transmits the polling command to the appropriate tools.

Once the poll command is received by the tool 105, the controller 220 of the tool 105 gathers tool data for transmission. The controller 220 may gather new tool data or may assemble the most recently gathered tool data (i.e., tool data gathered before the poll command was received). The gathered tool data is then output back to the requesting tool polling module 275 via one of the various available communication paths. In step 360, the tool polling module 275 receives the tool data sent by the tool 105, including the tool ID, position data, status data, and usage data. In step 365, the tool polling module 275 displays the received tool data to the user on the GUI 306 and/or stores the received tool data in the tool information database 285b.

Turning back to FIG. 5A, the user may also touch the locate button 322 to obtain just the position data of the selected tools. In these instances, the method 340 is performed, but only position data is gathered and transmitted by the tool 105, not the tool status and usage data. Once the position data is received, whether from the locate button 322 or obtain tool data button 320, the GUI 306 may indicate the location of the selected tools on a map and/or update the location characteristic of the tool list 310. The location characteristic of the tool list 310 indicates whether a tool is within a geo-fence ("on site"), in a warning area of the geo-fence ("warning"), or outside of the geo-fence ("off site"). If the user touches the map button 328, the GUI 306 displays a mapping of the selected tools based on the obtained position data. For example, as shown in FIG. 5B, the GUI 306 is displaying a map 370 including tools 105a and 105b based on their associated position data. The tool monitoring module 270 may automatically update the map 370 by periodically requesting position data from the tools 105*a* and 105*b*. The user may specify the updating period to be short to provide a real-time map, or to be longer to conserve battery power and reduce data transmission rates.

The user may select a chirp button (not shown) of the GUI 306, or, in some instances, selecting the locate button 322 initiates the chirp feature. Selecting the chirp button causes the chirp module 297 to receive a chirp request specifying the tool(s) currently highlighted in the GUI 306. The chirp module 297 accesses the tool IDs database 285*a* to obtain contact information for each tool to chirp. The chirp module 297 then outputs a chirp message to the specified tools. Upon receipt by the tool 105, the tool 105 outputs a chirp noise or other audible sound to assist the user in locating the tool 105. The tool 105 may repeatedly output the chirp noise to guide the user for a preset amount of time in response to the chirp message. Once the user locates the tool 105, the user may depress the trigger or another button on the tool 105 to cease the chirp noise. In some embodiments, the tool 105 includes a light that flashes and/or a vibration element that vibrates in combination with or in place of the chirp noise to assist the user in locating the tool 105. In some embodiments, the user may select via the GUI 306 whether the tool 105 is to output an audible indicator (e.g., chirp), a visual indicator (e.g., light flash), a tactile indicator (e.g., vibration) or a combination thereof, in response to the chirp message. In some embodiments, the tool 105 stores an audio message in the memory 225 or the memory 180 that indicates the owner of the tool 105. Upon receiving an owner request, the tool 105 outputs the audio message (e.g., "This tool is owned by Acme Company"). In some instances, the owner request is made by a user via an owner request button (not shown) of the GUI 306 or by depressing a button on the tool 105.

To set a geo-fence, the user selects one or more tools via the GUI 306 as described above, and touches the set geo-fence button 324. FIG. 6B illustrates a method 375 of implementing a geo-fence. In step 380, the geo-fence module 290 receives tool IDs that identify the tools for which the user desires to set geo-fence boundaries. For example, the user may highlight tools in the tool list 310 and touch the set geo-fence button 324 to select the tools for setting a geo-fence. In step 382, the geo-fence module 290 receives geo-fence boundaries for the selected tools. In some embodiments, step 382 includes the GUI 306 displaying a map 385, as shown in FIG. 5C. The user may focus the map 385 on a particular area, such as the worksite where the selected tools will be used, using pan and zoom controls 390. Thereafter, the user may draw boundaries by first touching a GUI drawing instrument 395, then dragging a pointer around the map 385 to create boundary 397. Using the GUI drawing instrument 395 to create boundary 397 allows custom boundaries for worksites that are irregularly shaped, that are spread across streets, etc. The user may then indicate when the boundaries have been completed via the keypad 344 or another software button of GUI 306. Other boundary-drawing techniques, such as the placement and re-sizing of a circle, square, or other shapes, may also be used in step 380. Once the boundaries are received, they are associated with the tool IDs obtained in step 380 and stored in geo-fence module 290.

In step 400, the geo-fence module 290 receives tool position data associated with tool IDs, for instance, using the method 340 described above. In step 405, the geo-fence module 290 compares the position data for a particular tool with the previously set boundary, and determines whether the tool is within the boundary. If the tool is within the boundary, the location characteristic of the tool is updated to indicate that the tool is "on site." If the tool is outside of the boundary, the location characteristic of the tool is updated to indicate that the tool is "off site." In some embodiments, a warning buffer is added to the boundary such that when the tool is near, but has not yet exceeded, the boundary (e.g., within 2 meters), the location characteristic is updated to indicate a warning. Although not shown, the size of the warning buffer may be specified via the GUI 306. The location characteristic may be stored in tool database 285 or the geo-fence module 290 and is displayed in the tool list 310, as shown in FIG. 5A.

In step 410, the geo-fence module 290 determines whether to take actions (i.e., security actions) in response to the determination of step 405. For example, as shown in FIG. 5B, tool 105*a* is within the boundary 397 (on site), and tool 105*b* is outside of boundary 397 (off site). For a tool determined to be off site, such as tool 105*b*, the geo-fence module 290 may automatically send a lock signal to the tool 105*b* (e.g., via the cellular network antenna 115 or wireless router 130). In response, the tool 105*b* disables itself to prevent further use of the tool 105*b* until the tool 105*b* is unlocked, either manually via lock/unlock button 326 or upon the tool 105*b* returning within the set boundary. To disable the tool 105*b*, the tool controller 145 may disconnect the battery 160 from the motor 165 by opening or closing one or more particular relays or switches (e.g., MOSFETs) as appropriate, or by taking another disabling action.

Another security action includes a limp mode in which performance of the tool 105 is degraded. For instance, the power output of the tool 105 may be reduced by the tool controller 145. In the case of a brushless motor, the power reduction may be accomplished by changing the timing and/or duration of FET driving signals. Additionally, the period of continuous output by the tool 105 may be limited, for example, to one or a few seconds. In the limp mode, a user is made aware that the tool 105 still functions, albeit at a reduced level. Thus, the user can infer that a security action has taken place, rather than a malfunction of the motor of the tool 105 or a drained battery. Additionally, a visual (e.g., a limp mode light), audible (e.g., a beep), or tactile signal may be provided to the user by the tool 105.

Another exemplary security action includes automatically debiting an account. For instance, a user may be responsible for a particular tool 105, and if the tool 105 exceeds the boundary 397, a monetary or credit account of the user may be automatically deducted or charged. Another security action includes automatically populating a report (e.g., an electronic document) with information relating to the breach of the boundary 397, including the tool type, serial number, the date and time of the breach, the last known location and heading of the tool 105, owner contact information, etc. The report may then be sent to government authorities and/or one or more contact entities associated with the tool 105 according to information stored in the tool database 185 or a memory within the tool 105.

In some embodiments, the security action is delayed for a particular period of time. For instance, the security action may be delayed for a particular period of time (e.g., a few minutes, hours, days, etc.), or until a particular action (e.g., removing the battery, inserting a new battery, releasing or depressing the trigger, etc.). Accordingly, if the tool 105 returns within a boundary before the delayed security action is enacted, the security action is cancelled. This delayed action prevents the tool 105 from being locked-out, put in limp mode, etc., momentarily based on wireless outages or temporary movements outside of a geo-fence.

As described above, a geo-fence may be set for a plurality of tools. In some embodiments, one or more thresholds are associated with such a geo-fence. For instance, the user may set a threshold at four tools, such that, upon four monitored tools 105 exceeding the boundary 397, one or more security actions are taken (e.g., locking the tools, alerting the owner (s), etc.). Alternatively, the threshold may be a monetary limit and each tool may be assigned a monetary value. Accordingly, when the sum of the tools 105 outside of the boundary 397 exceeds the monetary threshold (e.g., $1000), one or more security actions are taken. Furthermore, in some embodiments, multiple thresholds are set and the security actions taken in response to a particular threshold being exceeded depends on which threshold is exceeded. For instance, if one tool 105 exceeds the boundary 397, the tool 105 is locked. If two tools 105 exceed the boundary 397, the tools 105 are locked, and a primary contact (e.g., an on-site supervisor) is contacted via a text message, email, or phone call. If five tools 105 exceed the boundary 397, primary and secondary contacts (e.g., off-site supervisors or management) are contacted. If ten tools 105 exceed the boundary 397, in addition to the other security actions, the authorities are contacted. The various security actions may be performed by the tool 105, a remote monitoring unit (e.g., PC 135), or a combination thereof.

A time-component may also be associate with a boundary threshold. The security actions taken may vary depending on the threshold that is exceeded. For instance, if a large number of tools are moved outside of the boundary 397 nearly simultaneously (e.g., twenty tools within five minutes of each other), it could indicate that a large theft may be in progress, and authorities (i.e., the police) may be contacted. If a modest number of tools exceed the boundary over the course of a week, an email or text message may be sent to the owner to indicate a summary of the activity and possibly highlight long-term trends. Additionally, security actions taken in response to exceeded thresholds may vary depending on the time of day. For instance, if a worksite is generally only operating during the day (e.g., 7:00 am to 5:00 pm), but a tool is moved beyond the boundary 397 at midnight, authorities may be contacted immediately and the owner may be called with an automatic voice message. In contrast, if a tool is moved beyond the boundary 397 at noon, the owner may receive a text message, and authorities are not immediately contacted.

Additionally, the geo-fence module 290 may automatically send an alarm signal to the tool 105*b*. In response, the tool 105*b* may vibrate, sound an audible alarm, or take other actions to indicate to the user that the tool 105*b* has exceeded the set boundary. Additionally, the geo-fence module 290 may automatically send an alarm to the owner of the tool using contact information from the tool IDs database 285*b*. For instance, the geo-fence module 290 may cause a text message, automated voice message, email, page, etc. to be sent to the owner to indicate that the tool 105 has exceeded the set boundary. The owner may then determine whether to take actions, such as to call authorities (in the case of theft), lock or unlock the tool 105*b*, etc. In some instances, upon determining that the tool 105*b* is approaching a boundary (e.g., a warning zone), the geo-fence module 290 sends a warning message to the owner and/or a warning signal to the tool 105*b* to cause the tool 105*b* to vibrate or sound an audible warning alarm.

Figure 5D:
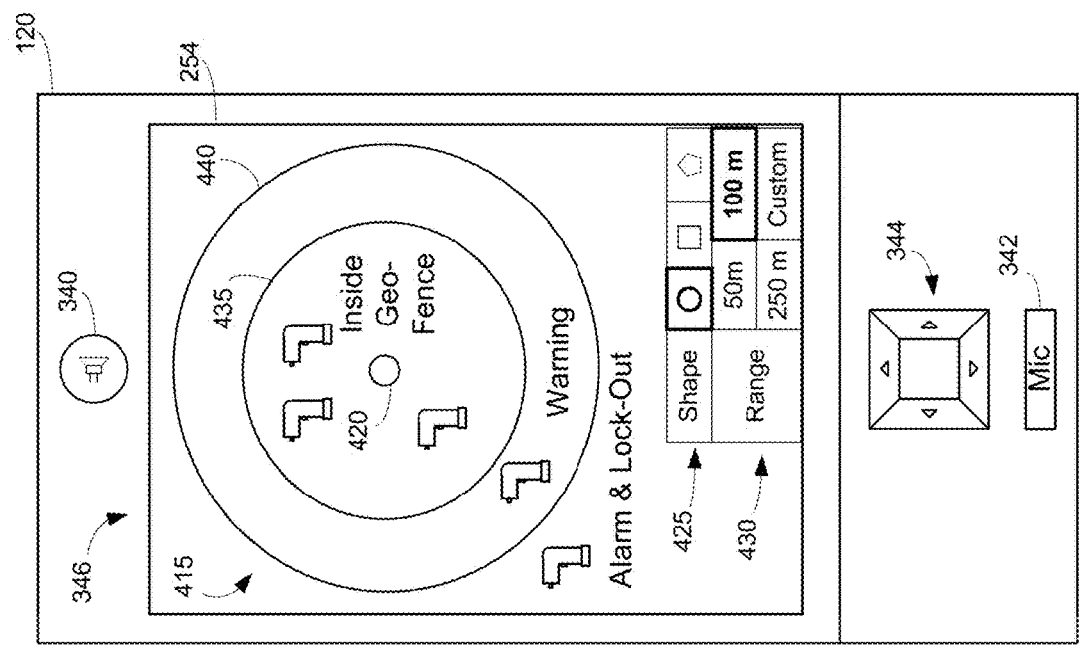
Figure 5C:
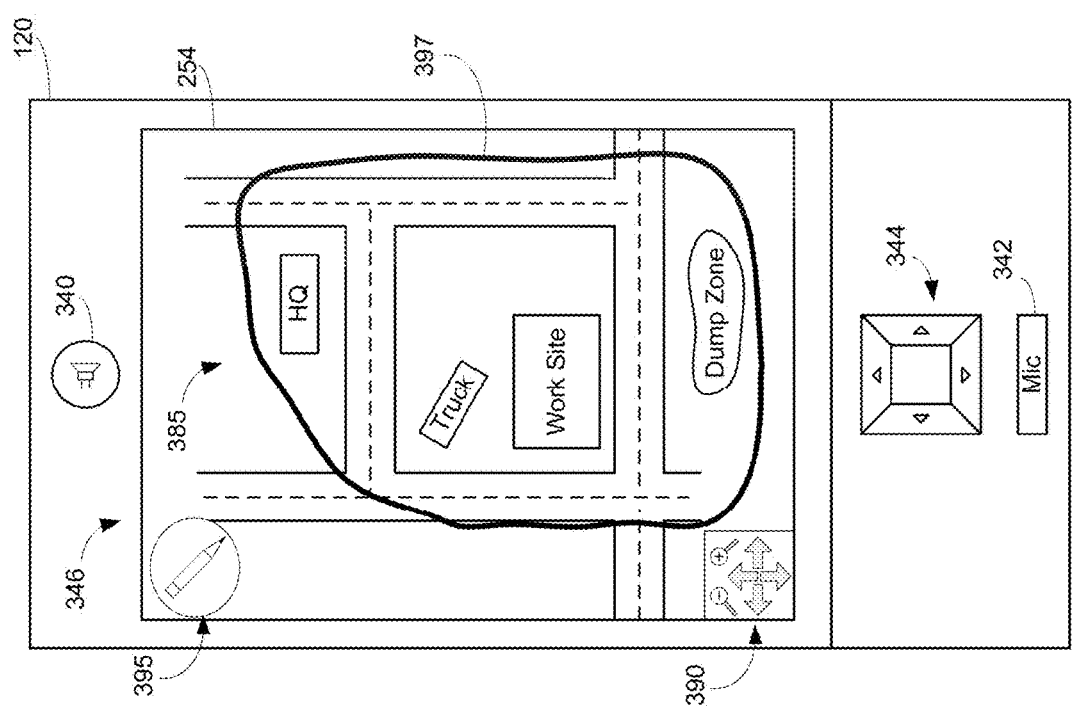

FIG. 5D illustrates the GUI 306 with an alternate technique for defining a boundary for a geo-fence in step 380. After receiving tool IDs in step 380, the GUI 306 displays screen 415 including a center point 420. In this alternate technique, the boundary takes a regular shape, such as a circle, square, or a polygon, and is centered on center point 420. The user selects the boundary shape by touching one of the shapes 425, and selects the radius of the boundary shape by selecting or specifying one of the ranges 430 or by dragging the boundary perimeter. In FIG. 5D, the user has selected a circle shape with a radius of 100 m. Although not depicted, the user may also select a distance between the boundary 435 and the warning boundary 440.

Additionally, the boundaries 435 and 440, as well as the positions of the tools, may be overlaid on a map similar to map 385. Accordingly, the center point 420 may be dragged to an appropriate map position by a user. Alternatively, the center point 420 may be the location of a street address or geographic coordinates (i.e., longitude and latitude) entered by the user, such as the address or coordinates of a warehouse, a factory, a construction site, etc. In some embodiments, the center point 420 is tied to a GPS-enabled device that can periodically report its GPS coordinates and, therefore, the position of the center point 420 may be dynamic. For example, the GPS-enabled device may be a cell phone of a construction site supervisor, a vehicle, a tracking device secured to a construction-site headquarters or trailer, or another device. In some embodiments, the center point 420 is tied to another tool 105 such that the geo-fence boundary for one or more tools 105 is centered about the location of another tool 105.

Returning to FIG. 4, the tool security module 295 is operable to limp, unlimp, lock or unlock the tool 105 and to cause an alarm to activate on the tool 105. For instance, in response to the tool 105 exceeding a geo-fence boundary, or in response to user selection of the lock/unlock button 326, the tool security module 295 may lock or unlock the tool 105.

The tool monitoring module 270 is also operable to communicate via one of the various communication networks (e.g., the cellular network antenna 115 or the Internet 125) software or firmware updates to the tool 105 to update the tool 105 remotely. For instance, if a new firmware update is provided by the tool manufacturer, the tool owner may remotely install the firmware update on the tool 105. Remote updating allows the tools to remain in the field and avoids the need to bring the tool to a manufacturer or maintenance person.

Figure 7:
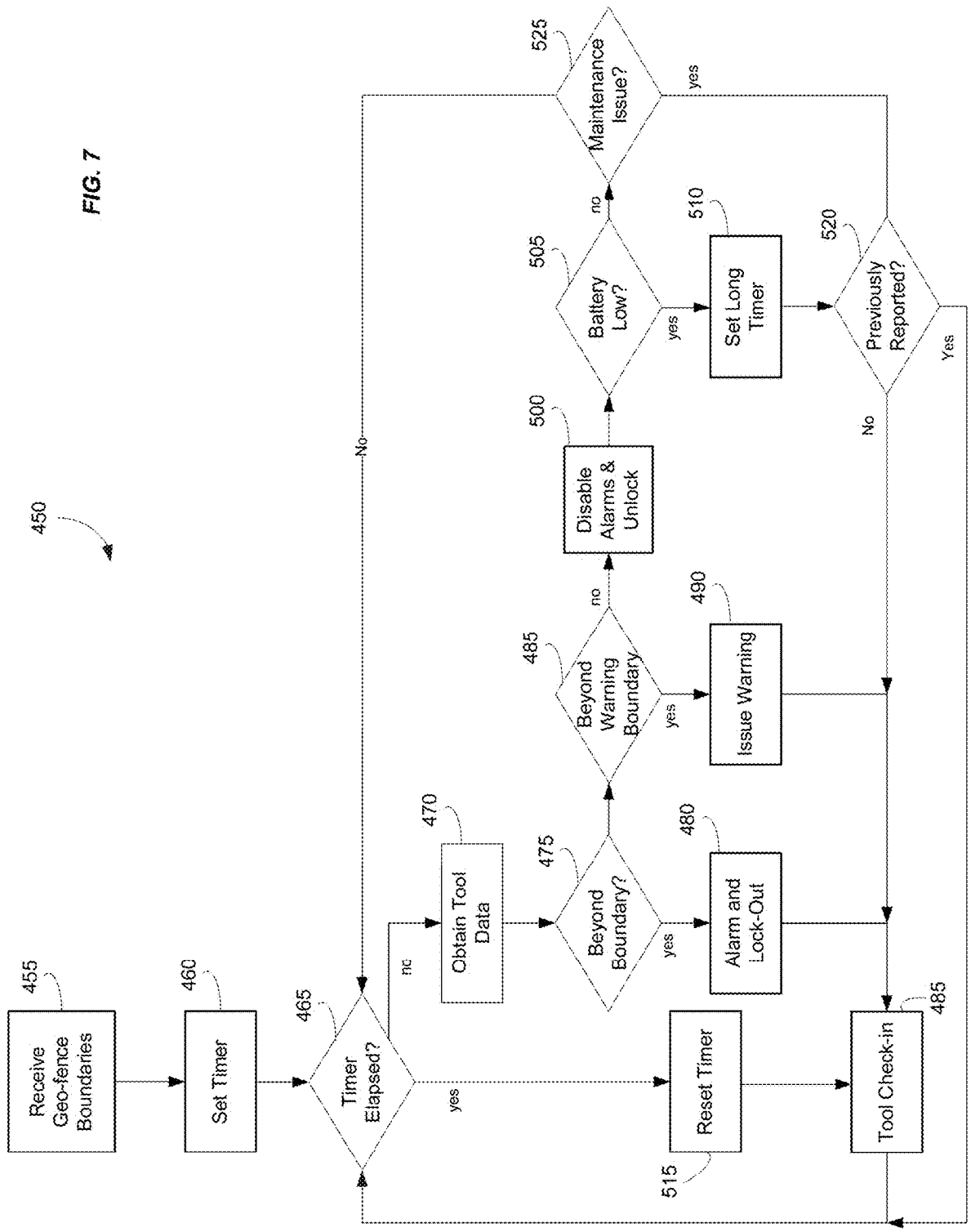
FIG. 7 illustrates a tool monitoring method according to embodiments of the invention.

FIG. 7 illustrates a method 450 of monitoring a tool (e.g., tool 105) whereby the tool self-reports tool data independent of polling commands from a remote monitoring device. Accordingly, tool 105 periodically and automatically determines when the tool 105 has exceeded a geo-fence boundary, has a low battery, or has maintenance issues, and reports the determination to the remote monitoring device.

In step 455, the tool 105 receives a geo-fence boundary from the tool monitoring module 270. For instance, the geo-fence boundary is entered by a user using one of the above-noted techniques, and transmitted to the tracking unit 150. The user may also specify a particular reporting time (e.g., every 10 seconds, every 10 minutes, every hour, etc.) for the tracking unit 105 to provide tool data back to the tool monitoring module 270. In step 460, the tracking unit 150 sets a timer according to the specified reporting time or, if none was provided, uses a default time. In step 465, the tracking unit 150 determines if the timer has elapsed, which will not be the case in the first iteration.

In step 470, the tracking unit 150 obtains position data, status data, and usage data as described above. In step 475, the tracking unit 150 compares the position data to the geo-fence boundary received in step 455. If the boundary has been exceeded, in step 480, the tracking unit 150 causes the tool 105 to be locked and sets off an alarm (e.g., audible, tactile, or visual) to notify the tool user that the boundary has been exceeded. Additionally, the tracking unit 150 proceeds to step 485 and outputs the tool data to the tool monitoring module 270, including an indication that the boundary has been exceeded and the tool serial number or other identifier. The tool monitoring module 270 may then take the appropriate actions, such as notify the owner and/or authorities. By including the serial number of the tool 105 or other identifying information specific to the tool 105, along with the position data, the owner of the tool 105 may more easily prove to the appropriate authorities that he or she is the true owner of the tool 105.

In some embodiments, in addition to or instead of checking-in with the tool monitoring module 270 after a boundary or warning boundary has been exceeded, the tracking unit 150 may send a text message, automated voice message, email, page, or other communication directly to a contact person associated with the tool 105 (e.g., the owner), to indicate that the tool 105 has exceeded the set boundary and to provide the tool serial number. The serial number of the tool 105 may be stored in memory 225 of tracking unit 150, as well as the contact information (e.g., phone number or email address) for the contact person. The contact information may be remotely updated via the tool monitoring module 270.

If the geo-fence boundary has not been exceeded, in step 490, the tracking unit determines whether the geo-fence warning boundary has been exceeded (e.g., boundary 435 of FIG. 5D), which may also be received in step 455. If the geo-fence warning boundary has been exceeded, the tracking unit 150 may issue a warning in step 495 (e.g., sound an audible alarm, cause the tool to vibrate, etc.), and then proceeds to step 485 to output tool data to the tool monitoring unit 270, including an indication that the warning boundary has been exceeded.

If neither geo-fence boundary has been exceeded, the tracking unit 150 proceeds to step 500 where all alarms and tool lock-outs remain disabled or become disabled. Thus, if tool 105 momentarily exceeds the geo-fence boundary, the tool 105 will initially be locked, but the tool 105 will be unlocked upon returning within the geo-fence boundary. In some embodiments, the tool 105 remains locked out until a reset action by the tool monitoring module 270 or other reset action.

In step 505, the tracking unit 150 determines whether the state of charge of the battery 160 has dropped below a low level threshold. If the battery 160 is low, the tracking unit 150 proceeds to step 510 where the timer length used in step 515 during a timer reset is increased to a second, longer timer. The longer timer reduces the amount of reporting by the tracking unit 150 to conserve energy. In some instances, in response to user preferences, step 510 is bypassed and the timer is not changed. In some embodiments, other power reduction techniques may also be used. For instance, movement data from an accelerometer of the tool 105 may be used to reduce the rate of communications from the tool 105. For instance, if the accelerometer indicates that the tool 105 has not moved recently, the tool 105 does not determine or output location data, since the location data would be duplicative of the previous output. This determination may be made after step 465 and before step 470. For instance, after the timer is determined to have elapsed in step 465, the controller 220 determines whether movement has occurred since the previous timer expiration. If movement has occurred, the method proceeds to step 470; if not, the method returns to step 460 to reset the timer.

After optionally adjusting the timer length in step 515, the tracking unit 150 determines whether the low battery status has previously been reported to the tool monitoring module 270. If the low battery status has not been previously reported, the tracking unit 150 reports the low battery along with the other tool data to the tool monitoring module 270 in step 485. If the low battery status has already been reported, the tracking unit returns to step 465.

In step 525, the tracking unit 150 determines whether a maintenance issue is present on the tool 105. For example, the tool controller 145 or controller 220 may monitor the use of tool 105 and determine it is due for a standard check-up based on total hours in operation. Additionally, the tool controller 145 may determine that the tool is overheated based on output from sensors 155, or some other mechanical issue is present. If a maintenance issue is determined to exist in step 525, the tracking unit 150 will report the issue to the tool monitoring module 270, unless the issue has already been reported as determined in step 520.

Although described above as being executed by the tool 105, the method 450 may be adopted for execution by the tool monitoring module 270 of the smart phone 120 or PC 135. For instance, the tool monitoring module 270 may carry out steps 455-465, then, in step 470, poll the tool 105 (see e.g., method 340) to obtain tool data. The tool monitoring module 270 uses the obtained tool data to carry out the decision steps 475, 485, 505, and 525, and executes the remaining steps of method 450 accordingly, except that the tool check-in step 485 is no longer necessary, as the tool monitoring module 270 has already obtained the tool data.

Figure 8B:
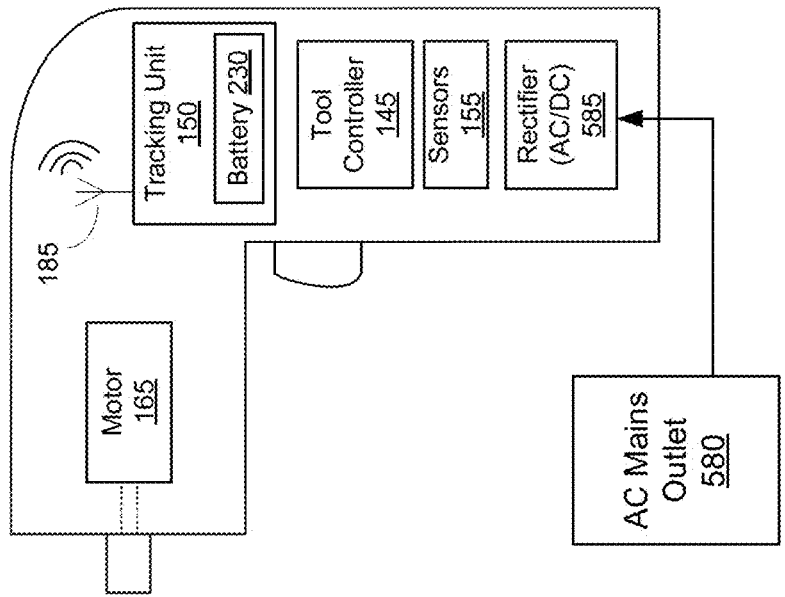
FIGS. 8A and 8B illustrate alternate embodiments of the tool to be monitored in the tool monitoring system.
Figure 8A:
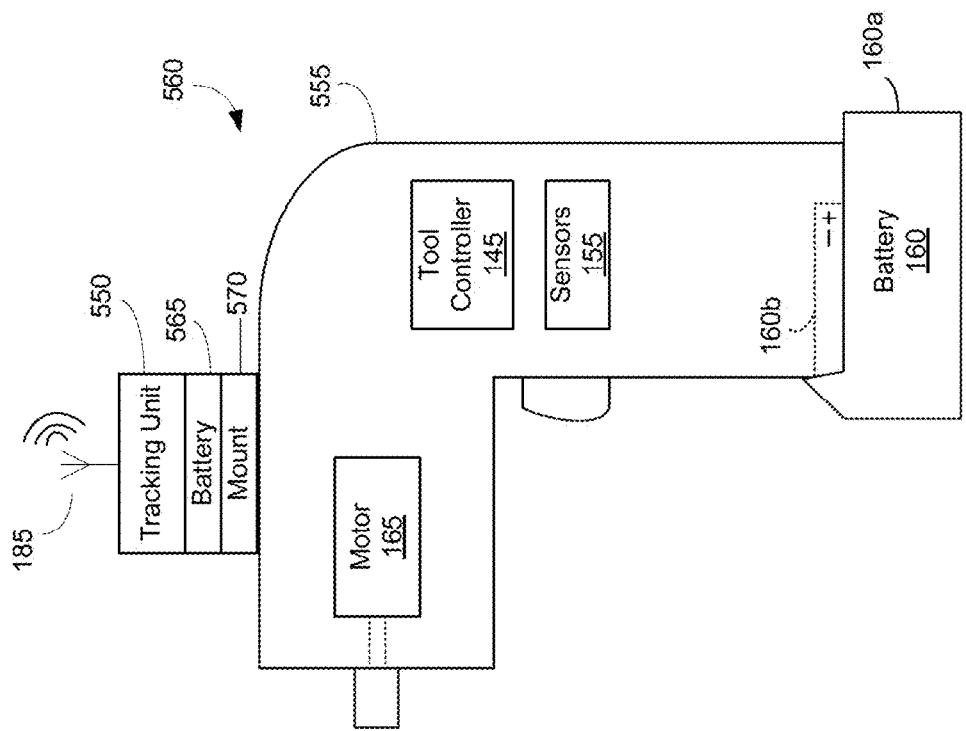

FIGS. 8A-8B depict alternate embodiments of the tool 105. In FIG. 8A, a tracking unit 550 is secured to the external housing 555 of a tool 560. The tool 560 is similar to tool 105, and the tracking unit 550 is similar to the tracking unit 150, except as noted below. The tracking unit 550 includes a battery 565 for powering the tracking unit 550, and a mount 570 for securing the tracking unit 550 to the external housing 555 of the tool. The tracking unit 550 and tool 560 are not drawn to scale, and, in practice, the tracking unit 550 would be positioned in such a way as to avoid obstructing an operator of the tool 560. In some embodiments, the tracking unit 550 would be mechanically coupled to the tool 560, but not electrically. Thus, the tracking unit 550 is able to report position data, but not communicate with the sensors 155 to obtain status and usage data and not able to receive battery power from the battery 160. The tracking unit 550 may include sensors, however, for gathering status and usage data measurable from outside of the housing 555 (e.g., temperature, vibrations, etc.) The external tracking device 550 may be mounted to other devices as well, such as a battery charger, battery pack, work-site radio, vehicle, ladder, or construction materials.

The tracking unit 550 may be programmed via a wireless or wired connection such that the tracking unit 550 stores the type of tool or device to which it is secured. (e.g., drill, battery charger, ladder, vehicle, etc.) For instance, the smart phone 120 or monitoring device 135 may include software for communicating with and programming the tracking unit 550. Thereafter, when transmitting the ID of the tracking unit 550, the tracking unit 550 may also identify to a receiving device the type of tool or device to which it is attached.

FIG. 8B depicts a tool 575 that receives AC power from an AC mains outlet 580. The tool 575 is similar to tool 105 except as noted below. The tool 575 includes a rectifier 585 for converting the received AC power to DC power for powering the internal circuitry of the tool 575, such as tracking unit 150, tool controller 145, and sensors 155. In some embodiments, the motor 165 is powered by AC power, while, in other embodiments, the motor 165 is powered by DC power. In tool 575, the tracking unit 150 includes the optional energy storage device 230 to enable the tracking unit 150 to operate even when the tool 575 is not coupled to the AC mains outlet 580, similar to the tracking unit 150 of tool 105 operating when the battery 160 is removed. For instance, the controller 220 may detect from the tool controller 145 that the tool 575 is not receiving power from the AC mains outlet 580. In turn, the controller 220 may close or open a switch to connect the energy storage device 230 to the other components of the tracking unit 150.

FIGS. 9A-9B depict devices related to power tools in which a tracking unit 150 may be used. FIG. 9A depicts a battery 590 with a projection 591 and base 592. The stem includes electrical contacts 594 for engaging contacts of a receiving tool or other device (e.g., a work-site radio). A battery controller 593 is within the battery 590. The battery controller 593 is operable to monitor one or more of the state-of-charge of the battery, current charge/discharge rate, temperature, and other battery characteristics. The battery controller 593 is also operable to communicate with a tool or device. For example, the battery controller 593 may communicate via the electrical contacts 594 the monitored battery characteristics and an identifier that identifies, for example, the type and capacity of the battery 590. The battery controller 593 may also receive tool status and usage data from the tool. The tracking unit 150 operates as described above with respect to tool 105. Accordingly, a remote user is able to locate and monitor the battery 590 via the tool monitoring module 270, as well as receive information about the device to which the battery 590 is coupled.

FIG. 9B depicts a battery charger 595 with a slot 596 for receiving a battery projection (e.g., battery 160b or 591) and a plug 597 for coupling the battery charger 595 to an AC mains outlet. Within the slot are electrical contacts (not shown) for engaging contacts of an inserted battery. A charger controller 598 is within the battery charger 595 to control the charging and discharging of an inserted battery. The charger controller 598 is also operable to monitor characteristics of the charger 595 and an inserted battery. For example, the charger controller 598 monitors the state of charge of an inserted battery, the rate of charge/discharge, temperature, etc. The tracking unit 150 operates as described above with respect to tool 105, except that the characteristics monitored by the charger controller 598 are communicated, rather than tool status and usage data. Accordingly, a remote user is able to locate and monitor the battery charger 595 via the tool monitoring module 270.

Figure 10:
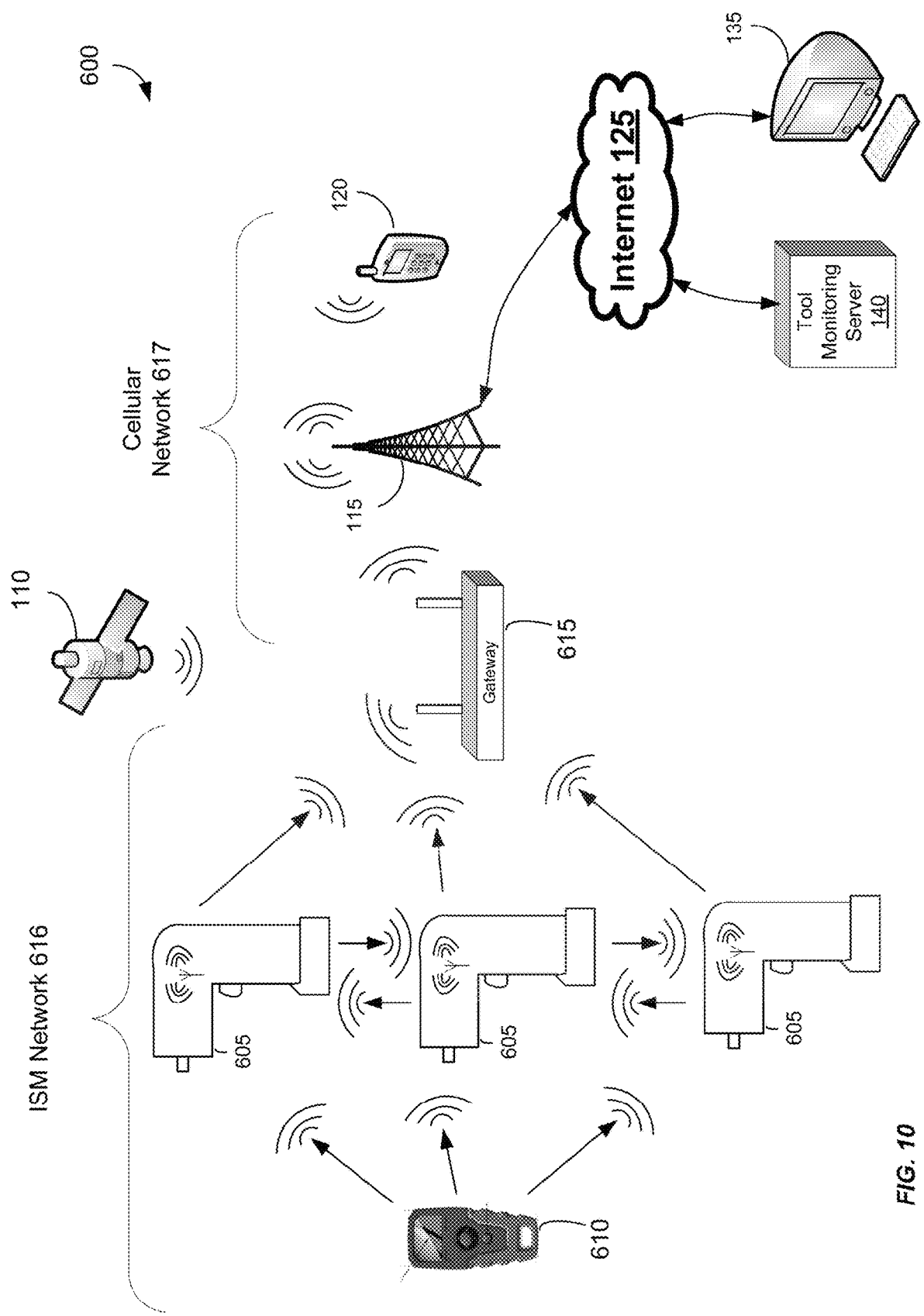
FIG. 10 illustrates another tool monitoring system according to embodiments of the invention.

FIG. 10 depicts a tool monitoring system 600 that utilizes industrial, scientific and medical (ISM) band communications. The system 600 includes tools 605, a key fob 610, and a gateway 615, along with the satellite 110, the cellular network antenna 115, the smart phone 120, the Internet 125, the personal computer 135, and the tool monitoring server 140 described above with respect to FIG. 1. The tool monitoring system 600 enables a user to monitor status, usage, and position information of the tool 105 remotely via, for example, the smart phone 120 or computer 135. The tool monitoring system 600 further enables a user to communicate with the tools 605 via the key fob 610.

As compared to the tool monitoring system 100 (FIG. 1), the tool monitoring system 600 has shifted the longer range, cellular communication capability from the tools 105 to the gateway 615, and utilizes a shorter-range, lower cost, lower power ISM band communication network to allow the tools 605, fobs 610, and the gateway 615 to communicate with one another. The tools 605, fobs 610, and gateway 615 make up an ISM network 616. In some embodiments, the individual ISM communications have a range of approximately 1000 feet, but the range may vary depending on obstacles, optimizations, and other factors.

In some embodiments, the tools 605 and fobs 610 have a transmit power over the ISM network 616 of approximately +10 dbm to balance energy efficiency and communication range, while the gateway 615 has a transmit power over the ISM network 616 of approximately +27 dbm to increase communication range. Various transmit power ranges may be implemented. For example, the power tools 605 and fobs 610 may have a transmit power between +5 dbm to +15 dbm, less than +5 dbm, or between +15 dbm and +27 dbm. Likewise, the gateway 615 may have a transmit power in the range of +15 dbm to +27 dbm, or less than 15 dbm. Generally, however, the gateway 615 has an average transmit power that is greater than the transmit power of the power tools 605 and fobs 610. Additionally, although the gateway 615 is capable of using a transmit power above +27 dbm, government regulations may prohibit such power levels for transmissions on the ISM network 616.

Additionally, the ISM network may be configured as a mesh network implementing a store and forward protocol. Thus, the other tools 605 and fobs 610 may serve as bridges to the gateway 615, effectively increasing the maximum communication range between tools 605, fobs 610, and gateways 615. An example of a message communicated via the store-and-forward protocol is described below with respect to FIG. 11A.

In some embodiments, one or more gateways 615 are positioned at a construction site to enable communications between the ISM network 616 and a cellular network 617. The gateway 615 serves as an intermediary communication device allowing the tools 605 of the ISM network 616 to communicate with remote monitoring devices (e.g., smart phone 120, PC 135, and tool monitoring server 140) via the cellular network antenna 115. Accordingly, potentially expensive and higher power consuming cellular communication circuitry is limited to the gateway 615, rather than being within each tool 605, resulting in an overall reduction in system costs and extended battery life of the tools 605.

The tool monitoring system 600 is scalable for use by individuals with a single tool, contractors at a single worksite with several tools, and large construction companies with hundreds of tools at worksites spread around the world. For instance, in a small-scale implementation, the system 600 includes one or more fobs 610 and one or more tools 605, but does not include the gateway 615 or elements connected to the gateway 615 (e.g., cellular network 115, PC 135, tool monitoring server 140). See, for example, FIG. 11A. In the small-scale implementation, the fob 610 enables a user to wirelessly interact with and monitor the tools 605, as is described in greater detail below.

FIG. 11B illustrates a medium-scale implementation, in which the fob 610 is directly coupled to, or otherwise in local communication with, a local computing device 618 (e.g., a laptop, tablet, or smart phone). The local computing device 618 generally executes more powerful software and has more powerful processing hardware than the fob 610. In addition to providing the functions of the fob 610, the local computing device 618 provides a more robust graphical user interface and additional features for interacting with the tools 605 (e.g., larger tool database, more configurable tool monitoring options, etc.). The fob 610 then facilitates the communication between the tools 605 and the local computing device 618. In other embodiments, the local computing device 618 includes integrated ISM communications circuitry and is not coupled to the fob 610 for communicating with the ISM network 616.

The tool monitoring system 600 illustrated in FIG. 10 is considered a large-scale implementation because it includes the gateway 615, which connects the ISM network 616 to the cellular network 617. In some large-scale embodiments, the gateway 615 is replaced or supplemented with an embodiment of the local computing device 618 having the ability to communicate with the cellular antenna 115, thus interfacing the ISM network 616 with the cellular network 617. The system 600 is further expandable to include multiple gateways 615 at a single worksite or at various worksites.

Figure 12:
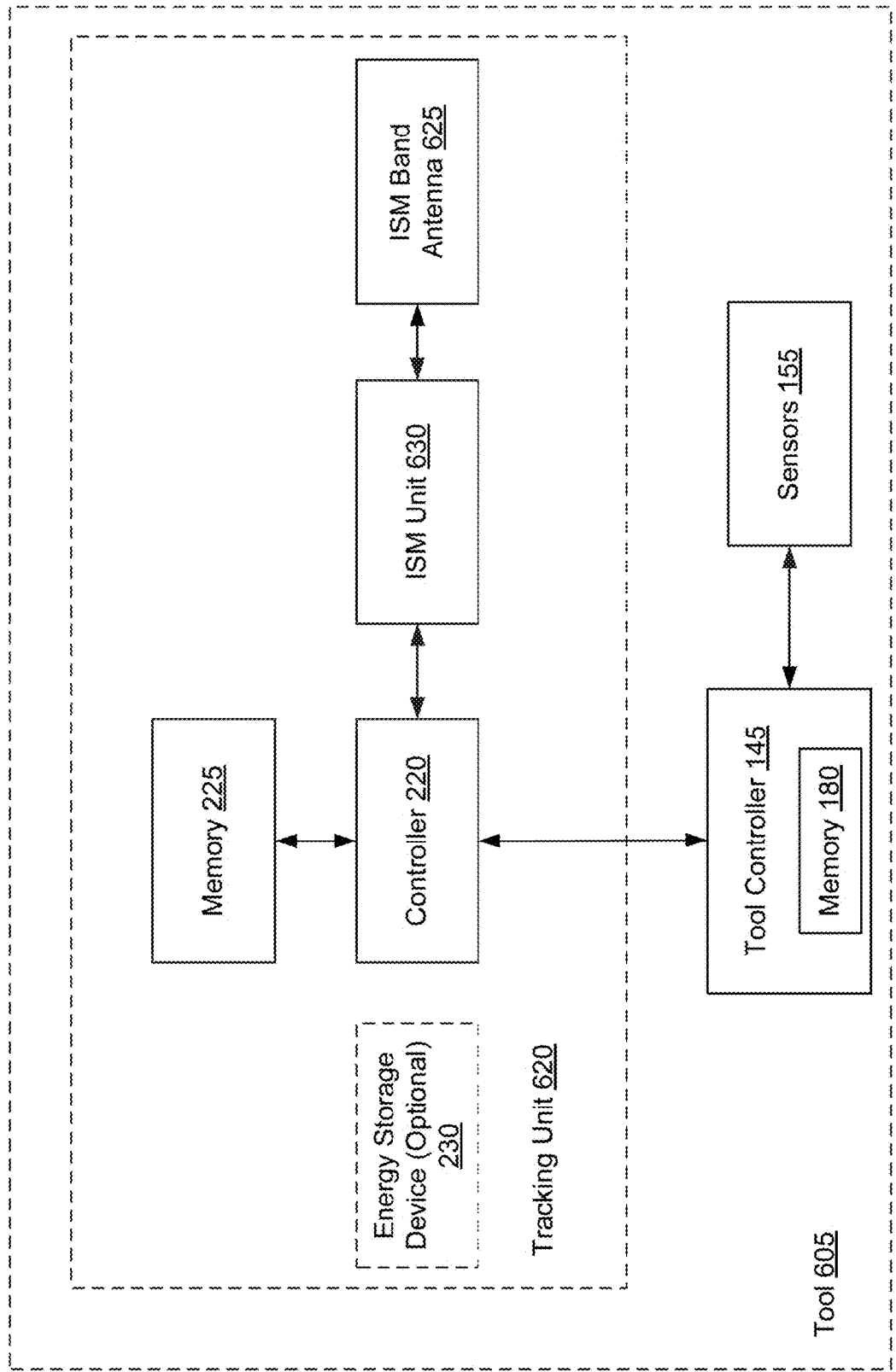
FIG. 12 illustrates an exemplary tool of the tool monitoring system of FIG. 10.

As shown in FIG. 12, the tool 605 is a battery-operated power drill that, similar to tool 105, includes the tool controller 145, sensors 155, battery 160, and motor 165. Although the tool 605 is depicted as a power drill in FIG. 10, other types of tools and accessories may also be monitored by the tool monitoring system 600, such as those described above with respect to system 100. The tool 605 further includes a tracking unit 620, rather than the tracking unit 150 of the tool 105. The tracking unit 620 is similar to the tracking unit 150, but includes an alternate wireless communication arrangement. The tracking unit 620 includes an ISM antenna 625 for communication with the fob 610, gateway 615, and/or other tools 605. The ISM antenna 625 is associated with an ISM unit 630, which facilitates wireless transmissions via the ISM antenna 625. Similar to the tracking unit 150, while the tracking unit 620 is generally powered by the battery 160, in some instances, the additional energy storage device 230 is included. As described above, the additional energy storage device 230 enables the tracking unit 620 to operate even when the battery 160 is not inserted into the tool 605.

In some embodiments, the tracking unit 620 is secured to the outside of the tool 605, similar to the tracking unit 550 of FIG. 8A. For instance, the mounted version of the tracking unit 620 includes a separate power source akin to battery 565 and a mount akin to mount 570. The mounted version of the tracking unit 620 may include sensors for monitoring the tool 605 to which it is mounted, and may be mounted to other devices as well, such as a battery charger, battery pack, work-site radio, vehicle, ladder, construction materials, etc. Additionally, the mounted version of the tracking unit 620 may be programmed via a wireless or wired connection such that the tracking unit 620 stores the type of tool or device to which it is secured. (e.g., drill, battery charger, ladder, vehicle, etc.) For instance, one or more of the smart phone 120, monitoring device 135, fob 610, and local computing device 618 may include software for communicating with and programming the tracking unit 620. Thereafter, when transmitting the ID of the tracking unit 620, the tracking unit 620 may also identify to a receiving device the type of tool or device to which it is attached.

Various frequency bands may be selected for communications of the ISM network 616. For example, the ISM communications may occur at approximately, 300 MHz, 433 MHz, 900 MHz, 2.4 GHz, or 5.8 GHz. The different frequency bands have various benefits. For instance, the 300 MHz range allows better penetration of construction site obstacles, such as walls, tool containers, etc. However, in some instances, government regulations allow more data transmissions in the 900 MHz range. In general, the ISM communications of the tracking unit 620 consume less power than the cellular communications of the tracking unit 150. Additionally, the ISM circuitry (e.g., ISM unit 630 and ISM antenna 625) generally has a lower cost than cellular circuitry.

The ISM frequency bands are approximate and, in practice, may have various ranges based on geography. For example, the 900 MHz range may more particularly include 902 to 928 MHz in the United States and other western hemisphere countries, and 863 to 870 MHz in Europe and Asia. Similarly, the 433 MHz band may include 420 to 450 MHz, the 2.4 GHz band may include 2.390 to 2.450 GHz, and the 5.8 GHz band may include 5.650 to 5.925 GHz.

In some embodiments, the ISM communications are implemented using a frequency hopping spread spectrum (FHSS) technique. In an FHSS technique, the transmitters and receivers in the ISM network switch over multiple frequencies for sending and receiving communications. For instance, the transmitters and receivers are both aware of a pre-determined sequence of frequency channel switching such that the receivers know which frequency to be monitoring for incoming messages at a given moment in time. An FHSS transmission scheme can improve the ISM network's resistance to interference and improve communication security.

The tools 605, fobs 610, and gateways 615 may further include a real time clock for synchronizing communications over the ISM network 616. For instance, the real time clock may be used by the ISM devices to determine precisely when to transmit and when to receive transmissions (e.g., for time multiplexed communications). In some instances, particular ISM devices are assigned receive and transmit time windows, which allows the devices to reduce power consumption as they may power down or enter a standby mode during periods in which the devices are not receiving or transmitting data. Furthermore, a list of time assignments for one or more ISM devices may be maintained by one or more of the ISM devices. For instance, one of the gateways 615 may maintain a list of time assignments of all ISM devices on the network 616.

In some embodiments, the ISM devices dynamically modify the strength of their wireless transmissions. For example, if a device's battery is low the ISM device may reduce the power at which wireless transmissions are output. Although the maximum distance that the wireless transmission may travel is reduced, the time period in which the device may continue to make these reduced power transmissions is increased. Additionally, the power at which wireless transmissions are output may be reduced if the ISM device is in close proximity to other ISM devices as determined by, for instance, signal strength. For instance, if the ISM network 616 is contained in a small area (e.g., one room), the ISM devices may detect an unnecessarily high signal strength in their communications and, in turn, reduce their transmission power. Thus, power consumption by the ISM device to carry out ISM communications is reduced. Similarly, if the signal strength of ISM communications is detected to be low, the ISM devices may increase the power at which transmissions are output to increase the range of the communications.

Figure 13C:
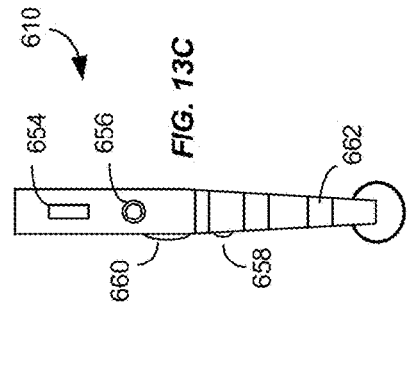
FIGS. 13A-C illustrate an exemplary fob of the tool monitoring system of FIG. 10.
Figure 13B:
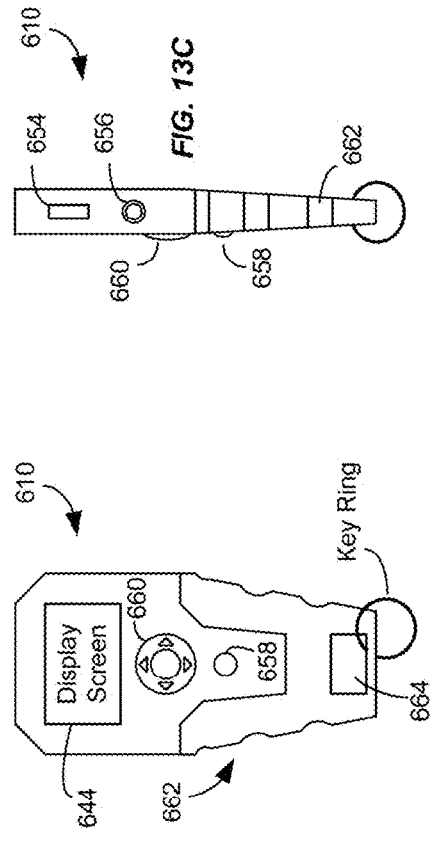
Figure 13A:
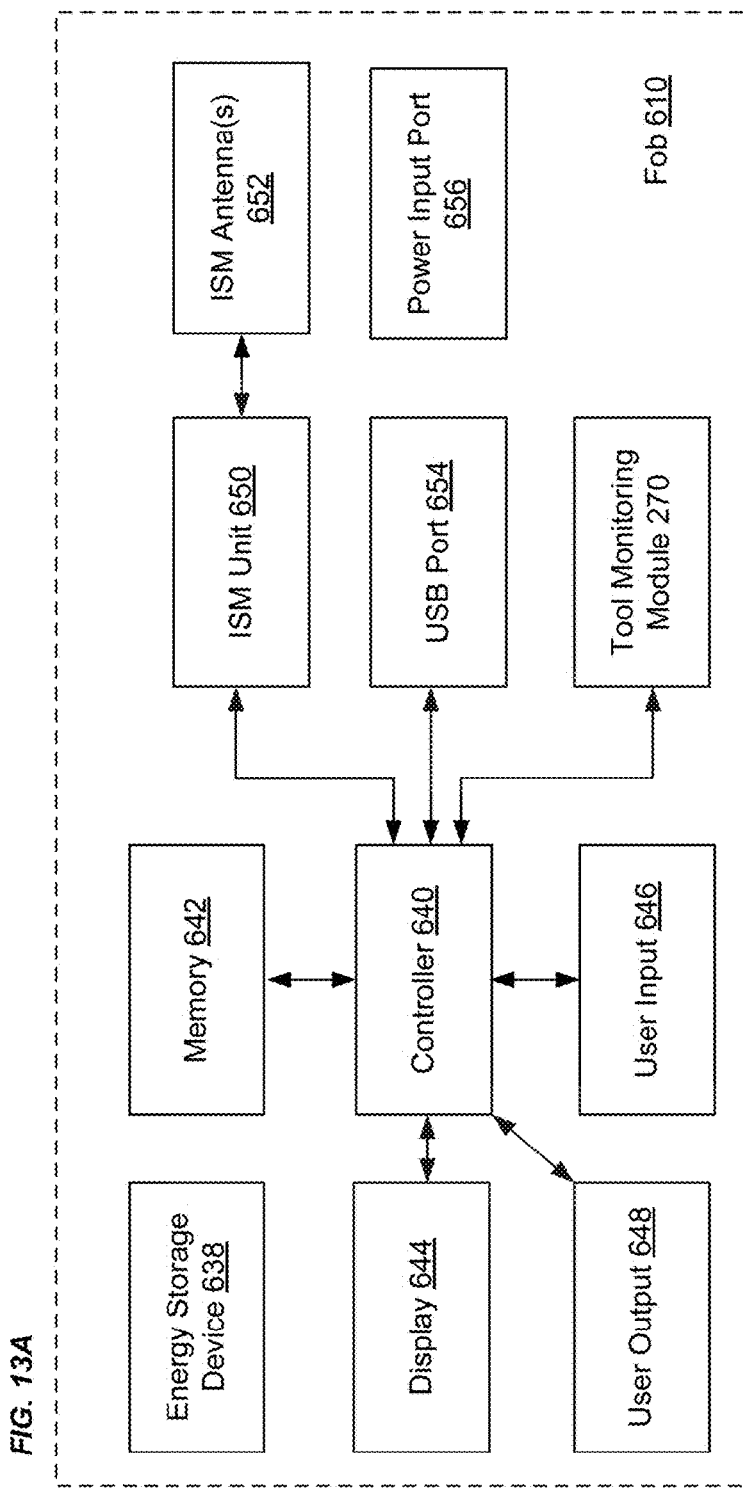

FIGS. 13A-C illustrate the fob 610 according to some embodiments. As shown in FIG. 13A, the fob 610 includes an energy storage device 638 (e.g., a battery) for powering the other components of the fob 610. The energy storage device 638 may be a primary battery that is replaced upon depletion, or a secondary (rechargeable) battery. In the case of a rechargeable battery, the battery may be charged in-unit by coupling the fob 610 to an external charger, or the fob 610 may include internal charger circuitry. The charging circuitry, whether internal or external, may be coupled to a power source (e.g., an AC wall outlet, USB port, etc.). In some instances, the energy storage device 638 is temporarily removed from the fob 610 for recharging.

The fob 610 further includes a controller 640 in communication with a memory 642, a display 644, user input 646, user output 648, an ISM unit 650, an ISM antenna 652, a USB port 654, and a power input port 656. The memory 642 may store instructions that, when executed by the controller 640, enable the controller 640 to carry out the functions attributable to the controller 640 described herein. The user output 648 includes output components other than the display 644, such as one or more speakers, lights, and vibration elements to communicate with or alert a user. The power input port 656 is used to couple the fob 610 to an AC wall outlet. Transformer circuitry (not shown) may be found internal or external to the fob 610 to transform AC power received via the power input port 656 to DC power for the fob 610. The power input port 656 may provide power for the components of the fob 610 and charge the energy storage device 638. The USB port 654 similarly may provide power for the components of the fob 610 and charge the energy storage device 638. Additionally, the USB port 654 enables the fob 610 to communicate with a host USB device, such as the local computing device 618, as described with respect to FIG. 11B.

FIGS. 13B-C illustrate an exemplary fob 610 implemented with a chirp button 658, navigation controls 660, hand grips 662 (including ridges for finger placement), and an aperture 664 for receiving a key ring or otherwise attaching the fob 610 to an item. The chirp button 658 and navigation controls 660 are part of the user input 646. In some instances, the display 644 is a touch screen display and may replace or supplement portions of the user input 646.

Returning to FIG. 13A, the fob 610 further includes the tool monitoring module 270 (see FIG. 4), which includes the tool database 285. The number of tools 605 and the amount of information for each tool 605 stored in the tool database 285 may be selected based on the amount of memory available in the fob 610. In some embodiments, information for over one hundred of the tools 605 is stored within the tool database 285.

For the fob 610, the tool database 285 may be populated using one or more techniques. For instance, the fob 610 may include a graphical user interface (GUI) that enables a user to navigate (e.g., with navigation controls 660) to manually add, edit, and delete tools 605 and associated information of the tools database 285. Additionally, the user can control the fob 610 to perform a scan of the ISM network 616 to automatically populate the database 285 by broadcasting an identify request to the tools 605. The user may also control the fob 610 to selectively add nearby tools 605. For instance, a user can hold the fob 610 near a tool (e.g., within 6, 12, or 24 in.) and navigate the GUI to select an add-a-tool option. In this add-a-tool option, the fob 610 detects the tool 605 with the strongest signal, which indicates that the tool 605 is the nearest to the fob 610, and adds the tool 605 to the tool database 285. The tools 605 may output, in response to a fob 610 request, a tool identifier and other stored information (e.g., status information) for purposes of adding the information to the tool database 285. Further, the tool database 285 may be populated remotely by sending tool information from the remote monitoring station to the fob 610.

As noted above, the fob 610 may communicate with the tools 605 via ISM communications (i.e., using ISM unit 650 and ISM antenna 652). In addition to populating the tool database 285, the communication may be used for tool identification, tool locating, geo-fencing, and other tool management and status monitoring. Communications between the tools 605, fobs 610, and gateway 615 include messages that may include a particular destination address (e.g., a tool/fob serial number, tool/fob ID, etc.) or may be a broadcast message (e.g., addressed to all or a subset of tools/fobs). When the controller 640 of the tool 605 receives a message, the controller 640 determines whether the message is intended for itself based on the destination address, if the message is intended for another tool 605, or if the message is a broadcast message. If the message is addressed to the particular controller 640, the message is handled as appropriate and, generally, is not repeated. However, if the message is addressed to a different tool 605 or is a broadcast message, the tool 605 will re-transmit the message. In the case of a broadcast message, the tool 605 will handle the message as appropriate in addition to forwarding the message.

Returning to FIG. 11A, an example of tools 605a-c and the fob 610 communicating over a store-and-forward mesh network is shown. In FIG. 11A, the fob 610 outputs a message addressed to tool 605c, but tool 605c is outside of the range of the initial transmission of the fob 610. However, tool 605a is within range and receives the message. Tool 605a temporarily stores the message, recognizes that the message is not intended for the tool 605a, and re-transmits the message. Tool 605b receives the forwarded message and, similarly, forwards the message. Tool 605c then receives the forwarded message and recognizes that the forwarded message was addressed to itself (tool 605c). The tool 605c then outputs a response addressed to the fob 610, which follows the same path through tools 605b and 605a back to the fob 610. Assuming that each transmission is 1000 feet in this example, the store and forward technique has tripled the range of the fob 610 from 1000 feet to 3000 feet. Accordingly, the store-and-forward mesh network increases the distance over which the tools 605, fobs 610, and gateway 615 can communicate. Although FIG. 11A illustrates two tools 605a-b forwarding messages, the store-and-forward protocol generally does not limit the number of times a message may be forwarded.

As noted above, the fob 610 includes the tool monitoring module 270. In the system 100 (FIG. 1), the tool monitoring system 270 within the remote monitoring devices (e.g., smart phone 120) relied on GPS data and cellular communications with the tools. In contrast, the tool monitoring system 270 of the fob 610 relies on ISM communications for sending commands, receiving tool data, and determining tool position, for example, based on strength of signal determinations. For example, the chirp module 297 of the tool monitoring module 270 within the fob 610 communicates using the ISM network 616. A user navigates a GUI of the fob 610 to select the particular tool 605 from the tool database 285 (e.g., by searching tool type or ID, scrolling, categorizing by tool, or a combination thereof), then depresses the chirp button 658. In response, the fob 610 outputs a chirp message over the ISM network 616 addressed to the tool 605 selected by the user.

Upon receipt by the tool 605, the tool 605 outputs a chirp noise or other audible sound to assist the user in locating the tool 605. The tool 605 may repeatedly output the chirp noise to guide the user for a preset amount of time in response to the chirp message. Once the user locates the tool 605, the user may depress the trigger or another button on the tool 605 to cease the chirp noise. In some embodiments, the tool 605 includes a light that flashes and/or a vibration element that vibrates in combination with or in place of the chirp noise to assist the user in locating the tool 605. In some embodiments, the user may select via the fob 610 whether the tool 605 outputs an audible indicator (e.g., chirp, or ownership message), a visual indicator (e.g., light flash), a tactile indicator (e.g., vibration) or a combination thereof, in response to the chirp message.

In some embodiments, the tool 605 stores an audio message in the memory 225 or the memory 180 that indicates the owner or serial number of the tool 605. Upon receiving an owner request, the tool 605 outputs the audio message (e.g., "This tool is owned by Acme Company"). In some instances, the owner request is made by a user via an owner request button (not shown) on the GUI 306 or by depressing a button on the tool 605.

In some embodiments, the tools 605 include a chirp button to assist in locating one of the fobs 610. Since a display may not be included on the tools 605, the tools 605 may store an identifier for a "home" fob 610, and depressing a chirp button of the tool 605 would cause the home fob 610 to chirp. The fob 610 may be used to store the identifier of the home fob 610 in the tool 605.

The geo-fence module 290 of the tool monitoring module 270 within the fob 610 also communicates using the ISM network 616 to, for instance, deter theft of tools 605. For example, the user may navigate the GUI of the fob 610 to select a tool from the tool database 285 and activate a geo-fence. The GUI and navigation controls 660 allow the user to specify a geo-fence range by, for instance, indicating a radius around fob 610 in which the tool 605 is intended to operate. Thereafter, the fob 610 is in continuous or periodic communication with the tool 605 and detects the strength of the signal(s) from the tool 605 to estimate the distance between the tool 605 and the fob 610. For instance, the fob 610 may periodically poll the tool 605 and receive a response from the tool 605 with an identifier, or the tool 605 may periodically broadcast its identity for receipt by the fob 610, which then detects the strength of the signal from the tool 605. As other tools 605 and fobs 610 may be configured to forward messages received as part of a mesh network communication scheme (described below), a forwarded message may include an indicator signifying that the message has been forwarded and, therefore, the strength of the signal may not represent the actual distance between the tool 605 and the fob 610.

In some embodiments, the geo-fence range is not specified by a radius but, rather, is the direct communication range of the fob 610. For instance, if the tool 605 is able to directly communicate with the fob 610, rather than via message forwarding by another tool 605 or fob 610, then the tool 605 is within the geo-fence. However, if the tool 605 is not able to directly communicate with the fob 610, the tool 605 is considered outside of the geo-fence.

In some instances, the geo-fence range is specified by the number of message forwards over the mesh network. For instance, with reference to FIG. 11A, the tools 605a-c may have a range specified as a single message forward relative to the fob 610. Accordingly, the tool 605a is within range, as it can directly communicate with the fob 610. Tool 605b is also within the geo-fence, because the fob 610 communicates with the tool 605b through a single message forward (by tool 605a). Tool 605c, however, is outside the geo-fence, as a message from fob 610 must be forwarded twice to reach the tool 605c—once by tool 605a and once by tool 605b.

When a message is forwarded by the tool 605, the tool 605 may alter or add to the message to one or more of: 1) indicate that the message has been forwarded, 2) increase a forwarded counter to indicate how many times the message has been forwarded, and 3) include an identifier of itself so that a future receiving device is aware of the identity of the various devices that forwarded the message. In the geo-fence context, as well as in other communications over the ISM network 616, if the tool 605 receives a message more than once within a particular time frame, e.g., once directly from the sending device and once indirectly from another device, the tool 605 may ignore the second (repeat) message. In some instances, a message may include an identifier so that a receiving device can discern whether a duplicate message has been received via an alternate store-and-forward path.

In some instances, tools 605 may be assigned multiple geo-fences to define a permitted area, a warning area, and an alarm and lock-out area, as described above with respect to FIG. 5D. In some instances, multiple devices in the system 600 cooperate to triangulate the location of a particular tool 605 using, for instance, strength-of-signal determinations made by the multiple fobs 610, the gateway 615, and other tools 605.

Turning to the security module 295 of the tool monitoring system 270 within the fob 610, a user is able to remotely limp or lock-out one of the tools 605. The user may navigate a user interface of the fob 610 to select a particular one of the tools 605, and then select a lock-out function. In response, the controller 640 outputs a lock-out message addressed to the tool 605. The lock-out message is transmitted over the ISM network 616 and received by the tool 605. The tool controller 145 then locks out the tool 605 to prevent further operation.

For the tool polling module 275 of the tool monitoring system 270 within the fob 610, a user is able to poll a tool 605 to obtain tool information. The user may navigate a user interface of the fob 610 to select a particular one of the tools 605, and then select a poll tool function. In response, the controller 640 outputs a poll message addressed to the tool 605. The poll message is transmitted over the ISM network 616 and received by the tool 605. The tool controller 145 then sends a response message to the fob 610 including tool information.

The tool monitoring module 270 may include additional features when implemented in the fob 610. For instance, the tool monitoring module 270 may further include an identify module (not shown) for identifying tools 605. At a worksite, a user may find a tool unattended and wish to identify the tool. Similar to the add-a-tool technique, a user can hold the fob 610 near the unattended tool and navigate the GUI to select an identify option. The fob 610 may broadcast an identify request and then detect the tool 605 that responds with the strongest signal. The tool 605 responding with the strongest signal is determined to be nearest to the fob 610. The fob 610 may then display the tool information provided by the tool 605 with the strongest signal, which will correspond to the unattended tool, along with associated tool information stored in the tool database 285. If the unattended tool is not within the tool database 285, the user may opt to add it.

In some embodiments, the ISM antenna 652 of the fob 610 includes two ISM antennas 652. The two ISM antennas 652 are operable to implement radio frequency direction finding (RFDF) to detect the direction from which RF signals are coming. For instance, the ISM antennas 652 may use a Doppler RFDF or a very high frequency (VHF) omni-directional radio range (VOR) technique. In other words, characteristics (timing, strength of signal, etc.) of transmissions received by the two antennas are measured and a direction and distance from which the transmissions were extrapolated from differences in the characteristics between the two antennas. In response, the fob 610 may display a direction pointer indicating the direction of incoming communications to assist leading a user to a particular tool 605 or other fob 610. An approximate distance that the wireless communication traveled may also be displayed based on, for instance, a strength-of-signal analysis.

FIGS. 13D-G illustrates a smart phone 120 having an ISM case 670. The smart phone 120 and the ISM case 670 are collectively referred to as ISM phone 671. The ISM case 670 receives the smart phone 120 and may snap onto or have a friction fit with smart phone 120 to keep the ISM case 670 secured thereto. The ISM case 670 protects the smart phone 120 from damage due to bumping, dropping, and other physical contact. Accordingly, the ISM case 670 includes a perimeter 672 that surrounds the outer sides of the smart phone 120, a back 674, and, in some instances, a clear front panel (not shown) to protect the touch-screen display 254. Additionally, the ISM case 670 includes an integrated ISM antenna 676 for communicating over the ISM network 616, e.g., with the tools 605, fobs 610, the gateway 615, and other ISM phones 671. In FIG. 13F, the integrated ISM antenna 676 includes one or more antennas 676 in the perimeter 672.

In the embodiments illustrated in FIGS. 13D-F, the smart phone 120 communicates with the ISM case 670 via the plug 678, which is received via a female port 679 on the bottom of the smart phone 120. The ISM case 670 may further include a female port 680 that is similar to the female port 679 of the smart phone 120. The ISM case 670 may then act as a pass-through for power and communications that would normally be provided to the smart phone 120 via the female port 679. In some embodiments, the case 670 communicates with the smart phone 120 via a wireless connection, such as Bluetooth®. In these instances, the case 670 may include an additional antenna to enable the wireless communications with the smart phone 120.

FIG. 13G illustrates the case 670 including the antennas 676, the pass-through port 680, a communication module 682, a memory 684, and a controller 686. The memory 684 may store instructions that, when executed by the controller 686, enable the controller 686 to carry out the functions attributable to the case 670 described herein. The communication module 628 enables the case 670 to communicate with the smart phone 120, for instance, via the plug 678 and port 679 or via Bluetooth®.

The ISM phone 671 is operable to perform the functions of the fob 610. For instance, the ISM phone 671 is operable to track and communicate with tools 605, other fobs 610, and other ISM phones 671. Additionally, the ISM phone 671 is operable to communicate on the cellular network 617 via the gateway 615 or via its own cellular radio.

In some embodiments, the ISM phone 671 uses the antennas 676 to implement an RFDF technique as described above with respect to the fob 610. For instance, FIG. 13D illustrates a direction pointer 688 and approximated distance 690 to a wireless communication source, such as one or more of the tools 605, fobs 610, and other ISM phones 671. The direction pointer 688 points in the direction of an ISM device emitting wireless communications. In this example, wireless ISM communications from one of the tools 605 are originating from a position approximately 10 meters northwest of the ISM phone 671. A similar display including the direction pointer 688 and approximated distance 690 may be incorporated into the fob 610.

Figure 14:
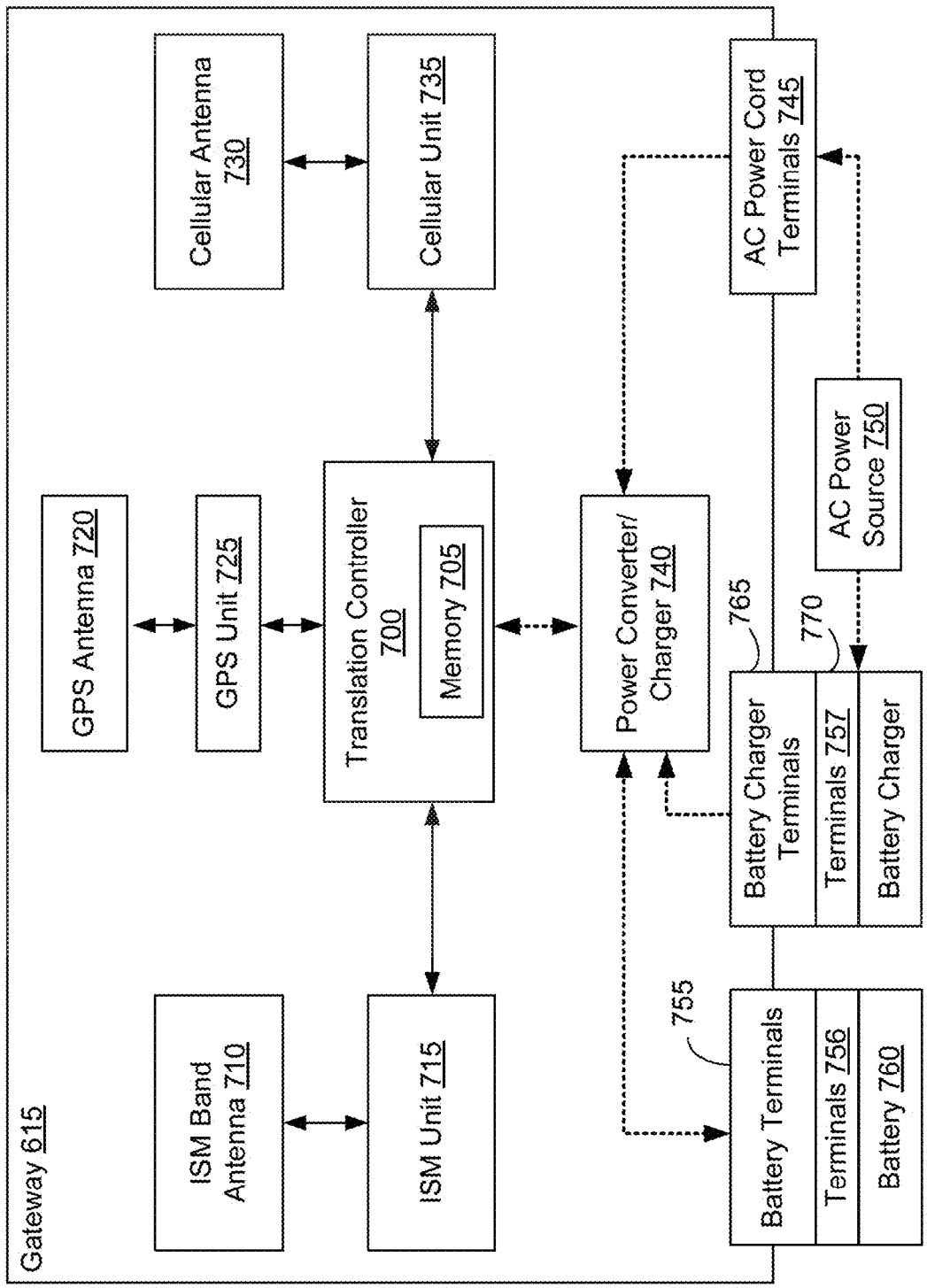
FIG. 14 illustrates an exemplary gateway of the tool monitoring system of FIG. 10.

FIG. 14 illustrates the gateway 615 according to some embodiments. The gateway 615 includes a translation controller 700 including a memory 705 storing instructions that, when executed by the controller 700, enable the controller 700 to carry out the functions attributable to the controller 700 described herein. The gateway 700 includes an ISM band antenna 710 and ISM unit 715 for ISM communications; a GPS antenna 720 and GPS unit 725 for receiving GPS signals from satellite 110; and a cellular antenna 730 and cellular unit 735 for cellular communications. The components of the gateway 615 are powered via power converter/charger 740. The power converter/charger 740 is operable to receive and convert power for supply to the components of the gateway 615. For example, the power converter/charger 740 is coupled to AC power cord terminals 745, which may be coupled to an AC power source 750, for instance, via a power cord. The power converter/charger 740 converts the received AC power to an appropriate DC power level for use by components of the gateway 615.

The gateway 615 further includes battery terminals 755 (i.e., a power interface) for receiving terminals 756 (i.e., a power source interface) of a battery 760. The battery 760 is a rechargeable and selectively removable DC power tool battery, such as usable to power the tool 105 and tool 605. The battery 760 may include a pack housing containing several battery cells, such as lithium ion or NiCad cells. In some embodiments, the battery 760 is not a power tool battery but, rather, is a primary battery or rechargeable battery of another type. When the gateway 615 is disconnected from the AC power source 750, the power converter/charger 740 draws power from the battery 760 for powering the components of the gateway 615. When the gateway 615 is connected to the AC power source 750, the power converter/charger 740 uses the received AC power to charge the battery 760 (as necessary). The gateway 615 further includes battery charger terminals 765 (i.e., a power interface) for coupling terminals 757 (i.e., a power source interface) of a battery charger 770 thereto. In some embodiments, the battery charger 770 is a power tool battery charger, such as used to charge the power tool battery 760. When coupled to the battery charger 770, however, the gateway 615 acts as a power consuming device similar to a battery being charged by the battery charger 770. Accordingly, the battery charger 770 provides DC power to the power converter/charger 740, which is then used to power the components of the gateway 615.

In some embodiments, the gateway 615 includes one of the battery terminals 755 and the battery charger 770, but not both. For instance, FIGS. 15A-B illustrate the gateway 615 including battery terminals 755 (not within view) for slidingly-engaging the battery 760. The battery 760 includes latches 772 coupled to respective hooks 774 positioned along respective rails 776. The gateway 615 includes grooves 778 that correspond to the rails 776 for sliding engagement. When the latches 772 are depressed, the hooks 774 move inward to become flush with the rails 776 such that the gateway 615 may be selectively disengaged from the battery 760. The gateway 615 further includes a data port 780, such as a Universal Serial Bus (USB®) port. The data port 780 enables the gateway 615 to communicate with devices, such as a local computing device 618, and to receive power from such devices. The data port 780 may be used to update firmware of the gateway 615, or to communicate data to/from the gateway 615 in conjunction with or in place of its cellular communications. In some embodiments, a stem-type power tool battery pack having a projection extending away from a base of the battery pack is used, rather than the sliding groove/rail engagement system of the battery pack 760.

In some embodiments, the battery 760 includes battery cell monitoring circuitry to detect low charge and excessive battery temperature situations. In turn, the battery cell monitoring circuitry is operable to emit a battery status signal indicative of the detection to a device coupled thereto, such as the gateway 615. The battery status signal is communicated, for instance, over a data terminal of the battery terminals 756 and battery terminals 755 of the gateway 615. In response, the gateway 615 shuts down to prevent draining the battery charge level below a low threshold or heating the battery above a high temperature threshold, each of which could damage the battery 760.

FIGS. 16A-B illustrate the gateway 615 including battery charger terminals 765 (not within view) for slidingly-engaging the battery charger 770 via rails 776 and grooves (not shown). As in the embodiments of FIGS. 15A-B, the gateway 615 of FIGS. 16A-B includes a data port 780 with similar functionality.

Figure 16C:
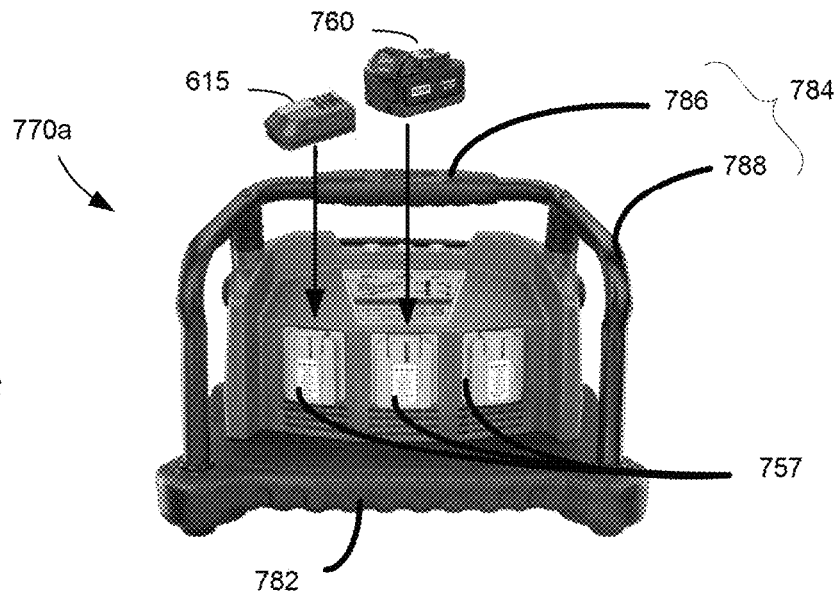
Figure 16D:
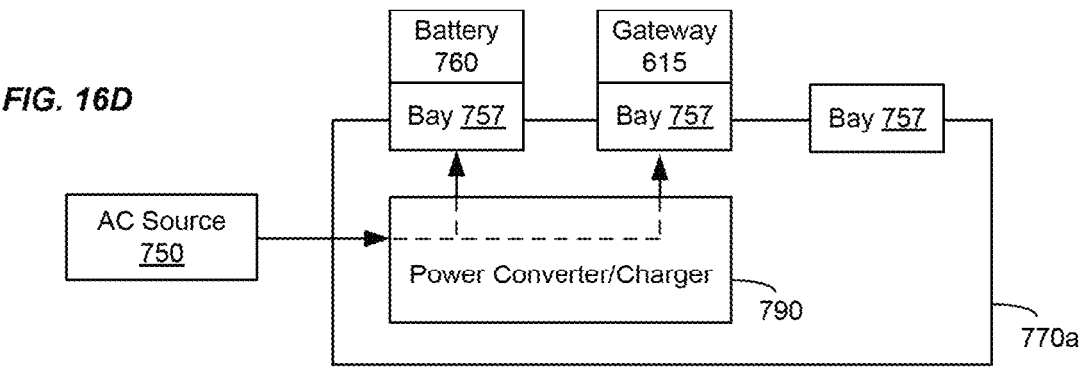
Figure 16E:
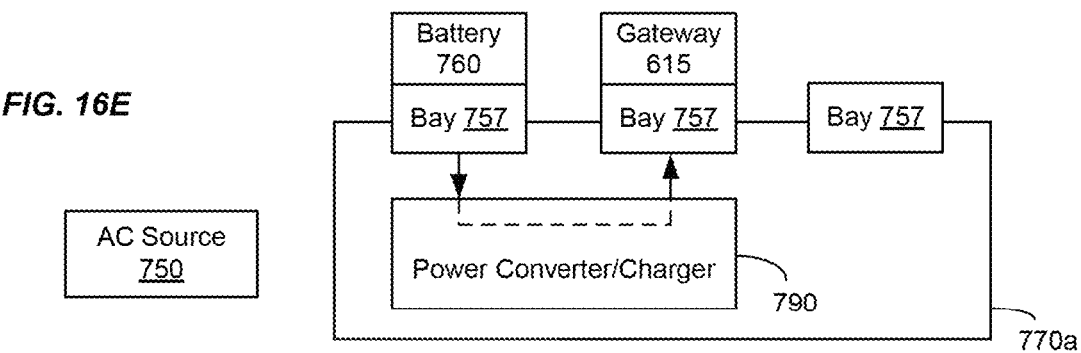

FIGS. 16C-E illustrate a multi-bay battery charger 770a having a rigid construction with a base 782 and handle assembly 784. The handle assembly 784 includes a handle 786 and connecting arms 788 that also protect the multi-bay battery charger 770a from impacts. The multi-bay battery charger 770a includes six power source interfaces 757 for receiving one or more power tool battery types, such as the power tool battery 760, for recharging. Additionally, the power source interfaces 757 are operable to accept and power the gateway 615, similar to the battery charger 770 of FIGS. 16A-B. In some embodiments, the multi-bay battery charger 770a includes more or fewer power source interfaces 757, such as two, four, or eight power source interfaces. In some embodiments, the multi-bay battery charger 770a is further able to power the gateway 615 using power from one or more battery packs coupled to the other power source interfaces 757, such as the power tool battery 760.

FIG. 16D illustrates the AC power source 750, the battery 760, and the gateway 615 coupled to the multi-bay battery charger 770a having three power source interfaces 757a-c, also referred to as "bays." The AC power source 750 supplies power to the power converter/charger 790, which charges the battery 760 and powers the gateway 615. In FIG. 16E, the AC power source 750 is not coupled to the multi-bay battery charger 770a. Rather, the gateway 615 is powered by the battery 760. In both FIGS. 16D and 16E, the power source interfaces 757c is open, but could accept another battery 760 for charging or assisting in supplying power to the gateway 615.

Returning to FIG. 14, as noted above, the gateway 615 provides an interface between the ISM network 616 and the cellular network 617. Communications from the ISM network 616 destined for a device of the cellular network 617 (e.g., the smart phone 120) are received by the controller 700 via the ISM band antenna 710 and ISM unit 715. The controller 700 converts the communications to a cellular protocol and transmits the message to the cellular network 617 via the cellular antenna 730 and cellular unit 735. Communications from the cellular network 617 destined for a device of the ISM network 616 (e.g., the tools 605 or fobs 610) are received by the controller 700 via the cellular antenna 730 and cellular unit 735. The controller 700 converts the communications to an ISM protocol and transmits the message to the ISM network 616 via ISM band antenna 710 and ISM unit 715.

The gateway 615 is further operable to receive GPS signals from satellite 110 via GPS antenna 720 and GPS unit 725 for determining the position of the gateway 615. For instance, the controller 700 may determine the position of the gateway 615 and provide the position information to a user at a remote monitoring device, such as PC 135 or smart phone 120. The user is further able to request that the gateway 615 determine which tools 605 and fobs 610 are on the ISM network 616 associated with the gateway 615. Accordingly, by determining where the gateway 615 is located and receiving an indication of which tools 605 and fobs 610 are in communication with the gateway 615, a remote user is able to remotely determine the general location of the tools 605 and fobs 610.

Further still, the gateway 615 may determine a distance between itself and one of the tools 605 and/or fobs 610 based on a determined strength of signal of incoming messages from the tools 605 and/or fobs 610. Using strength of signal determinations enables a more precise determination of the location of tools 605 and fobs 610. Additionally, the gateway 615 may use strength of signal determinations made by other fobs 610 and tools 605 with respect to a particular tool 605 or fob 610 to be located, in conjunction with the strength of signal determination made by the gateway 615, to triangulate the position of the particular tool 605 or fob 610. Thus, the user is able to remotely perform an inventory check and locate one or more tools 605 and fobs 610 that are within range of the ISM network 616.

Additionally, the gateway 615 may include a geo-fence module (not shown) that enables the gateway 615 to perform the geo-fence capabilities described above with respect to the fob 610. For instance, the gateway 615 may be programmed by the fob 610 or remote monitoring devices to store one or more geo-fences with respect to one or more tools 605 and/or fobs 610. The gateway 615 is able to monitor the location of the one or more tools 605 and/or fobs 610, as noted above. Upon detecting one of the tools 605 exceeding a geo-fence, the gateway 615 may take appropriate action, such as generating an alert to one of the fobs 605 and/or remote monitoring devices, locking the tool, etc.

In the system 600, the methods 340, 375, and 450 of FIGS. 6A, 6B, and 7 may be implemented by the fob 610, local computing device 618, the gateway 615, one of the remote monitoring devices, or a combination thereof. However, the tool data (including position and status data) and boundaries are obtained and monitored over the ISM network 616, rather than via GPS data and direct cellular communications between the tools and remote monitoring devices. Furthermore, the user interface illustrated in FIGS. 5A-D may be incorporated into the fob 610, local computing device 618, or remote monitoring devices (e.g., smart phone 120 or PC 135) of system 600 to enable the set-up of a geo-fence, monitoring of the position of the tool 605, etc., using communications over the ISM network 616, rather than GPS data.

The smart phone 120 and/or PC 135 in system 600 may provide a user interface that is generally similar to that which is described above for system 100. For instance, the user interface of the smart phone 120 described with respect to FIGS. 5A-D may be generally similar to a user interface provided on the fob 610. However, (1) strength of signal and triangulation techniques are used on the ISM network to locate tools 605 and fobs 610, rather than GPS data, and (2) an intermediate device (gateway 615) is used to transmit and translate data communications between devices on the cellular network 617 and the tools 605 and fobs 610 on the ISM network 616.

Although embodiments of system 600 have been described as including tools 605 and fobs 610 that do not include GPS units, in some embodiments, some or all of the tools 605 and/or fobs 610 include GPS units, similar to the tools 105 of FIG. 2, for locating, tracking, and geo-fence purposes. However, the tools 605 and fobs 610 communicate GPS position data across the ISM network 616 to the gateway 615 to reach the cellular network, rather than including cellular radios.

FIGS. 17A-B illustrate embodiments in which the gateway 615 is secured to a worksite radio 800. The worksite radio 800 may be a rugged radio that is better able to withstand physical damage common at a worksite relative to a typical portable radio. For example, the worksite radio 800 may include a weather proof/resistant construction, shock absorbing elements, hard case, etc. The radio 800 may provide a physical attachment portion 802 that enables the gateway 615 to be securely attached to the radio 800 such that the gateway 615 will not detach through normal movement of the worksite radio 800. For instance, the gateway 615 may include tabs for snapping onto the radio 800, a rail and groove arrangement for a sliding engagement, a friction fit arrangement, etc. In some instances, the gateway 615 fits into a receptacle of the worksite radio 800, which is selectively covered by a pivoting or sliding door. The radio 800 also includes a protective frame 805 that extends above the gateway 615 to provide some level of protection to the otherwise exposed gateway 615 shown in FIG. 17B. In some embodiments, the radio 800 includes a compartment, with or without a door, padding, etc., for receiving the gateway 615 to provide an additional level of protection from physical damage.

Figure 18:
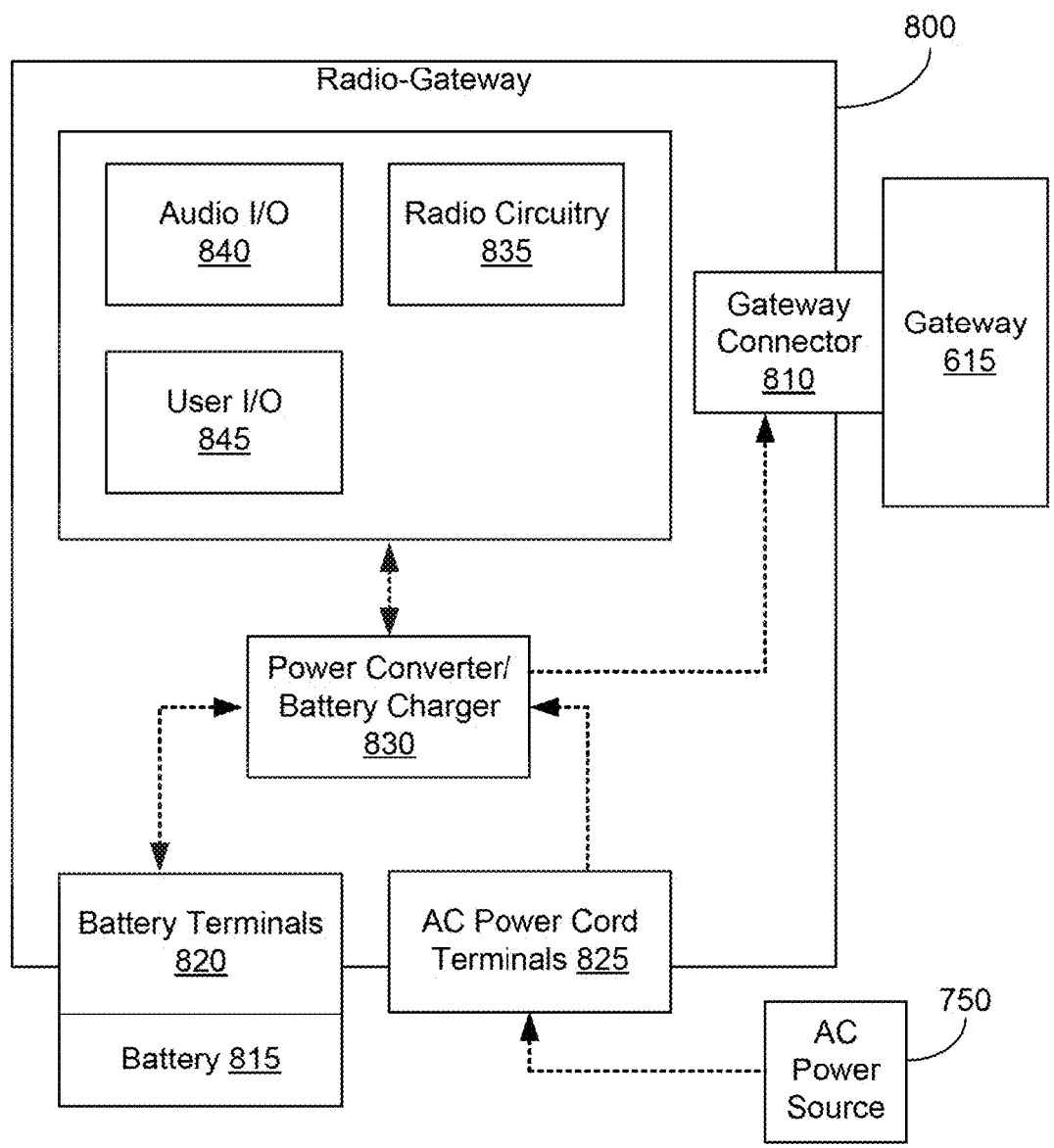

In some embodiments, the gateway 615 is also electrically coupled to the radio 800 to enable the gateway 615 to receive power via the radio 800. For instance, FIG. 18 illustrates the radio 800 including a gateway connector 810 for selectively coupling the gateway 615 to the radio 800. For instance, the gateway 615 may be coupled to the radio 800 via one of the battery terminals 755 and battery charger terminals 765. The radio 800 may be powered by a rechargeable and selectively removable power tool battery 815 that is coupled to the radio 800 via battery terminals 820. Alternatively, the radio 800 may be coupled to the AC power source 750 via AC power cord terminals 825. The radio 800 further includes a power converter/charger 830, which is similar to the power converter/charger 740 in that the power converter/charger 830 may receive power from various sources and convert the power to DC power for consumption by other components. The power converter/charger 830 provides DC power to the gateway 615 via gateway connector 810, and to the other components of the radio 800 including radio circuitry 835, audio input/output 840, and user input/output 845. The radio circuitry 835 is operable to generate audio signals in response to audio input from the audio input/output 840. The audio input may include AM or FM transmissions received via an antenna (not shown), compact discs, a digital music player (e.g., an iPod®), etc. The audio input/output 840 receives the audio signals from the radio circuitry 835 and, in response, generates sound via speakers. The user input/output 845 enables a user to select volume levels, select audio input types, and perform other common user interactions with a radio.

Figure 19:
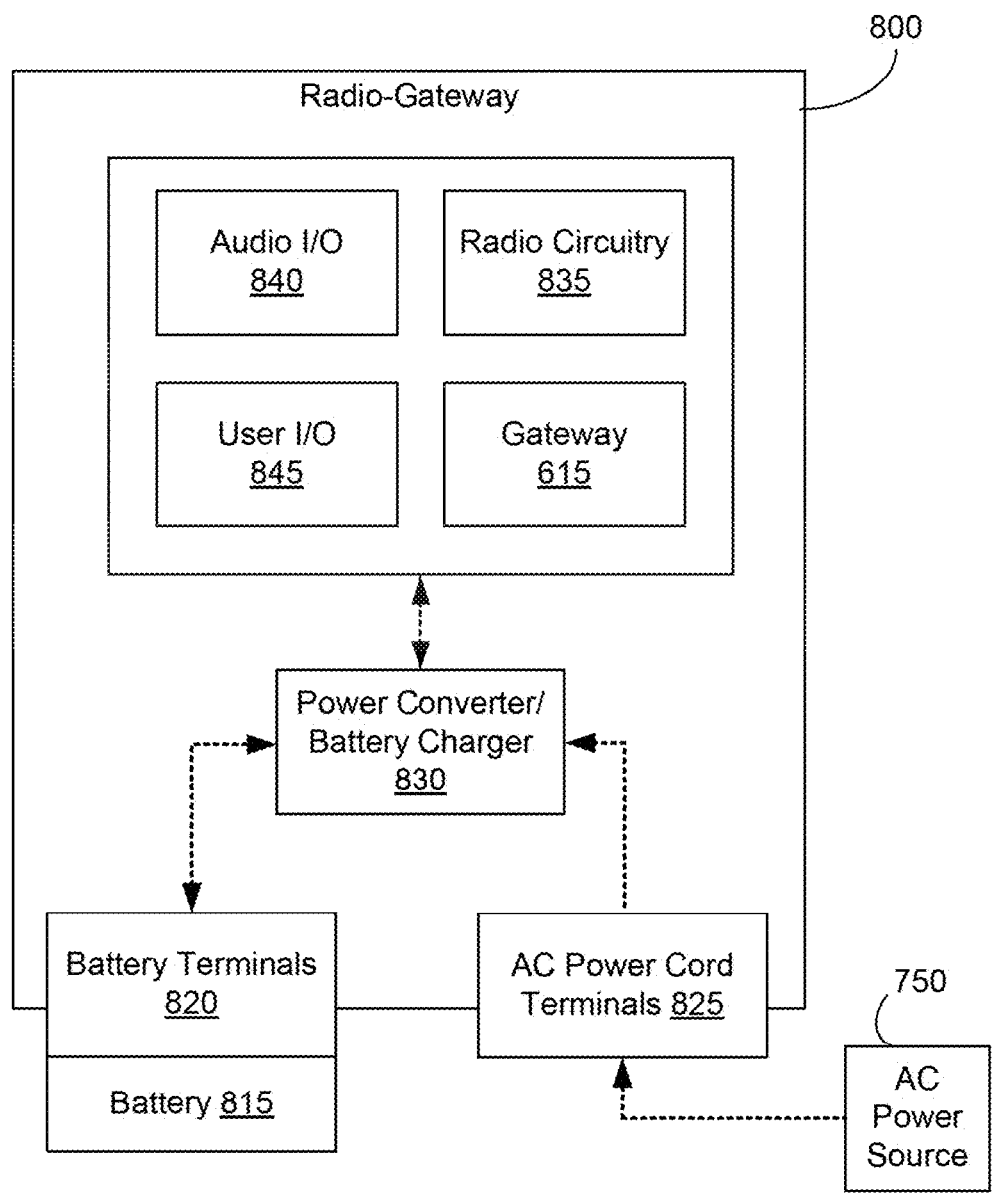

FIG. 19 illustrates a radio 850, which is similar to radio 800 except that the gateway 615 is integrated with the radio. In other words, the gateway 615 is not selectively removable from the radio 850 without disassembly. The user input/output 845 may provide a user interface to the gateway 615 to allow a user to selectively enable, disable, and otherwise control the gateway 615.

Figure 20:
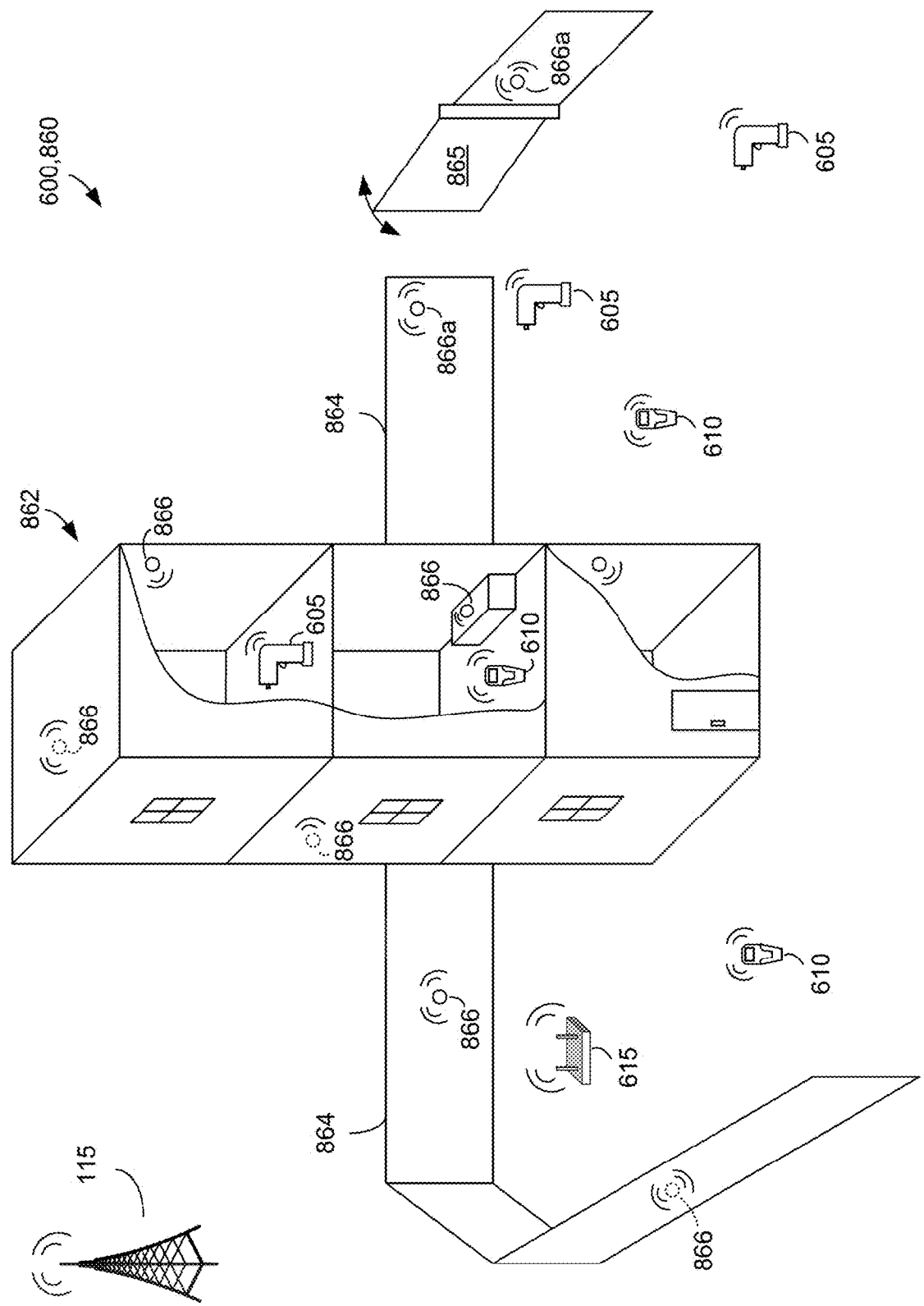
FIG. 20 illustrates a worksite having an ISM network.

FIG. 20 illustrates the system 600 at a worksite 860 having a building 862, a fence 864 defining a perimeter around the worksite 860, a gate 865, and further including puck repeaters 866 on the ISM network 616. The puck repeaters 866 receive ISM communications from the tools 605, fobs 610, or gateways 615, and re-transmit the received communications to other tools 605, fobs 610, and/or gateways 615 on the ISM network 616. By repeating the ISM communications, the puck repeaters 866 can extend the range and improve the coverage of the ISM network 616. The puck repeaters 866 also perform additional functions, as described below.

Figure 21A:
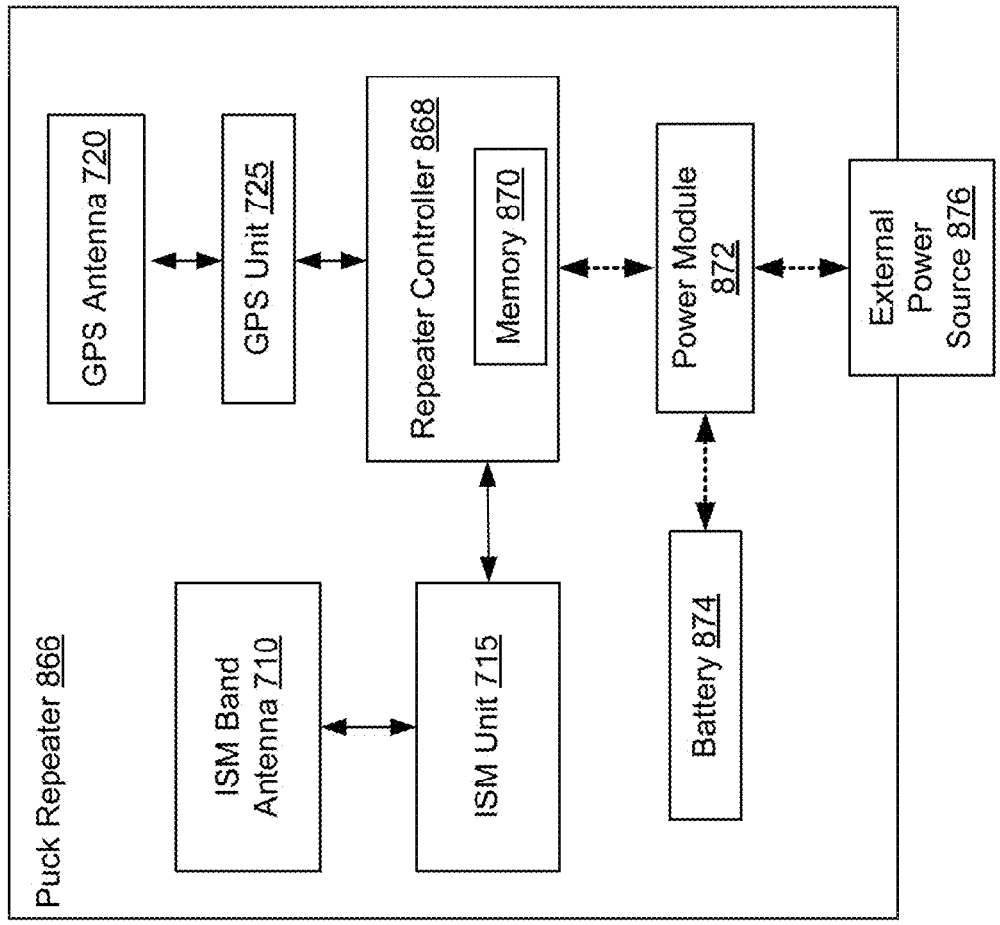
FIGS. 21A-B illustrate puck repeaters according to embodiments of the invention.

Turning to FIG. 21A, a controller 868 of the puck repeater 866 includes a memory 870 for storing instructions that, when executed by the controller 868, enable the controller 868 to carry out the functions attributable to the controller 868 described herein. The puck repeater 866 further includes a power module 872 for receiving power from one of a battery 874 or an external power source 876. The power module 872 conditions the received power and supplies the conditioned power to the other components of the puck repeater 866. The external source 876 is, for example, an external battery, power tool battery, or standard AC source via a wall outlet. The battery 874 may be a primary battery that is replaced upon depletion, or a secondary (rechargeable) battery. In the case of a rechargeable battery, the battery 874 may be charged in-unit by coupling the puck repeater 866 to an external charger, or the puck repeater 866 may include internal charger circuitry, e.g., in the power module 872. In some instances, the battery 874 is temporarily removed from the puck repeater 866 for charging.

To repeat communications over the ISM network 616, the controller 868 of the puck repeater 866 receives an ISM communication and then transmits the same ISM communication via the ISM band antenna 710 and ISM unit 715. The puck repeaters 866 can extend the range of the ISM network 616 and also provide a consistent, base-line coverage zone of the ISM network 616. In other words, since the puck repeaters 866 are generally immobile after placement, unlike the tools 605 and fobs 610, their coverage does not generally fluctuate. Additionally, since the puck repeaters 866 are generally immobile after placement, the complexity of the ISM network 616 may be simplified, particularly in the case of a mesh network. That is, having mobile nodes in a network can increase its complexity. For instance, a communication path between a transmitter node and receiver node over a network may change over time as the transmitter node and receiver node, as well as any nodes therebetween, vary. Accordingly, including static nodes, such as the puck repeaters 866, can simplify certain communications over the ISM network 616.

In some instances, the puck repeaters 866 further include the GPS antenna 720 and GPS unit 725 such that the controller 868 of the puck repeater 866 is operable to receive GPS data to determine the location of the puck repeater 866. In turn, the location information of the puck repeaters 866 is used to determine the position of other elements of the ISM network 616, such as the tools 605 and fobs 610. For instance, a distance of one of the tools 605 from a puck repeater 866 may be calculated based on a determined signal strength of communications between the tool 605 and puck repeater 866. Using the combination of the GPS location data of the puck repeater 866 and the relative distance of the tool 605 from the puck repeater 866, an approximate location of the tool 605 is determined. Moreover, in some instances, determining the signal strength between an ISM network device (e.g., one of the tools 605) and multiple puck repeaters 866 at known positions may be used to triangulate the location of a particular device on the ISM network 616.

A portion of the puck repeaters 866 in FIG. 20 may be considered perimeter puck repeaters 866. For instance, the puck repeaters 866 secured to the fence 864 form a perimeter around a worksite 860. A central monitoring system, such as a remote monitoring system 120 or 135, the gateway 615, the tool monitoring server 140, or the local computing device 618, is informed of the classification of certain puck repeaters 866 as forming a perimeter. For instance, during setup, the perimeter puck repeaters 866 may output a perimeter signal to the ISM network 616 in response to a user action (e.g., depressing a switch). Alternatively, the central monitoring system may determine that particular puck repeaters 866 form an outer boundary, e.g, based on GPS positioning data, and categorize such puck repeaters 866 as perimeter-type puck repeaters 866. The perimeter-type puck repeaters 866 form a virtual or geo-fence type boundary around the worksite 860 to detect tools 605, fobs 610, and gateways 615 that near or exit the worksite 860 and, in some instances, to cause a security action to be taken instantaneously or with a delay. In some embodiments, puck repeaters 866 are positioned near exits/entrances of the worksite 860, such as the puck repeaters 866*a* of FIG. 20 on both sides of the gate 865.

The perimeter puck repeaters 866 are able to detect when a tool 605, fob 610, or gateway 615 is near the perimeter of or has left the worksite 860. For instance, if the signal strength between a particular one of the tools 605 and one or more perimeter pucks 866 increases to a particular level or levels, the tool 605 is considered near the perimeter of the worksite 860. In some instances, similar to embodiments of the fob 610, the puck repeaters 866 include two antennas such that they can obtain directional information, in addition to distance information, for ISM devices on the network 616. In other words, the puck repeater 866 is operable to implement radio frequency direction finding (RFDF) to detect the direction from which RF signals are coming. Accordingly, the perimeter puck repeaters 866 are operable to determine when an ISM device is near or outside of the worksite 860. In response to detecting an ISM device near or outside of the fence 864, a warning may be given to a user of the tool 605, a security action may be taken, and/or a person or device monitoring the location of the tool 605 may be notified, similar to previous geo-fence techniques described above.

In some embodiments, one or more of the puck repeater 866, the gateway 615, the fob 610, and the tool 605 includes an accelerometer to detect motion. The motion detection capability is used to reduce power consumption by limiting activity of the one or more of the the puck repeater 866, the gateway 615, the fob 610, and the tool 605. For instance, in some embodiments, the puck repeater 866 selectively determines its GPS location based on an output of the accelerometer. When the puck repeater 866 is moving, as determined by the accelerometer, the puck repeater 866 may periodically determine its GPS location and output the determined location to another device on the ISM network 616. Once the puck repeater 866 ceases to move, the puck repeater 866 may determine and output its GPS location, then cease GPS activity until further motion of the puck repeater 866 is detected. In some embodiments, rather than ceasing to determine and output its GPS location, the puck repeater 866 introduces longer delays between GPS location determinations. In both instances, the puck repeater 866 reduces power consumption with fewer GPS location determinations. Additionally, as no motion is being detected by the accelerometer, one can infer that the puck repeater 866 has not moved, and the most recent GPS location determined remains accurate. In some embodiments, similar strategies for conserving power by reducing location determinations of the tool 605, fob 610, and gateway 615, whether by GPS or other techniques, based on an accelerometer output are implemented.

Figure 21B:
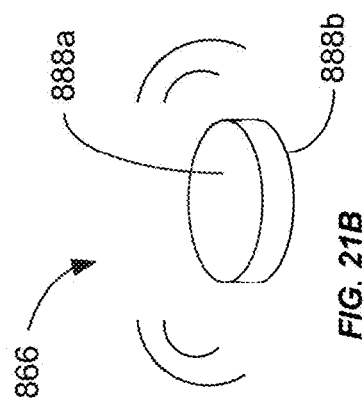

FIG. 21B illustrates the puck repeater 866 having a generally cylindrical shape. The puck repeater 866 has a front side 888*a* and a back side 888*b*. The puck repeater 866 is securable via the back side 888*b* to a surface, such as a wall, desk/table top, ceiling within a worksite (see, e.g., the building 862 of FIG. 20). For instance, the back side 888*b* includes a suction cup, an adhesive, and/or one or more openings or recesses to receive a screw head such that the puck repeater 866 hangs from a screw previously driven into a surface. Although the puck repeater 866 is illustrated as having a cylindrical shape, the puck repeater 866 is constructed with a different shape, such as a cuboid or an irregular shape, in other embodiments. In some instances, the puck repeaters 866 have increased range when positioned higher up off of the ground, such as on a wall, ceiling.

In some embodiments, the puck repeaters 866 have a transmit power over the ISM network 616 of approximately +27 dbm, similar to the gateway 615. In other embodiments, a lower transmit power is used, such as to +5 dbm, +10 dbm, +15 dbm, −20 dbm, +25 dbm, or another transmit power. Generally, however, the puck repeaters 866 have an average transmit power that is greater than the transmit power of the power tools 605 and fobs 610.

Figure 22:
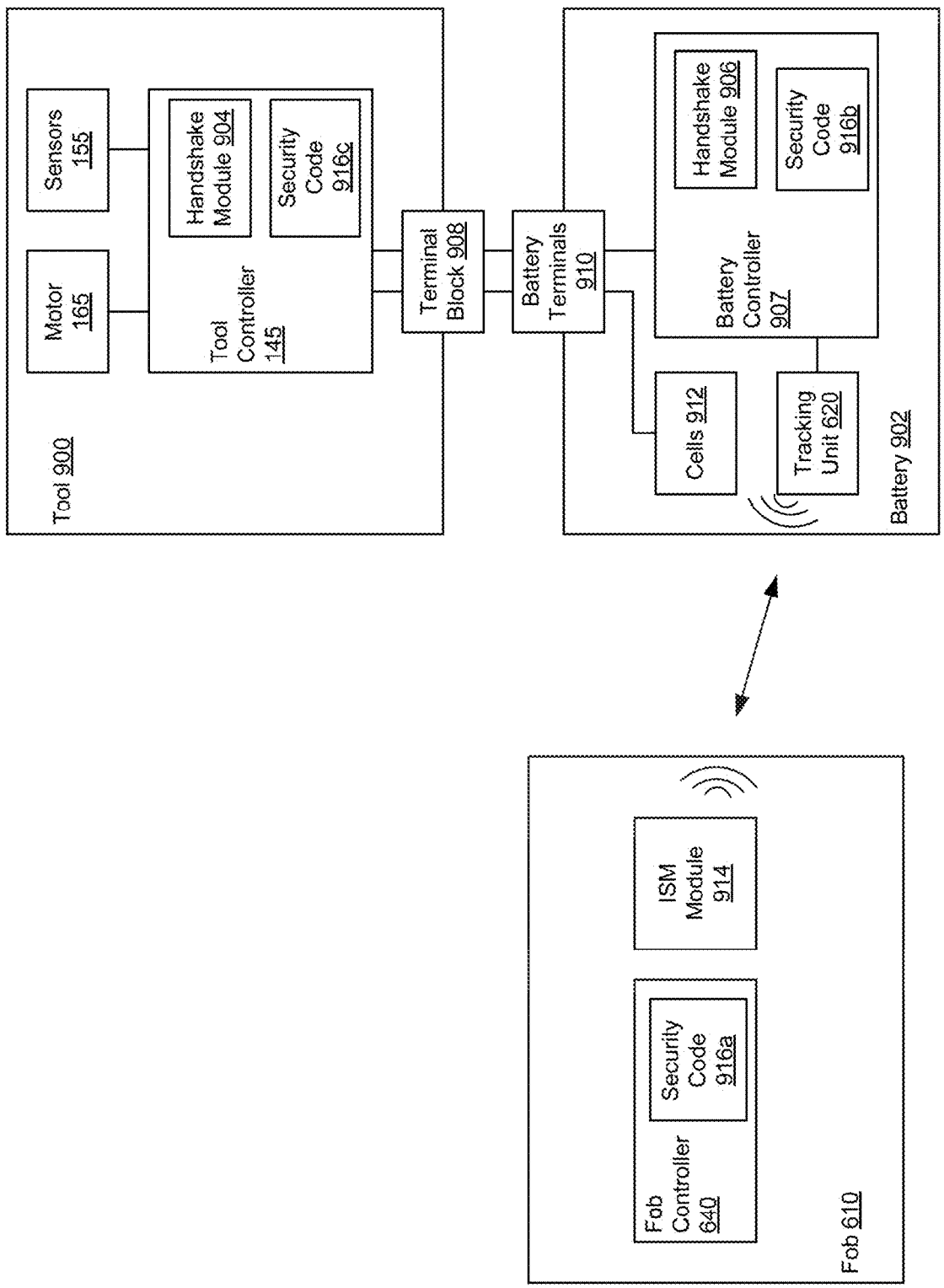
FIG. 22 illustrates an ISM battery in communication with a power tool and an ISM-enabled fob.

FIG. 22 illustrates a tool 900 coupled to an ISM battery 902. The tool 900 is able to communicate over the ISM network 616 via a connection to the ISM battery 902. In contrast to the tool 605, the tracking and wireless communication capabilities have been moved from the tool to the ISM battery 902.

The tool 900 is a battery-operated power drill that, similar to the tool 105 and 605, includes the tool controller 145, sensors 155, and a motor 165. Although the tool 900 is described as a power drill, the tool 900 is another type of tool or accessory in other embodiments, such as those described above with respect to systems 100 and 600. The tool further includes a handshake module 904 for communicating with a handshake module 906 of the battery controller 907, as is described in greater detail below. The tool 900 also includes a terminal block 908 for physically and electrically coupling to battery terminals 910 of the battery 902. The connection between the terminal block 908 and battery terminals 910 enables the battery 902 to provide power to the tool 900, and for the battery 902 and the tool 900 to communicate with each other.

The battery 902 includes rechargeable battery cells 912, such as lithium ion or NiCad cells, for providing power to the tool 900 and components of the battery 902. The battery 902 includes the tracking unit 620 and, accordingly, is an ISM-enabled device that is able to communicate with the fob 610 and other ISM devices on the ISM network 616. To simplify the description, not all components of the fob 610 are illustrated in FIG. 22 and the ISM unit 650 and ISM antennas 652 are shown as a single ISM module 614.

The tool 900, battery 902, and fob 610 each store a security code 916, individually referred to as 916*a*, 916*b*, and 916*c*, respectively. For the tool 900 to continue to properly operate, (a) the battery 902 periodically receives the security code 916*a* from the fob 610, which matches the security code 916*b*, and (b) in turn, the battery 902 periodically provides the tool 900 with the security code 916*b*, which matches with the security code 916*c*. The security code 916 may be a string of one or more of letters, numbers, symbols, etc. and may be encrypted for communications.

Figures 23, 24:
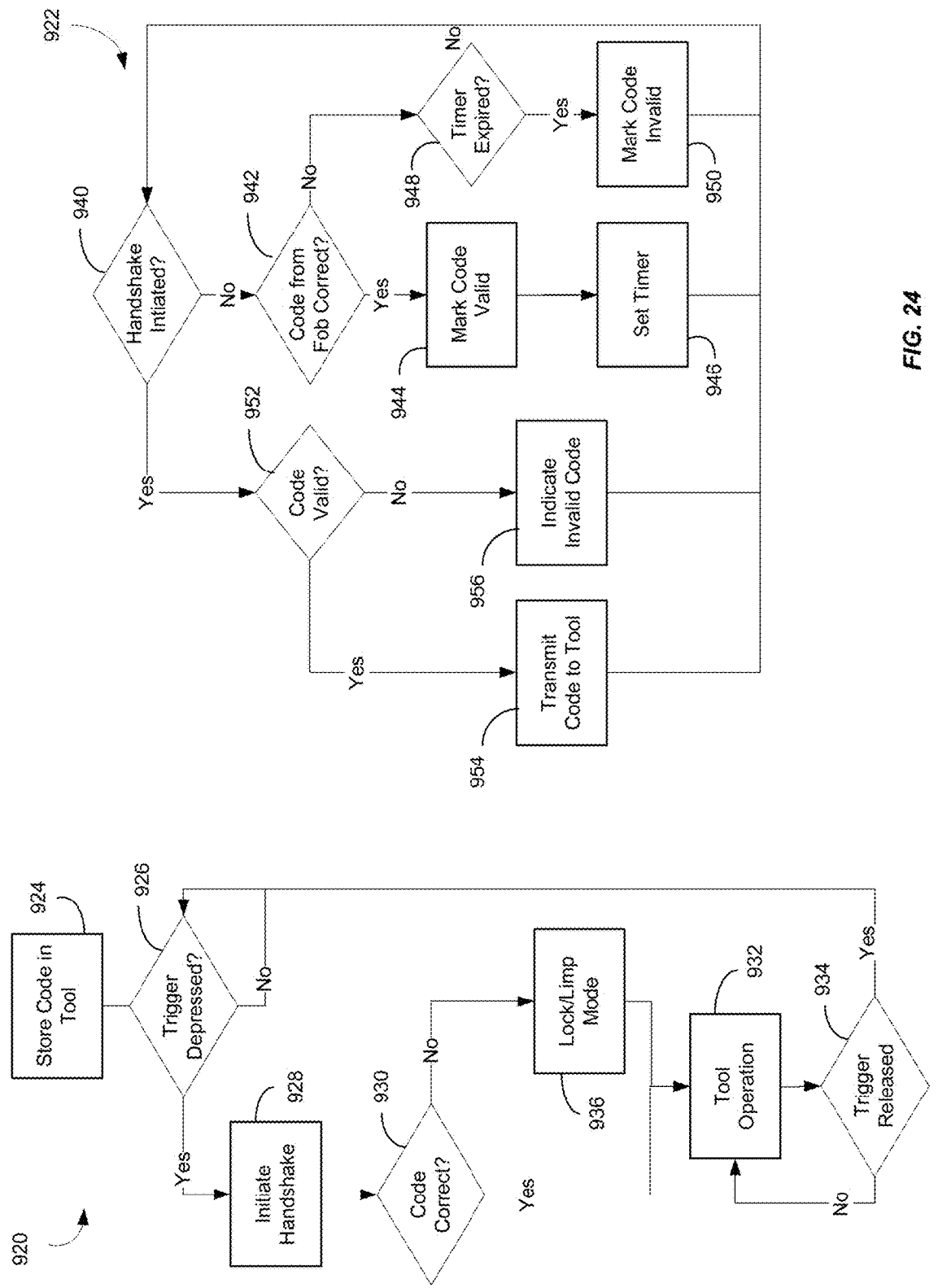
FIGS. 23-24 illustrate tethering methods for use with a power tool and power tool battery.

FIG. 23 illustrates a tether method 920 from a perspective of the tool 900 and FIG. 24 illustrates a tether method 922 from a perspective of the battery 902. Tether method 920 begins with step 924, in which the security code 916*c* is stored in the tool 900. Step 924 may occur, for example, at a point of manufacture, and the security code 916*c* may be stored in a read-only memory such that the security code 916*c* may not be overwritten or changed. In step 926, the tool controller 145 determines whether a trigger of the tool 900 has been depressed, or whether the tool 900 has otherwise been activated. If the trigger is depressed, the tool controller 145 proceeds to step 928 and initiates a handshake with the battery 902. In the handshake, the tool 900 communicates with the battery 902 to determine battery information, such as the type of battery, the charge status of the battery, whether the battery is malfunctioning, whether a battery error has occurred, etc. The handshake communications may be encrypted or otherwise secure.

During or after the handshake, in step 930, the tool 900 determines (a) whether a security code has been provided to the tool 900 by the battery 902 and (b) if so, whether the security code provided was the security code 916*b*, i.e., whether the security code provided matches the security code 916*c* stored in the tool 900. If security code 916*b* has been provided, the tool 900 proceeds to normal operation in step 932 until the trigger is released. The released trigger is detected in step 934, and the tool controller 145 returns to step 926. If, in step 930, the tool 900 determines that no security code or the incorrect security code was provided by the battery 902, the tool controller 145 places the tool 900 into a lock-out or limp mode. As previously described, in a lock-out mode, the tool 900 is prevented from operating. For instance, the tool controller 145 does not provide motor drive control signals, or the battery 902 is kept disconnected from the motor 165. In the limp mode, the tool 900 is able to operable, but the tool 900 has reduced performance capabilities. In addition, in step 936, the tool 900 and/or battery 902 may emit an audible (e.g., alarm or message), visual, or tactile signal to a user of the tool 900 that the handshake failed because of the mis-matched security codes 916*b* and 916*c*. The tool 900 remains in the lock-out or limp mode until the trigger is released, as detected in step 934. Thereafter, the tool controller 145 returns to step 926.

FIG. 24 illustrates the tether method 922 from a perspective of the battery 902. In step 940, the battery 902 determines whether a handshake has been initiated by the tool 900. If a handshake has not been initiated, the battery controller 907 proceeds to step 942 to determine whether (a) a communication from the fob 610 is being received that includes a security code and (b) if so, whether the received security code is the security code 916*a*, i.e., whether the received security code matches the security code 916*b* stored in the battery 900. If the fob 610 communication included the security code 916*a*, the battery 902 marks the security code 916*b* as valid in step 944. Additionally, the battery 902 sets a timer in step 946. The timer will indicate how often the security code is to be provided to the tool 900 before a lock-out or limp mode is activated. The time period of the timer is variable depending on a particular implementation. For example, in some instances, the timer is set to a short duration, such as one or five minutes, while in other instances, a longer timer is set, such as 12 or 24 hours. Other time periods for the timer may also be selected. The timer begins counting down (or up) after being set in step 946, and the battery controller 907 returns to step 940.

If, in step 942, the battery controller 907 determines that the fob 610 has not communicated a security code or that the security code provided is not the security code 916*a*, the battery controller 907 proceeds to step 948. In step 948, the battery controller 907 determines whether the timer has expired. If the timer has expired, the battery 902 marks its security code 916*b* as invalid in step 950. Also, in step 950, an audible, visual, or tactile warning may be provided to the user by the battery 902 or by the tool 900 in response to the battery 902. For example, a light on the battery 902 or tool 900 may be illuminated after the security code is marked invalid in step 950 to inform the user that he or she should bring the tool within an acceptable range of the fob 610 or ISM network 616 to receive the security code 916 before the timer expires. In some instances, the timer may be reset at the time that the security code 916 is marked invalid to ensure a minimum time period before a lock-out or limp mode is enacted. If the timer is not expired in step 948, the battery controller 907 returns to step 940.

If a handshake has been initiated, as determined in step 940, the battery controller 907 determines whether the security code 916*b* is valid in step 952. The security code 916*b* will be invalid if the timer is expired, which implies that a particular period of time has passed since the previous instance of the fob 610 providing a matching security code (i.e., security code 916*a*). If the code is determined to be valid in step 952, the security code 916*b* is transmitted to the tool 900 in step 954. In turn, the tool 900 will operate in a normal mode, as described with respect to method 920 of FIG. 23. If the code is determined to be invalid in step 952, the security code 916*b* is not output to the tool 900. Additionally, the battery controller 907 may output an invalid code message to the tool 900, such as in step 956. Thereafter, as described with respect to method 920 of FIG. 23, the tool 900 will be placed in a lock-out or limp mode. Thereafter, the battery controller 907 returns to the step 940 to await a further handshake request or fob 610 communication.

In some embodiments, the battery 902 does not determine whether it has a valid security code in step 942. Rather, the battery 902 stores a security code that it receives in step 942, overwriting any previously stored security code. After a handshake is initiated in step 940, the battery 902 bypasses step 952 to provide the currently stored security code to the tool 900. Thus, the tool 900, not the battery 902, determines whether the received security code is valid. Additionally, the timer is reset each time a security code is received and, if the timer expires, the security code is erased in step 950 and not provided to the tool 900 during a handshake.

The fob 610 may be configured to communicate the security code 916*a* to the battery 902 periodically to ensure that the timer does not elapse, except when the fob 610 is out of communication range of the battery 902. Thus, in effect, the fob 610 acts as a wireless tether that, if not within communication range of the battery 902, prevents the tool 900 from normal operation. In some embodiments, the fob 610 must be able to directly communicate the security code 916*a* to the battery 902 to enable normal operation of the tool 900. That is, the security code may not pass through other ISM devices on the ISM network 616 to reach the battery 902, or else the security code will not be considered "correct" in step 942. However, in some embodiments, the security code 916*a* may be transmitted from the fob 610 over various ISM devices on the ISM network 916 and the security code will be considered correct in step 942. In some embodiments, rather than particular fob 610, the battery 902 may receive the security code 916a from another ISM device on the ISM network 616, such as another tool 605, gateway 615, or puck repeater 866. That is, various ISM devices may store the security code 916a and, if the battery 902 is within range of at least one of these ISM devices, the battery 902 will have a valid security code 916b for providing to the tool 900 to permit normal operation thereof. In some embodiments, the battery 902 periodically outputs an ISM request for the security code 916 in step 942 and proceeds to step 944 or 948 depending on whether a response with the security code 916 is provided.

In some instances, rather than a single security code 916 used by the fob 610 (or other ISM device), the tool 900, and the battery 902, the fob 610 (or other ISM device) and battery 902 use a first security code (e.g., the security code 916), while the battery 902 and the tool 900 use a second security code different from the first security code.

In some embodiments, the battery 902 and method 922 are operable with a tool 900 that does not store the security code (i.e., a "predecessor tool" 900). For example, the predecessor tool 900 may be a previous model or a new model tool that is compatible with a battery similar to the battery 902, but not having the security code functionality. The predecessor tool 900 and the battery carry out a handshake operation each time the predecessor tool 900 is operated to obtain battery information, but not a security code that has a time-based expiration as described in methods 920 and 922. In certain instances, the battery will communicate an error message to the predecessor tool 900 indicating that the battery is not able to provide power to the predecessor tool 900. For example, if the state of charge of the battery is too low, if the battery is overheated, or if the battery is otherwise malfunctioning, the battery may communicate to the predecessor tool 900 that the battery is inoperable or has reduced capabilities. In response, the predecessor tool 900 will not operate or will limit its performance, for instance, by reducing the output power.

The battery 902 is operable to take advantage of the handshaking ability of the predecessor tool 900 to implement the secure tethering method 922. For instance, the battery 902 may continue to execute the method 922; however, in step 956, after determining that the battery 902 does not have a valid security code, the battery controller 907 simulates an error message to the predecessor tool 900. Thus, the predecessor tool 900 is deceived and ceases to operate or operates with reduced performance, depending on the type of error message sent and the rules for handling such an error message on the predecessor tool 900.

Figure 26:
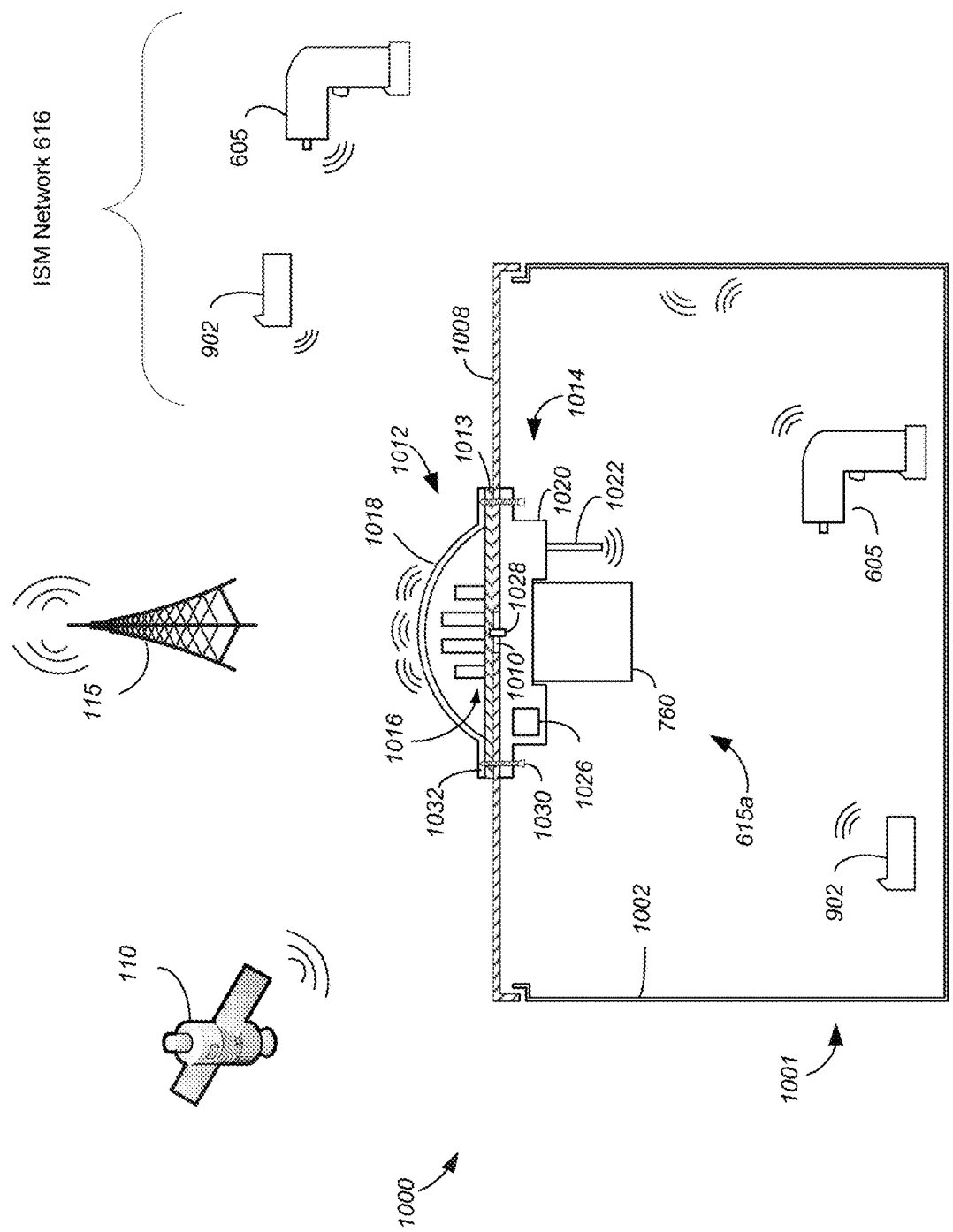
FIG. 26 illustrates a cross-section A-A of the job box gateway of FIG. 25C.

FIGS. 25A-C illustrate a job box gateway 1000 including a job box 1001 and a two-piece gateway 615a. FIG. 26 illustrates a cross-section A-A of the job box gateway 1000 shown in FIG. 25C. The job box 1001 is a container with walls 1002, handles 1004, a base 1006, and a hinged lid 1008. The job box 1001 is operable to hold various tools and materials for a user on a worksite. The job box 1001 further includes a locking mechanism (not shown) for selectively locking the lid 1008 shut to prevent unauthorized access to the equipment within the job box 1001. As shown in FIG. 25A, the lid 1008 further includes a cut-out or aperture 1010. The aperture 1010 enables the two-piece gateway 615a, as shown in FIGS. 25B and 26, which includes an external portion 1012 and a internal portion 1014.

The external portion 1012 includes a mounting board 1013 and antennas 1016 mounted thereon. As shown in greater detail in FIG. 28, the antennas 1016 include the GPS antenna 720, the cellular antenna 730, a second cellular antenna 1017, and the ISM antenna 710 (see FIG. 14). The GPS antenna 720 receives GPS signals from the GPS satellite 110. The cellular antenna 730 and second cellular antenna 117 communicate with one or more cellular networks (e.g., network 115). The second cellular antenna 117 is optional and may be used as a redundant antenna to assist in communications with the cellular network 115. In some instances, the second cellular antenna 117 may be tuned slightly different than the cellular antenna 730. The ISM antenna 710 communicates with the ISM network 616, which may include, for example, one or more gateways 615, batteries 902, tools 605, fobs 610, and/or pucks 886.

The external portion 1012 is covered by a dome 1018. The dome 1018 is constructed of a rugged material, such as polyurethane, with a low dielectric constant to improve transmission capabilities for the antennas 1016. The dome 1018 protects the antennas 1016 from damage due to impacts, droppage, etc., which are common to a worksite. Protective coverings of shapes other than a dome are used in place of the dome 1018 in some embodiments. Additionally, in some embodiments, another dome or protective covering (not shown) is included within the job box 1001 to protect the internal portion 1014.

The internal portion 1014 includes a base 1020 with an internal antenna 1022, power tool battery 760, and accelerometer 1026. The power tool battery 760 is selectively engageable with the base 1020 and provides power to the components of the gateway 615a. The internal antenna 1022 is an ISM antenna for communicating with wirelessly-enabled equipment inside the job box 1001, such as tools 605, battery packs 902, and fobs 610. The internal portion 1014 is coupled to the external portion via a connector 1028. The connector 1028 includes data paths and/or power connections between the antennas 1016 and the other components of the gateway 615a, such as the translation controller 700 and power converter/charger 740.

As shown in FIG. 26, fasteners 1030 extend through the base 1020, through the lid 1008, through the mounting board 1013, and terminate in flanges 1032 of the dome 1018. Thus, the fasteners 1030 secure the internal portion 1014, the external portion 1012, and the dome 1018 to the lid 1008 of the job box 1001. By mounting the majority of the components of the gateway 615a inside the job box 1001 and including fasteners 1030 accessible only from the inside of the job box 1001, the gateway 615a benefits from the transmission range of an externally mounted antenna, while still being secured against theft. In other words, because the lid 1008 is generally locked shut, a potential thief is not able to access the power tool battery 760, materials within the job box 1001, or remove the gateway 615a, without first having the ability to unlock the job box 1001.

In general, a standard job box may act as a Faraday cage that inhibits or degrades communications between wireless devices within the standard job box, such as the tool 605, and devices outside of the standard job box, such as an external gateway 615 or a component of the ISM network 616. In contrast, the job box 1001 with gateway 615a includes an internal antenna 1022 able to communicate with wireless devices within the job box 1001, and external antennas 1016 for relaying communications to/from wireless devices outside of the job box 1001 (e.g., the cellular network 115 or ISM network 616).

The internal antenna 1022 is a diversity antenna, which provides improved communications within the job box 1001. For example, wireless communications within the job box 1001 using a non-diversity antenna may be generally difficult due to internal reflections and other transmission/reception issues. The diversity antenna counteracts these issues and improves communications. In some embodiments, the diversity antenna (internal antenna 1022) is circularly polarized, which provides a phase diversity antenna. In some embodiments, the internal antenna 1022 has a transmit power of approximately +10 dbm or less, such as +5 dbm, given the generally close proximity of communications. However, in other embodiments, the internal antenna 1022 has a transmit power greater than +10 dbm, such as +15 dbm, +20 dbm, +25 dbm, or +27 dbm.

The accelerometer 1026 is used to detect movement of the lid 1008 and/or the job box 1001. By monitoring an output of the accelerometer 1026, the translation controller 700 of the gateway 615*a* is able to determine whether the lid 1008 is open or shut, and whether the job box 1001 is stationary or moving. The gateway 615*a* is operable to transmit this information to external devices, such as the tool monitoring server 140, smart phone 120, PC 135, and fob 610. Additionally, the gateway 615*a* is operable to enter into a low-power mode upon detecting that the lid 1008 and the job box 1001 are stationary. For example, if the lid 1008 remains shut and the job box 1001 remains stationary, the gateway 615*a* enters a low-power mode in which the frequency of transmissions by the gateway 615*a* is reduced. Since the lid 1008 is closed and the job box 1001 is stationary, the statuses of items within the job box 1001 and the job box 1001 itself remain relatively constant, and fewer transmissions are used.

As an example, in a normal mode, the gateway 615 may transmit messages between every 400 ms to 2000 ms, while in a low-power mode, the gateway 615 transmits message every few minutes, 10 minutes, 30 minutes, etc. In some instances, the frequency of transmissions by the gateway 615*a* via the internal antenna 1022 is reduced when the lid 1008 remains closed, but the transmissions by the other antennas 1016 occur at a normal rate. However, if the job box 1001 as a whole is also determined to be stationary for a predetermined time, the gateway 615*a* also enters a lower power mode with respect to communications via the antennas 1016.

In some embodiments, the job box 1001 and/or gateway 615*a* further include the power converter/charger 740, battery charger 770 and AC power cord terminals 745, similar to the gateway 615 shown in FIG. 14. Accordingly, the gateway 615*a* is operable to be powered by an AC power supply (e.g., from a standard AC wall outlet) and the battery charger 770 is operable to charge the power tool battery 760 via power form the AC power supply.

Figure 27:
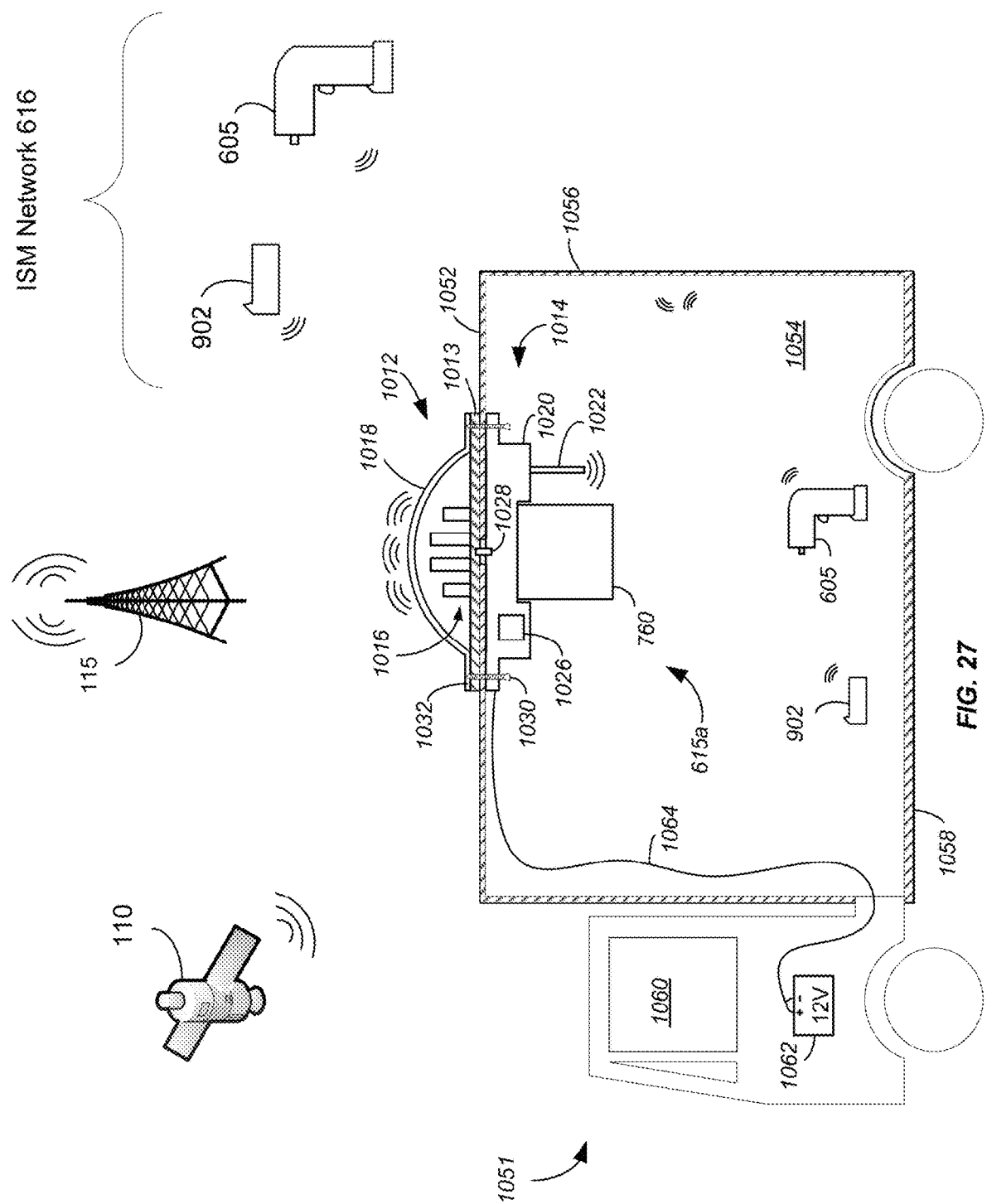
FIG. 27 illustrates a vehicle gateway according to embodiments of the invention.

FIG. 27 illustrates vehicle gateway 1050 having the gateway 615*a* integrated with a vehicle 1051. Similar to the job box gateway 1000, the gateway 615*a* of the vehicle gateway 1050 includes the external portion 1012 and the internal portion 1014 on either side of a top surface 1052, like the arrangement on the lid 1008. The top surface 1052 is part of an enclosed container 1054 of the vehicle 1051, which further includes sidewalls 1056 and a bottom surface 1058. The vehicle 1051 also includes a cab portion 1060 in which a driver is operable to drive the vehicle 1051. The cab portion 1060 further includes a vehicle battery 1062, such as a 12-V DC battery. The cab portion 1060 also includes an engine (not shown) that uses fuel (e.g., gasoline, biofuel, etc.) to generate rotational mechanical energy. The mechanical energy is converted by an alternator to generate electrical energy that is used to charge the vehicle battery 1062.

The vehicle battery 1062 is coupled to the gateway 615*a* via a power line 1064. The vehicle battery 1062 acts as a power source for the gateway 615*a*, similar to the AC power source 750 provides power to the gateway 615 as described above with respect to FIG. 14. In other words, the vehicle battery 1062 is operable to power the gateway 615*a* and to provide power usable by the gateway 615*a* to charge the battery 760. The gateway 615*a* may select which power source to use, the power tool battery 760 or the vehicle battery 1062, based on one or both of their respective charge levels. For example, in some instances, the gateway 615*a* uses the power tool battery 760, when present, until the charge level drops to a certain low threshold. Thereafter, the gateway 615*a* uses the vehicle battery 1062, and optionally charges the power tool battery 760. In some instances, the gateway 615*a* uses power from the vehicle battery 1062 until its charge level drops to a certain low threshold. Thereafter, the gateway 615*a* uses the power tool battery 760, at least until the vehicle battery 1062 is charged by the vehicle 1051 to be above a certain high threshold. In other embodiments, different powering and charging schemes using the two power sources are implemented.

In some embodiments, the vehicle 1051 is a hybrid vehicle, electric vehicle, or another alternative fuel-type vehicle. In these instances, different battery types, fuel sources (natural gas), power generators (fuel cells, photovoltaic array, etc.) are used in the vehicle 1051. Regardless of vehicle type, however, the vehicle 1051 is operable to output electrical energy, whether DC or AC power, to the gateway 615*a* for general power purposes and for charging the power tool battery 760.

In both the job box gateway 1000 and the vehicle gateway 1050, the gateway 615*a* is positioned on an upper position (lid 1008 and top surface 1052). Generally, the higher the gateway 615*a* is positioned, the better the wireless transmission/reception available. However, in some embodiments, the gateway 615*a* is positioned on a side wall, a top half or third of a side wall, a bottom half or third of a side wall, or a bottom surface of the job box gateway 1000 and the vehicle gateway 1050. For example, in a vehicle 1051 lacking a top surface (e.g., an open bed truck), the gateway 615*a* is positionable near the top of the side wall 1056 of the truck.

The accelerometer 1026 is used in the vehicle gateway 1050 similar to how it is used in the job box gateway 1000 to detect movement of the vehicle gateway 1050. However, the top surface 1052 of the vehicle 1051 does not open; rather, the back door (not shown) opens to provide access to tools 605, materials, etc. within the vehicle 1051. Accordingly, in some embodiments, the accelerometer 1026 is located separate from the gateway 615*a* on an access door of the vehicle 1051. The accelerometer would remain in communication with the gateway 615*a*, whether wirelessly or via wired connection, to provide acceleration signals related to both the vehicle 1051 as a whole and the opening/shutting of the access door. The accelerometer 1026 on the vehicle gateway 1050 is, thus, similarly able to be used cause the gateway 615*a* to enter into a low-power mode.

In some embodiments, rather than accelerometer 1026, another sensor may be included to detect whether the lid 1008 or back door of the vehicle 1051 is open and shut, such as an optical sensor or pressure sensor. However, the accelerometer 1026 may still be included on the gateway 615*a* to detect general movement of the job box 1001 and vehicle 1051.

Figure 28:
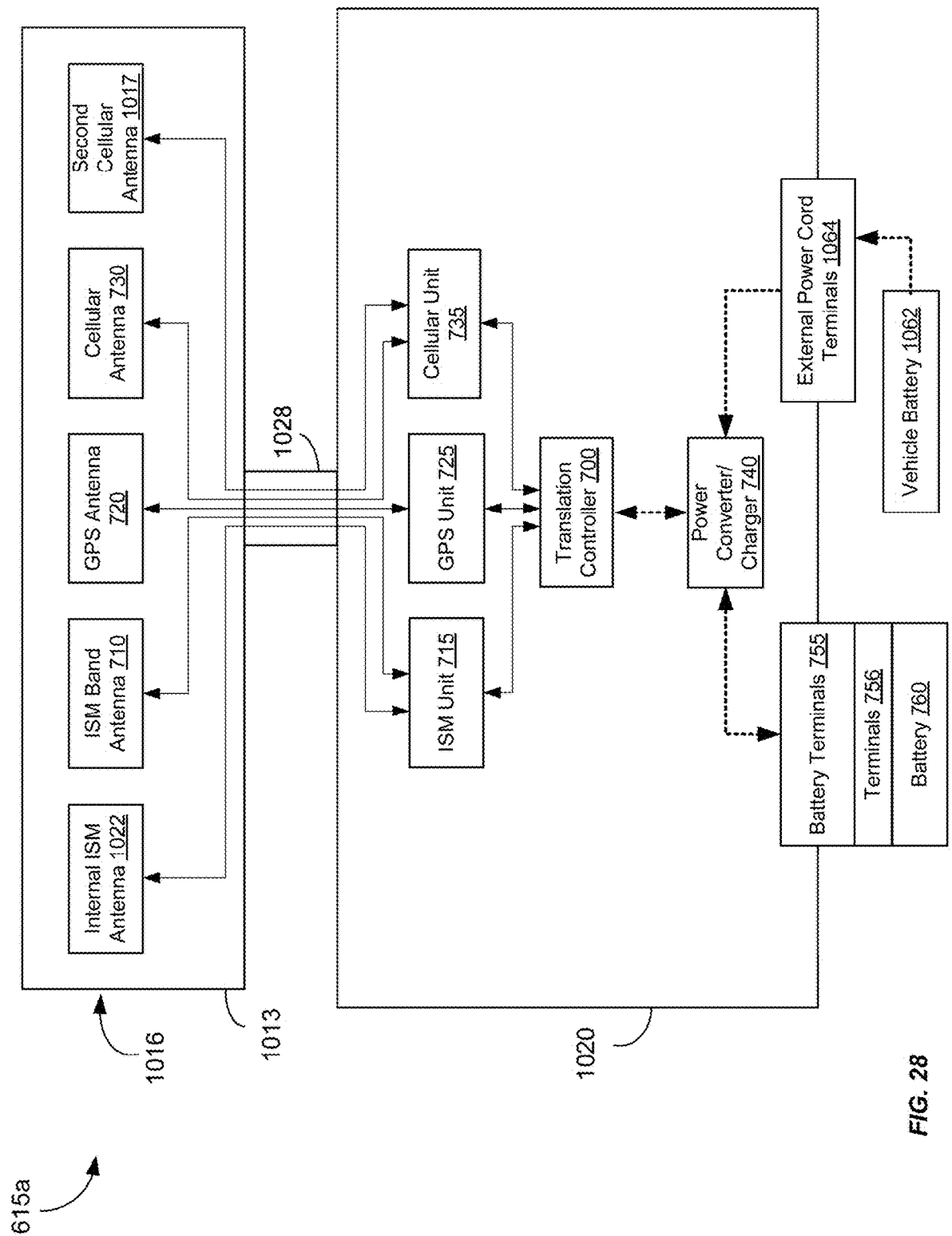
FIG. 28 illustrates a two-piece gateway according to embodiments of the invention.

FIG. 28 illustrates a block diagram of the gateway 615*a* having the two-piece construction. As shown, the base 1020 is coupled to the mounting board by the connector 1028. The gateway 615*a* includes external power cord terminals 1064 for optionally coupling to an external power source, such as the vehicle battery 1062. The gateway 615a, like the gateway 615, translates messages between the ISM network 616 and the cellular network 617. In some instances, the ISM antennas 1022 and 710 operate on the same ISM network 616 and, for instance, messages transmitted by the ISM band antenna 710 are also transmitted by the internal ISM antenna 1022. In other instances, the gateway 615a operates on and administers two ISM networks 616, one via the internal antenna 1022, and one via the (external) ISM band antenna 710. In these instances, the gateway 615a may act as an intermediary between the two ISM networks 616, or the two ISM networks 616 may remain independent. In some instances, the ISM unit 715, GPS unit 725, and cellular unit 735 are also located on the mounting board 1013. Except for the distinctions set forth above and those apparent to one of ordinary skill in the art, the gateway 615a and the components thereof operate generally similarly to the gateway 615 and its components. Thus, duplicative description was not included.

The controllers described herein, including controllers 145, 220, 640, 700, 868, and 907 may be implemented as a general purpose processor, digital signal processor, application specific integrated circuit (ASIC), or field programmable gate array (FPGA), or a combination thereof, to carry out their respective functions.

Thus, the invention provides, among other things, systems and methods for remotely tracking power tools and related devices. Various features and advantages of the invention are set forth in the following claims.

What is claimed is:

1. An electronic monitoring device for power tool geo-fence tracking, the electronic monitoring device comprising:
   a display including a graphical user interface;
   an electronic processor coupled to the display; and
   a wireless communication device coupled to the electronic processor and configured to communicate with power tool devices;
   wherein the electronic processor is configured to
      receive, via the graphical user interface, a selection of a geo-fence feature,
      display a map on the graphical user interface in response to receiving the selection of the geo-fence feature,
      receive, via the graphical user interface, a first user input defining a geo-fence boundary,
      in response to one or more second user inputs on the graphical user interface, assign a plurality of power tool devices to the geo-fence boundary, and
      display a screen associated with the geo-fence boundary on the graphical user interface, wherein the screen includes
         an indication of how many power tool devices of the plurality of power tool devices are located outside the geo-fence boundary, and
         a selectable locate feature, wherein in response to receiving a selection of the selectable locate feature via the graphical user interface, the electronic processor is configured to request position data of the plurality of power tool devices via the wireless communication device and provide an updated indication of how many power tool devices of the plurality of power tool devices are located outside the geo-fence boundary.

2. The electronic monitoring device of claim 1, wherein the screen includes a selectable map feature, wherein in response to receiving a selection of the selectable map feature via the graphical user interface, the electronic processor is configured to display a second screen including the map on the graphical user interface, the map including the geo-fence boundary and locations of the plurality of power tool devices.

3. The electronic monitoring device of claim 1, wherein the electronic processor is configured to request the position data of the plurality of power tool devices via the wireless communication device by requesting respective position data from each power tool device of the plurality of power tool devices.

4. The electronic monitoring device of claim 1, wherein the electronic processor is configured to determine whether each of the plurality of power tool devices is located outside the geo-fence boundary.

5. The electronic monitoring device of claim 1, wherein the electronic processor is configured to:
   determine that a first power tool device of the plurality of power tool devices is located outside the geo-fence boundary; and
   in response to determining that the first power tool device is located outside the geo-fence boundary, at least one selected from the group of (i) transmit a lock command to the first power tool device via the wireless communication device, the lock command instructing the first power tool device to prevent operation of the first power tool device, (ii) provide a first alert on the display indicating that the first power tool device is located outside the geo-fence boundary, and (iii) transmit a second alert to a second electronic monitoring device indicating that the first power tool device is located outside the geo-fence boundary.

6. An electronic monitoring device for power tool geo-fence tracking, the electronic monitoring device comprising:
   a display including a graphical user interface;
   an electronic processor coupled to the display; and
   a wireless communication device coupled to the electronic processor and configured to communicate with power tool devices;
   wherein the electronic processor is configured to
      receive, via the graphical user interface, a selection of a geo-fence feature,
      display a map on the graphical user interface in response to receiving the selection of the geo-fence feature,
      receive, via the graphical user interface, a first user input defining a geo-fence boundary,
      receive, via the graphical user interface, a selection of a power tool device to be associated with the geo-fence boundary,
      in response to receiving the selection of the power tool device, assign the power tool device to the geo-fence boundary, and
      display information on the graphical user interface that indicates whether the power tool device is located outside the geo-fence boundary.

7. The electronic monitoring device of claim 6, wherein the first user input is at least one of:
   a dragging of a pointer on the map using a graphical user interface drawing instrument; and
   a placement and re-sizing of a geometrical shape on the map.

8. The electronic monitoring device of claim 6, wherein the electronic processor is configured to determine whether the power tool device is located outside the geo-fence boundary.

9. The electronic monitoring device of claim 8, wherein the electronic processor is configured to:
  determine that the power tool device is located outside the geo-fence boundary; and
  in response to determining that the power tool device is located outside the geo-fence boundary, at least one selected from the group of (i) transmit a lock command to the power tool device via the wireless communication device, the lock command instructing the power tool device to prevent operation of the power tool device, (ii) provide a first alert on the display indicating that the power tool device is located outside the geofence boundary, and (iii) transmit a second alert to a second electronic monitoring device indicating that the power tool device is located outside the geo-fence boundary.

10. The electronic monitoring device of claim 6, wherein the electronic processor is configured to:
  receive a selection of a lock feature via the graphical user interface; and
  transmit a lock command, via the wireless communication device, to the power tool device in response to receiving the selection of the lock feature, wherein the lock command instructs the power tool device to prevent operation of the power tool device.

11. The electronic monitoring device of claim 6, wherein the electronic processor is configured to:
  receive a selection of an unlock feature via the graphical user interface; and
  transmit an unlock command, via the wireless communication device, to the power tool device in response to receiving the selection of the unlock feature, wherein the unlock command instructs the power tool device to enable operation of the power tool device.

12. The electronic monitoring device of claim 6, wherein the electronic processor is configured to:
  receive a selection of a chirp feature via the graphical user interface; and
  transmit a chirp message, via the wireless communication device, to the power tool device in response to receiving the selection of the chirp feature, wherein the chirp message instructs the power tool device to output an audible sound to assist with locating the power tool device.

13. The electronic monitoring device of claim 6, wherein the electronic processor is configured to:
  receive a selection to obtain tool data via the graphical user interface;
  transmit a polling message, via the wireless communication device, to the power tool device in response to receiving the selection to obtain tool data; and
  receive tool usage data from the power tool device via the wireless communication device in response to the power tool device receiving the polling message.

14. A method for power tool geo-fence tracking, the method comprising:
  receiving, via a graphical user interface of a display of an electronic monitoring device, a selection of a geo-fence feature;
  displaying a map on the graphical user interface in response to receiving the selection of the geo-fence feature;
  receiving, via the graphical user interface, a first user input defining a geo-fence boundary;
  receiving, via the graphical user interface, a selection of a power tool device to be associated with the geo-fence boundary;
  in response to receiving the selection of the power tool device, assigning, with an electronic processor of the electronic monitoring device, the power tool device to the geo-fence boundary; and
  displaying information on the graphical user interface that indicates whether the power tool device is located outside the geo-fence boundary.

15. The method of claim 14, wherein receiving the first user input includes at least one of:
  receiving a dragging of a pointer on the map using a graphical user interface drawing instrument; and
  receiving a placement and re-sizing of a geometrical shape on the map.

16. The method of claim 14, further comprising:
  receiving, with a wireless communication device of the electronic monitoring device that is coupled to the electronic processor, location information of the power tool device;
  determining, with the electronic processor, whether the power tool device is located outside the geo-fence boundary; and
  in response to determining that the power tool device is located outside the geo-fence boundary, at least one selected from the group of (i) transmitting a lock command to the power tool device via the wireless communication device, the lock command instructing the power tool device to prevent operation of the power tool device, (ii) providing a first alert on the display indicating that the power tool device is located outside the geo-fence boundary, and (iii) transmitting a second alert to a second electronic monitoring device indicating that the power tool device is located outside the geo-fence boundary.

17. The method of claim 14, further comprising:
  receiving a selection of a lock feature via the graphical user interface; and
  transmitting a lock command, via a wireless communication device of the electronic monitoring device that is coupled to the electronic processor, to the power tool device in response to receiving the selection of the lock feature, wherein the lock command instructs the power tool device to prevent operation of the power tool device.

18. The method of claim 14, further comprising:
  receiving a selection of an unlock feature via the graphical user interface; and
  transmitting an unlock command, via a wireless communication device of the electronic monitoring device that is coupled to the electronic processor, to the power tool device in response to receiving the selection of the unlock feature, wherein the unlock command instructs the power tool device to enable operation of the power tool device.

19. The method of claim 14, further comprising:
  receiving a selection of a chirp feature via the graphical user interface; and
  transmitting a chirp message, via a wireless communication device of the electronic monitoring device that is coupled to the electronic processor, to the power tool device in response to receiving the selection of the chirp feature, wherein the chirp message instructs the power tool device to output an audible sound to assist with locating the power tool device.

20. The method of claim 14, further comprising:
  receiving a selection to obtain tool data via the graphical user interface;

transmitting a polling message, via a wireless communication device of the electronic monitoring device that is coupled to the electronic processor, to the power tool device in response to receiving the selection to obtain tool data; and receiving tool usage data from the power tool device via the wireless communication device in response to the power tool device receiving the polling message.

\* \* \* \* \*